Dec. 15, 1953  A. H. ROSS  2,662,355
CARTONING MACHINE
Filed Feb. 27, 1947  27 Sheets-Sheet 1

INVENTOR.
Alexander H. Ross
BY
Strauch & Hoffman
attorneys

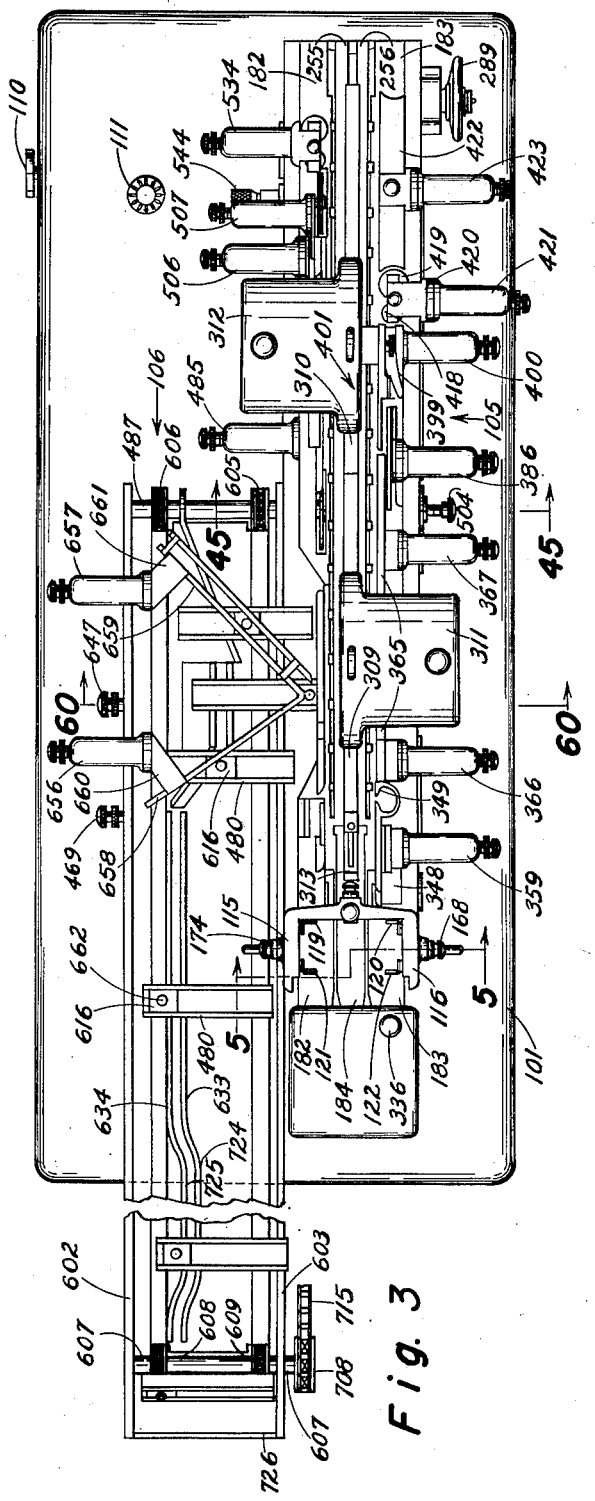
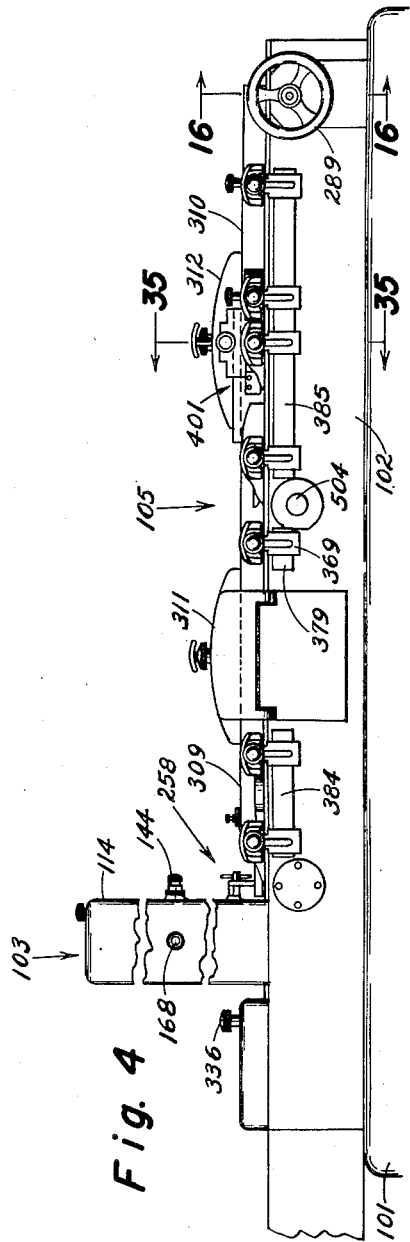

Dec. 15, 1953  A. H. ROSS  2,662,355
CARTONING MACHINE
Filed Feb. 27, 1947  27 Sheets-Sheet 4
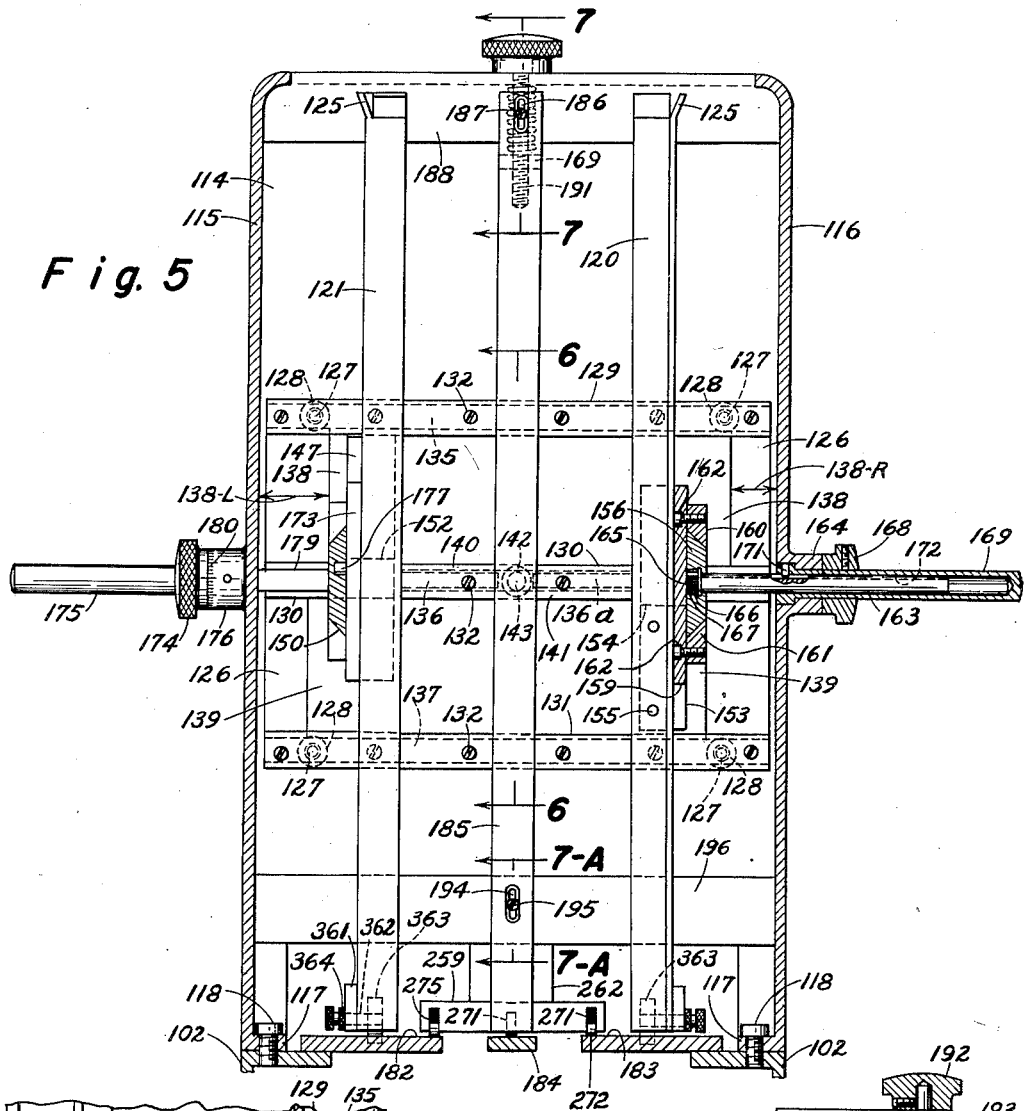
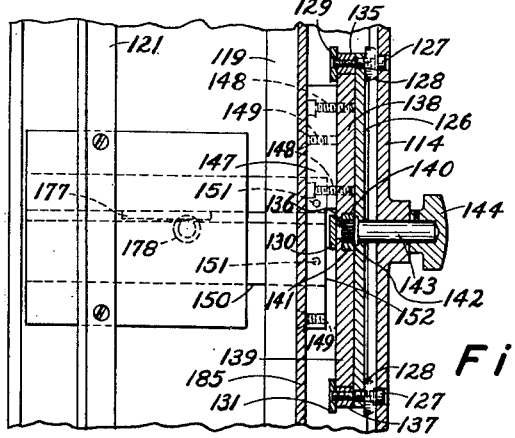
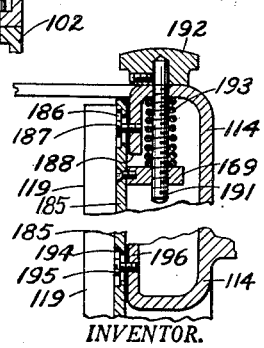
INVENTOR.
Alexander H. Ross
BY
Strauch & Hoffman
attorneys Dec. 15, 1953
A. H. ROSS
2,662,355
CARTONING MACHINE
Filed Feb. 27, 1947
27 Sheets-Sheet 5
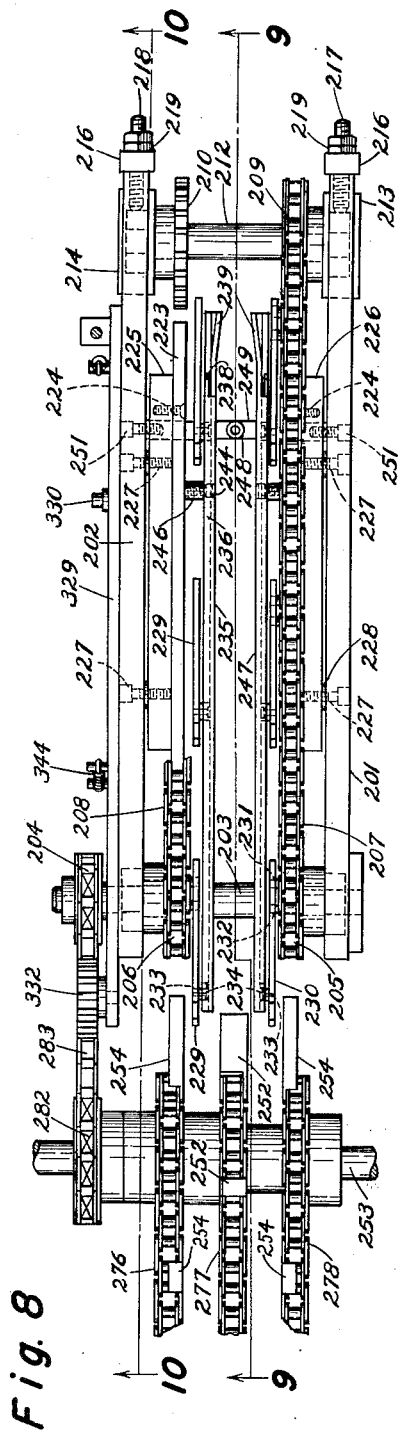
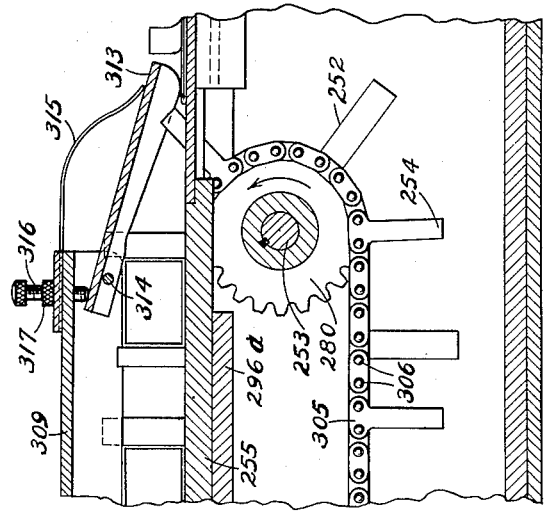
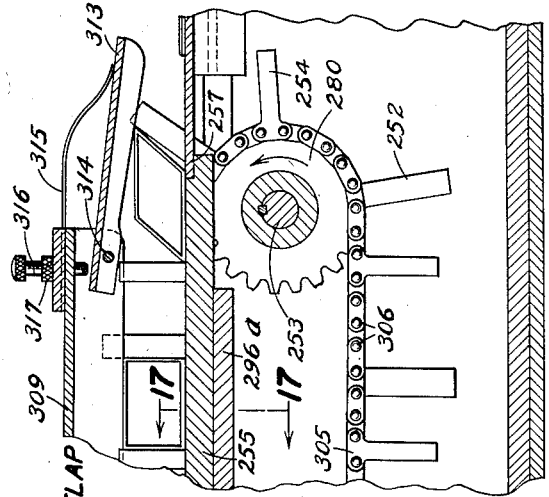
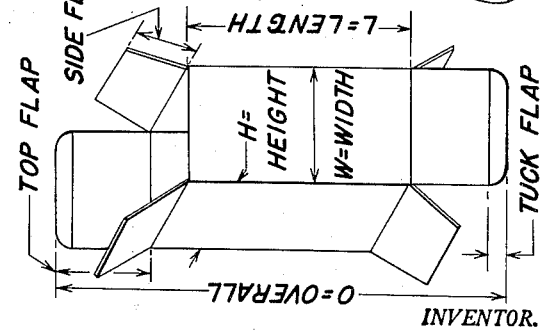
INVENTOR.
Alexander H. Ross
BY Strauch & Hoffman
attorneys Dec. 15, 1953     A. H. ROSS     2,662,355
CARTONING MACHINE
Filed Feb. 27, 1947                             27 Sheets-Sheet 6
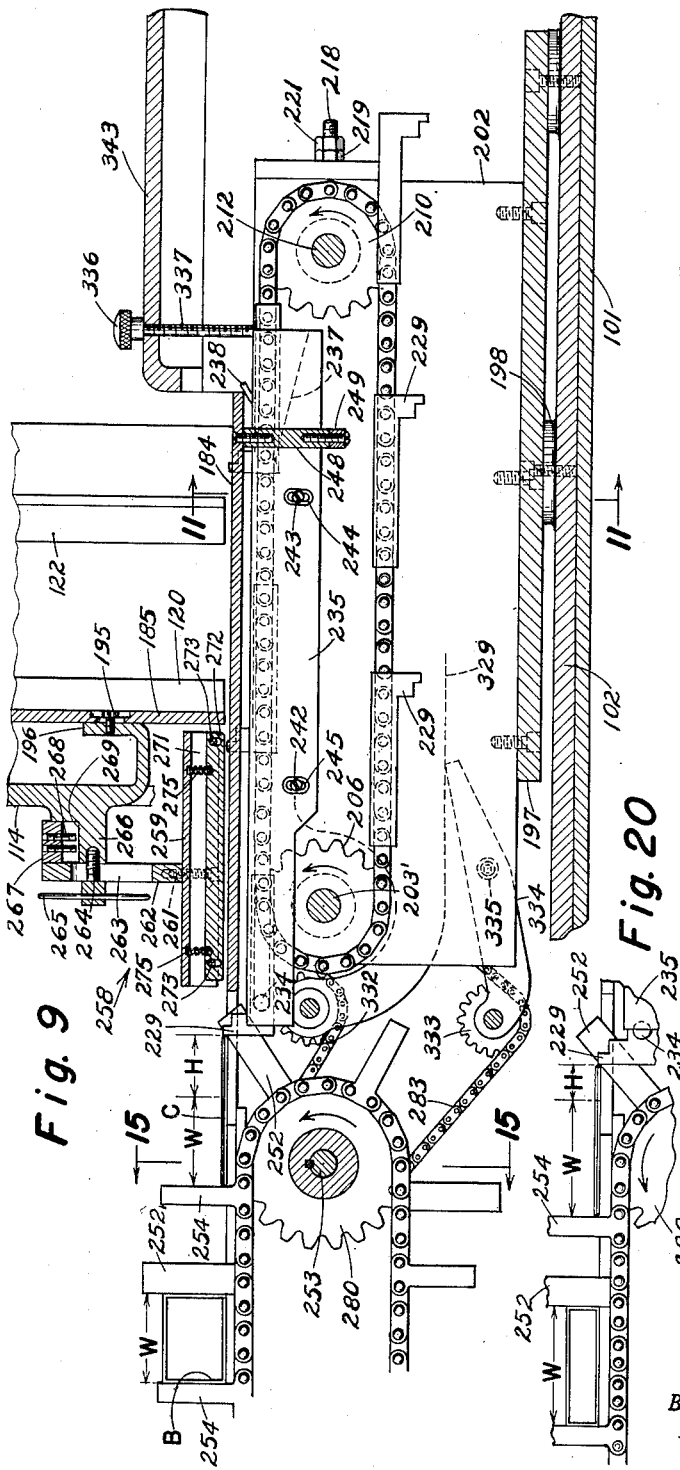
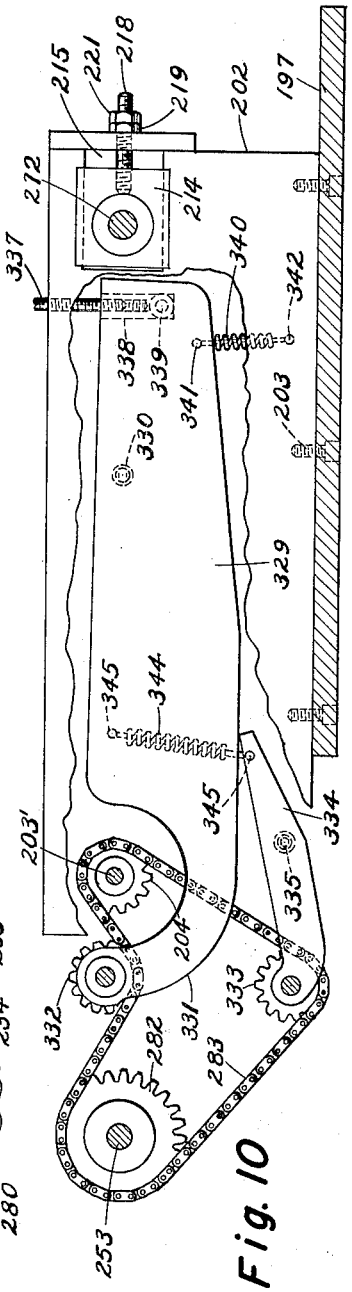
INVENTOR.
Alexander H. Ross
BY Strauch + Hoffman
attorneys Dec. 15, 1953     A. H. ROSS     2,662,355
CARTONING MACHINE
Filed Feb. 27, 1947     27 Sheets-Sheet 7
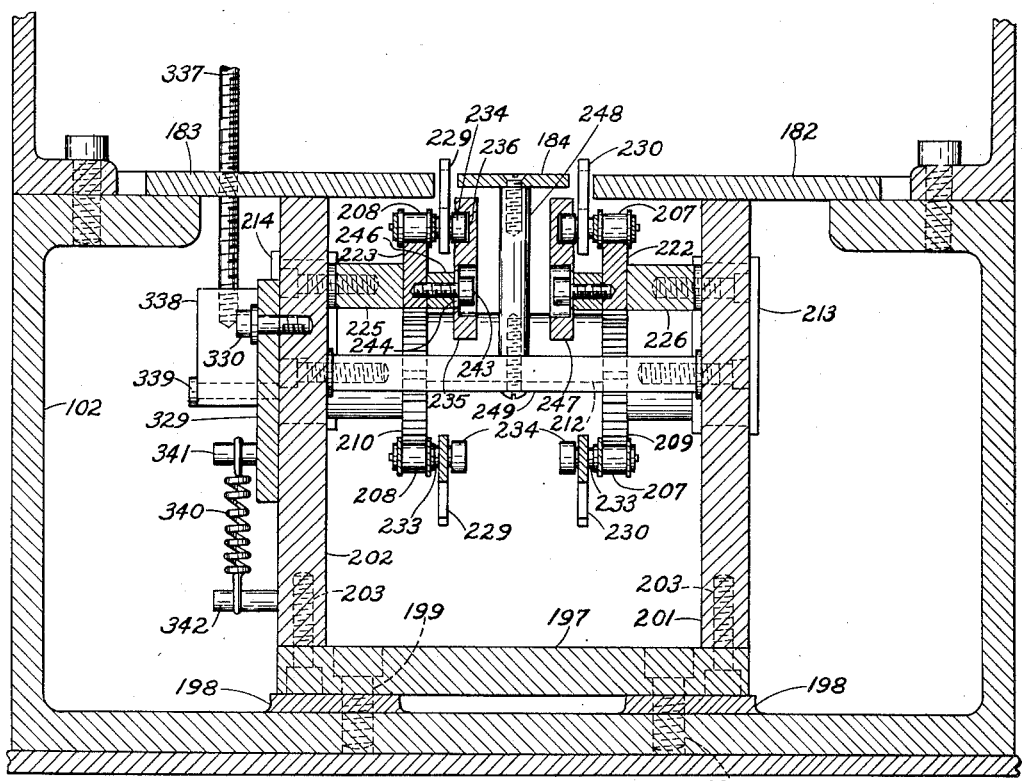
Fig. 11
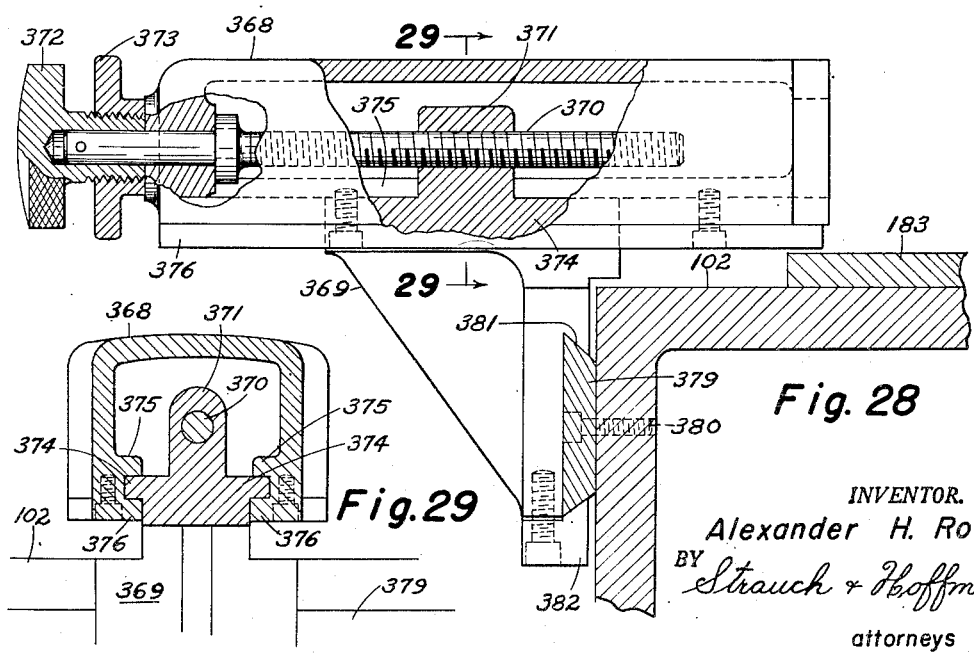
Fig. 28
Fig. 29
INVENTOR.
Alexander H. Ross
BY Strauch & Hoffman
attorneys Dec. 15, 1953 A. H. ROSS 2,662,355
CARTONING MACHINE
Filed Feb. 27, 1947 27 Sheets-Sheet 8
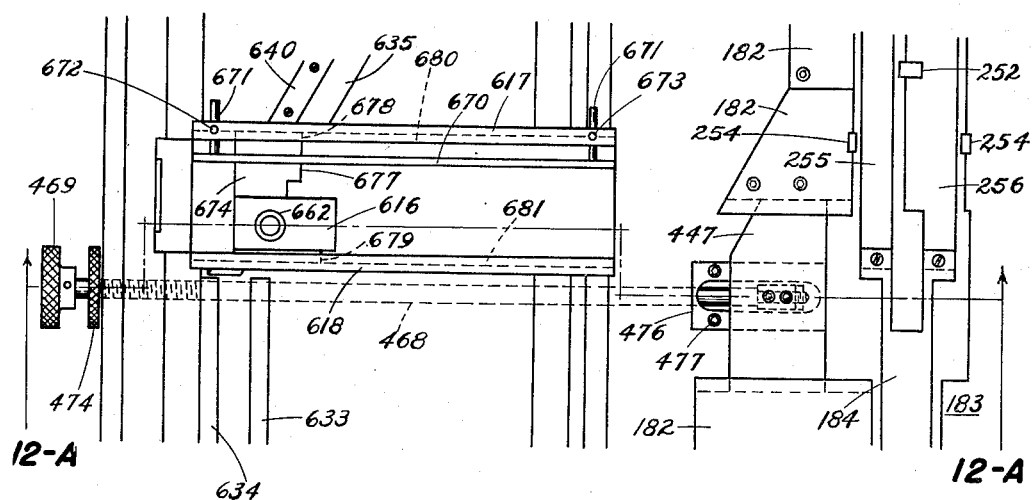
Fig. 12
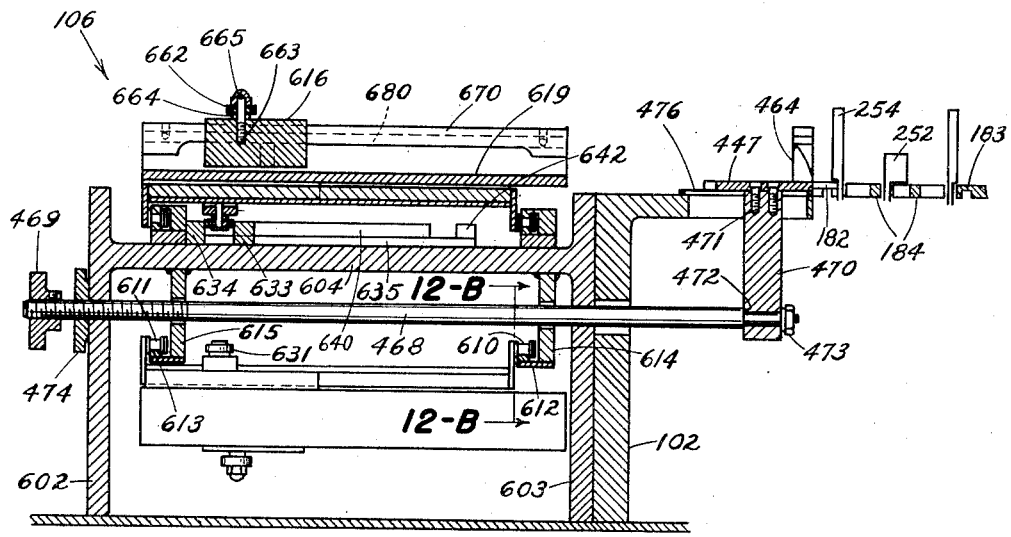
Fig. 12-A
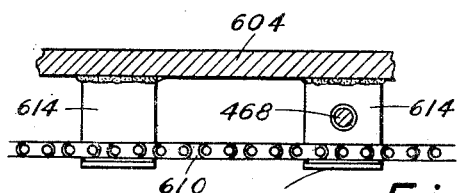
Fig. 12-B
INVENTOR.
Alexander H. Ross
BY
Strauch & Hoffman
attorneys

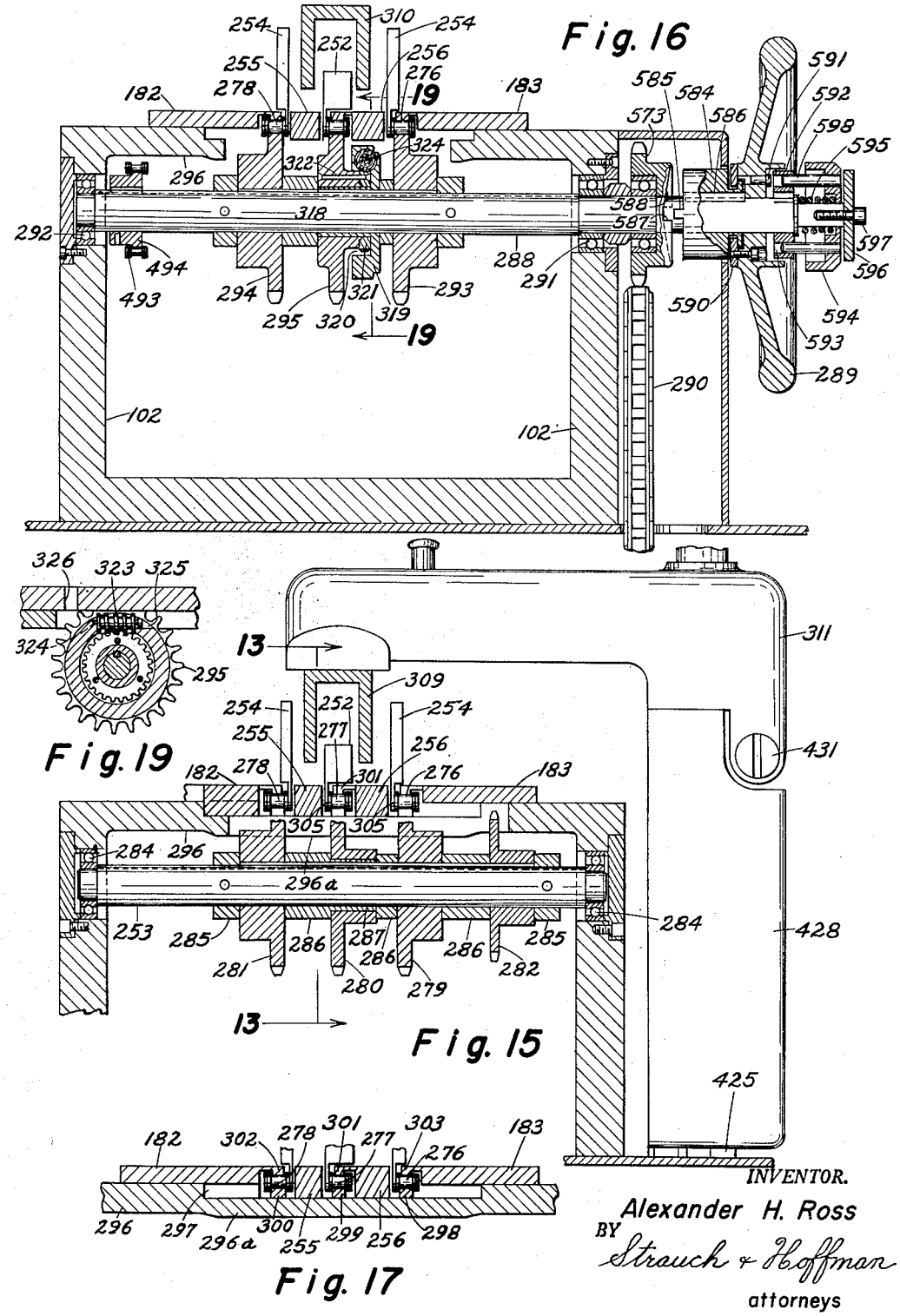

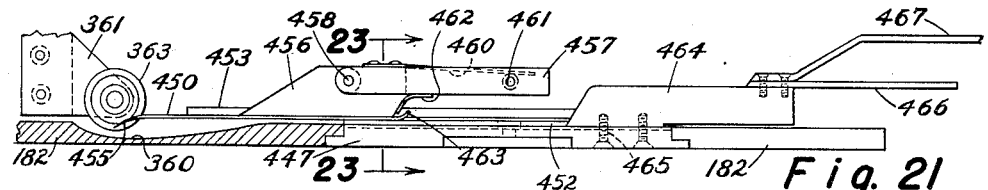
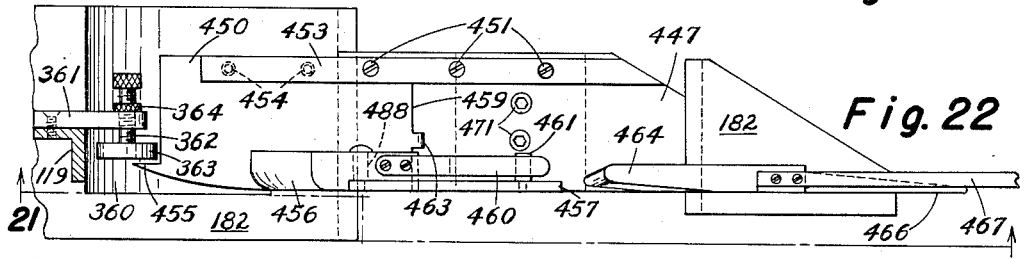
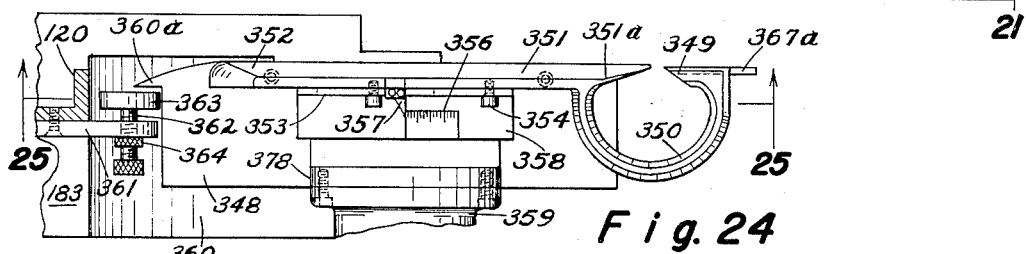
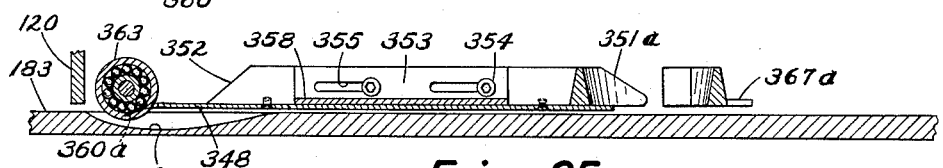
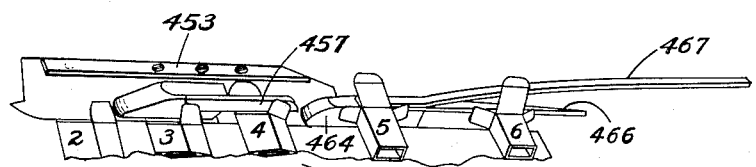
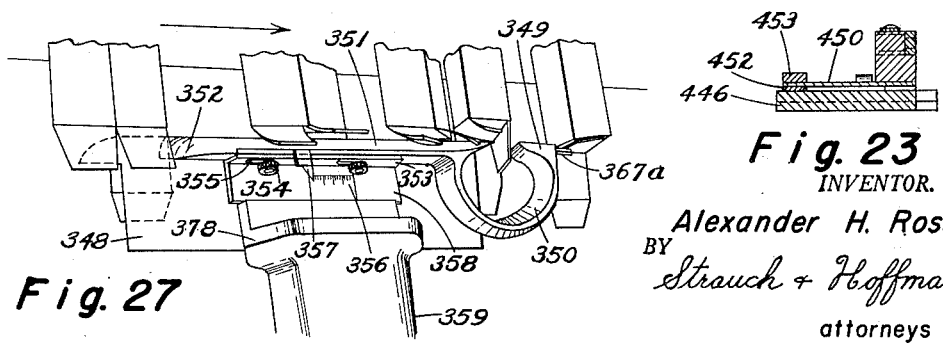
INVENTOR.
Alexander H. Ross
BY Strauch & Hoffman
attorneys Dec. 15, 1953  A. H. ROSS  2,662,355
CARTONING MACHINE
Filed Feb. 27, 1947  27 Sheets—Sheet 11
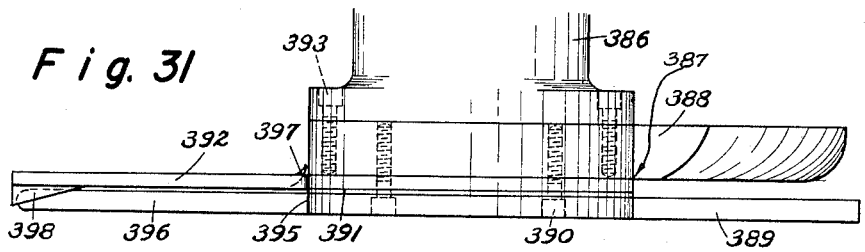
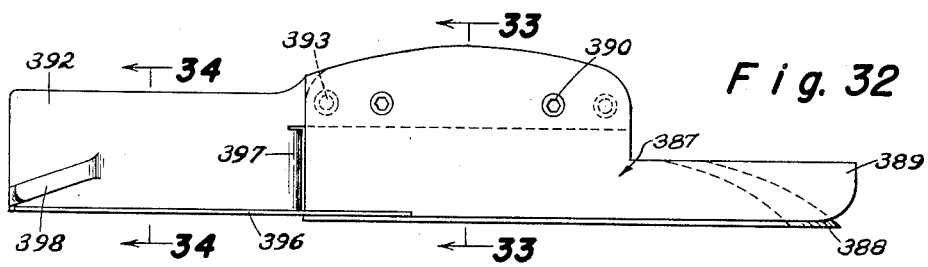
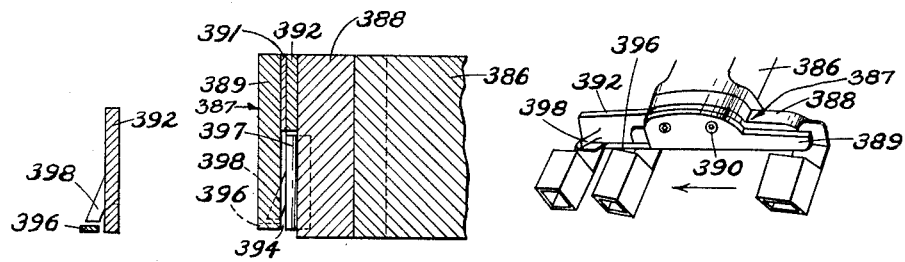
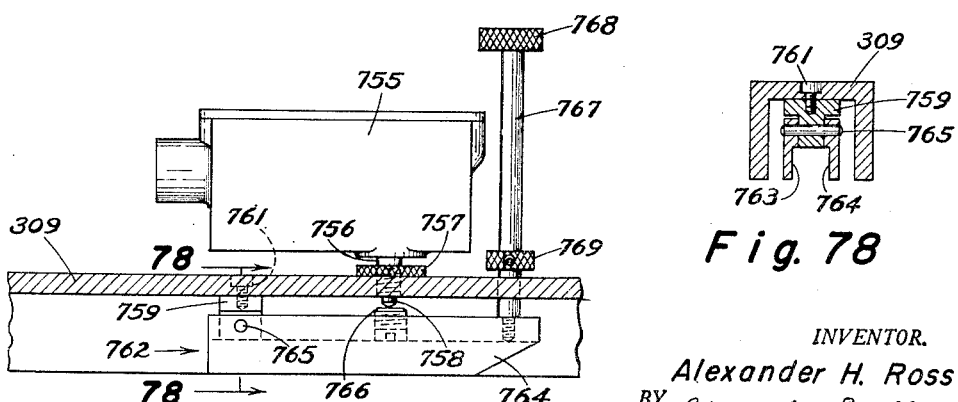
INVENTOR.
Alexander H. Ross
BY Strauch & Hoffman
attorneys Dec. 15, 1953  A. H. ROSS  2,662,355
CARTONING MACHINE
Filed Feb. 27, 1947  27 Sheets-Sheet 12

INVENTOR.
Alexander H. Ross
BY Strauch & Hoffman
attorneys

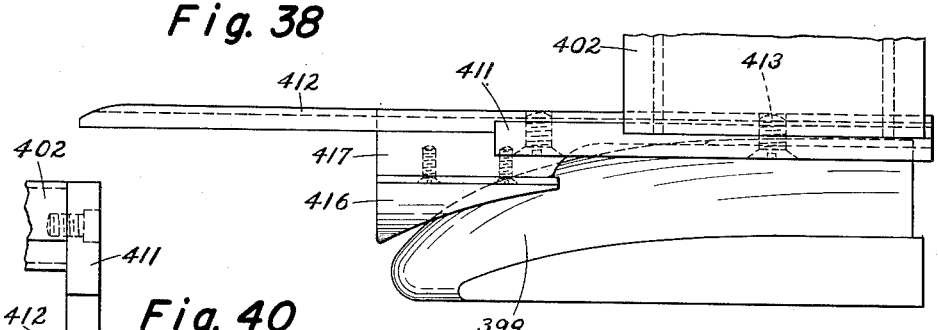
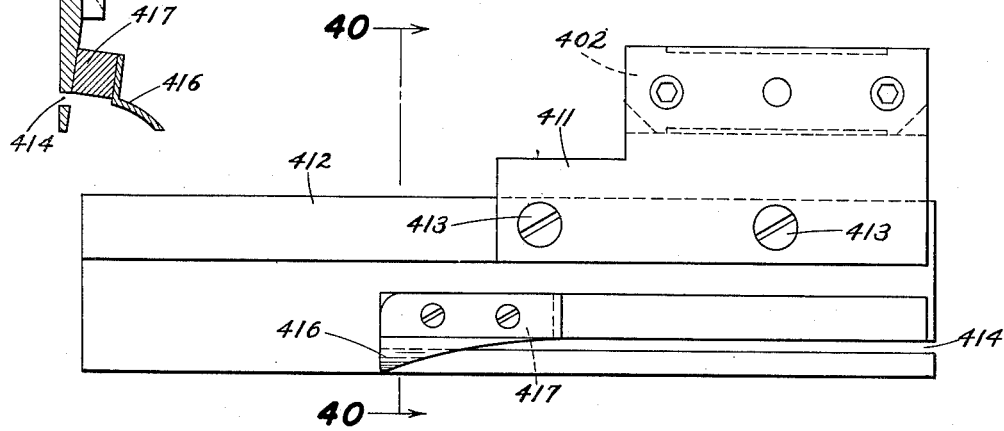
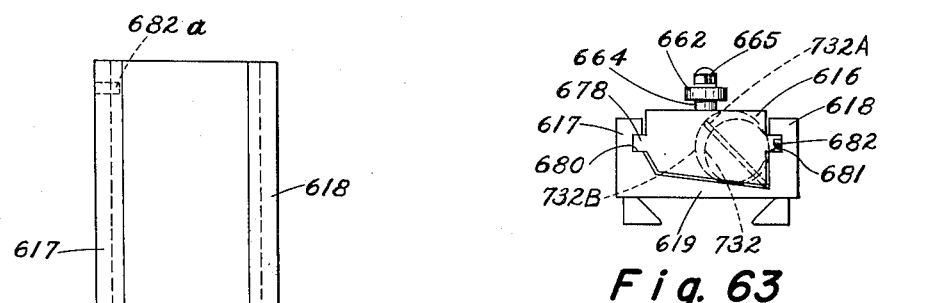
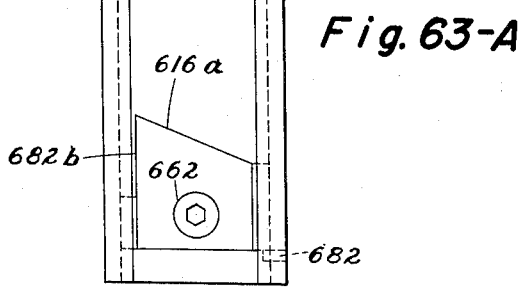
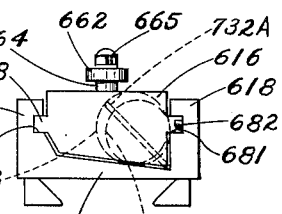

Dec. 15, 1953

A. H. ROSS 2,662,355

CARTONING MACHINE

Filed Feb. 27, 1947

INVENTOR.
Alexander H. Ross
BY Strauch & Hoffman
attorneys

Dec. 15, 1953 A. H. ROSS 2,662,355
CARTONING MACHINE
Filed Feb. 27, 1947 27 Sheets-Sheet 15

INVENTOR.
Alexander H. Ross
BY
Strauch & Hoffman
attorneys

Dec. 15, 1953        A. H. ROSS        2,662,355
CARTONING MACHINE
Filed Feb. 27, 1947                        27 Sheets-Sheet 17
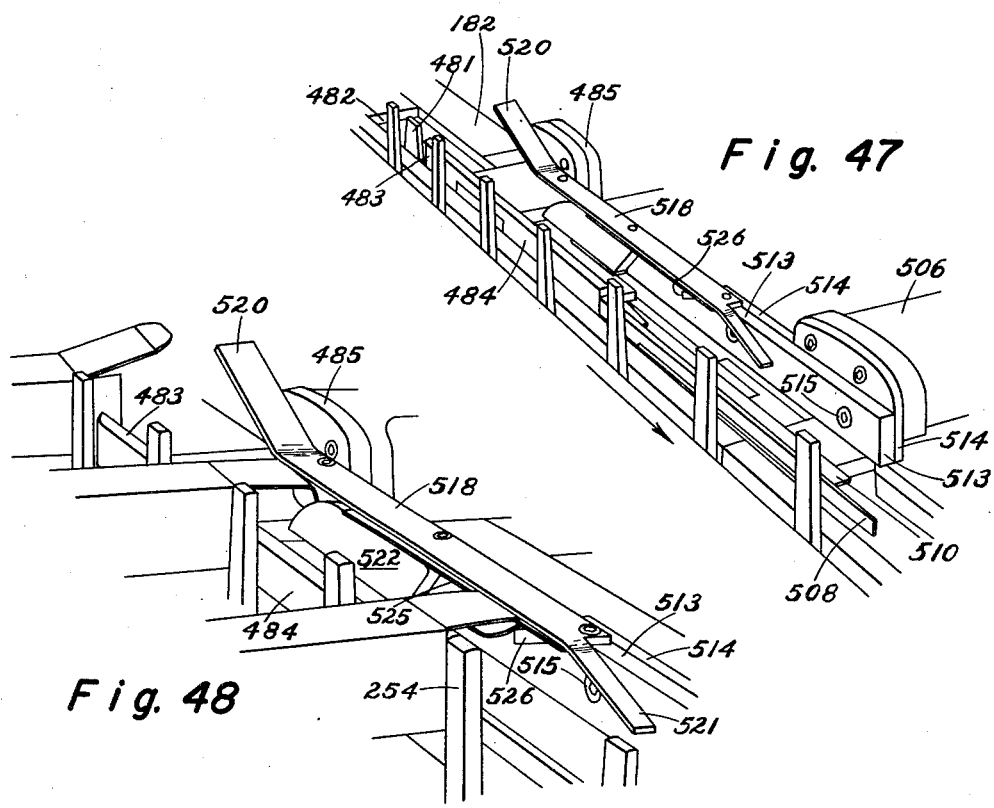
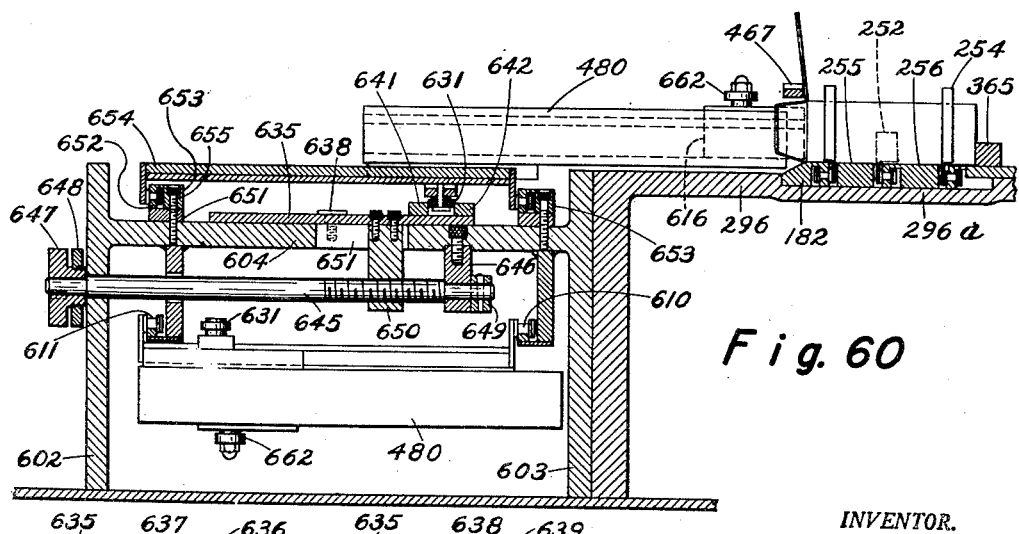
INVENTOR.
Alexander H. Ross
BY Strauch & Hoffman
attorneys

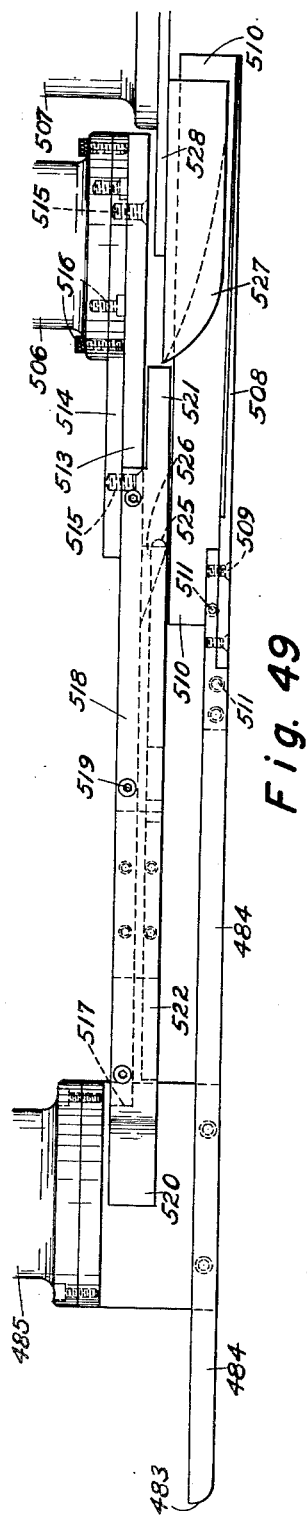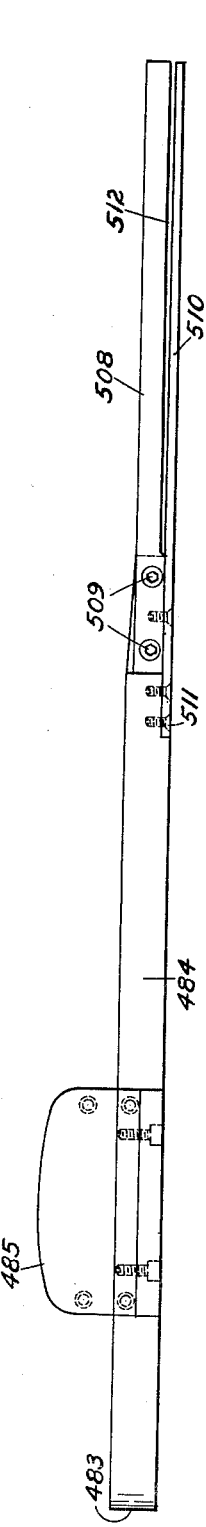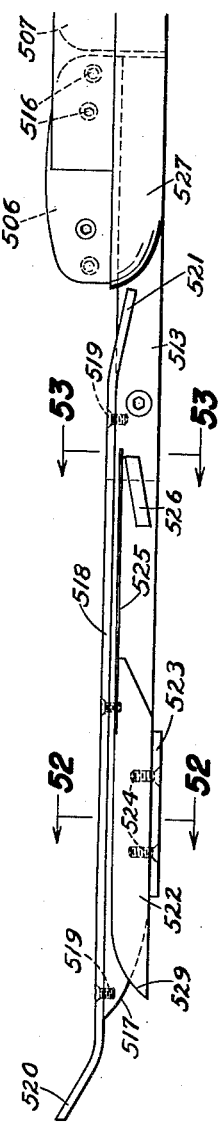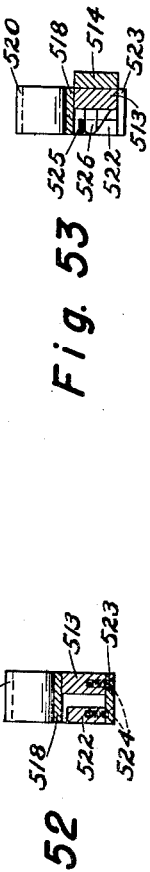

Dec. 15, 1953

A. H. ROSS 2,662,355

CARTONING MACHINE

Filed Feb. 27, 1947

INVENTOR.
Alexander H. Ross
BY Strauch + Hoffman
attorneys

INVENTOR.
Alexander H. Ross
BY Strauch & Hoffman
attorneys

Dec. 15, 1953

A. H. ROSS 2,662,355

CARTONING MACHINE

Filed Feb. 27, 1947

INVENTOR.
Alexander H. Ross
BY
*Strauch + Hoffman*
attorneys

Dec. 15, 1953     A. H. ROSS     2,662,355
CARTONING MACHINE

Filed Feb. 27, 1947     27 Sheets-Sheet 22

INVENTOR.
Alexander H. Ross
BY Strauch + Hoffman
attorneys

Dec. 15, 1953       A. H. ROSS       2,662,355
CARTONING MACHINE
Filed Feb. 27, 1947       27 Sheets-Sheet 23
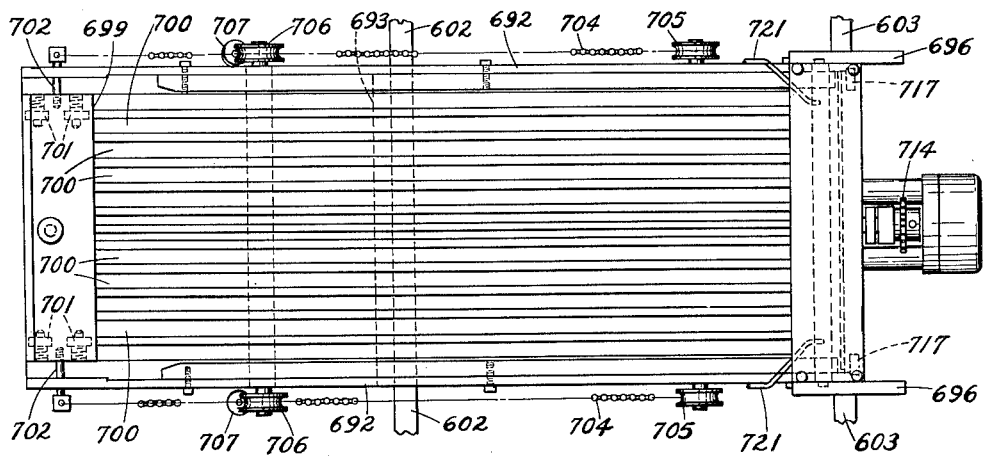
Fig. 70
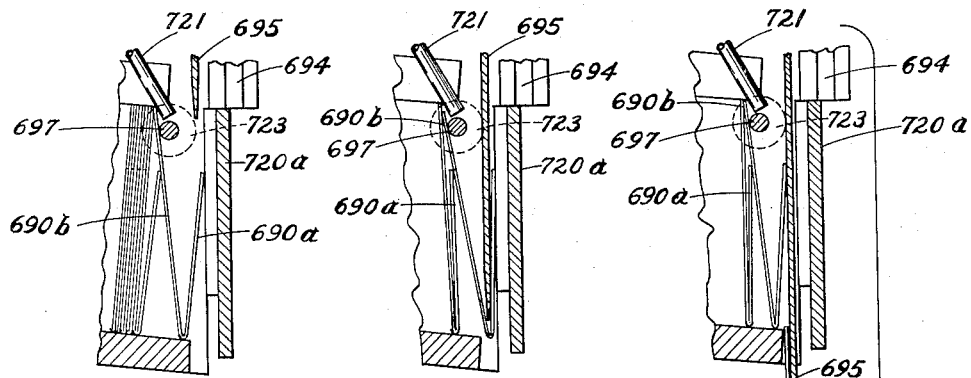
Fig. 72     Fig. 73     Fig. 74
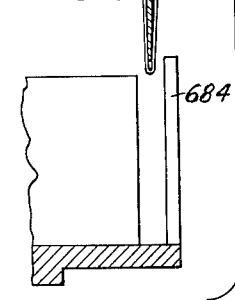
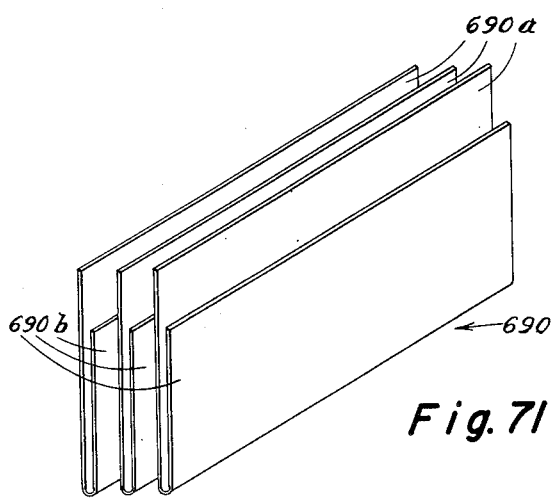
Fig. 71
INVENTOR.
Alexander H. Ross
BY Strauch + Hoffman
attorneys Dec. 15, 1953 A. H. ROSS 2,662,355
CARTONING MACHINE
Filed Feb. 27, 1947 27 Sheets-Sheet 24
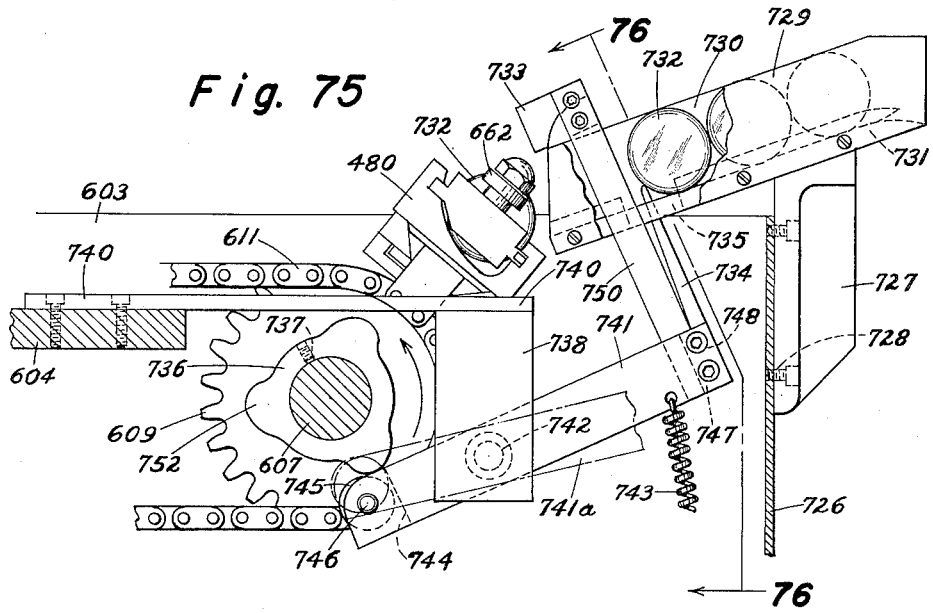
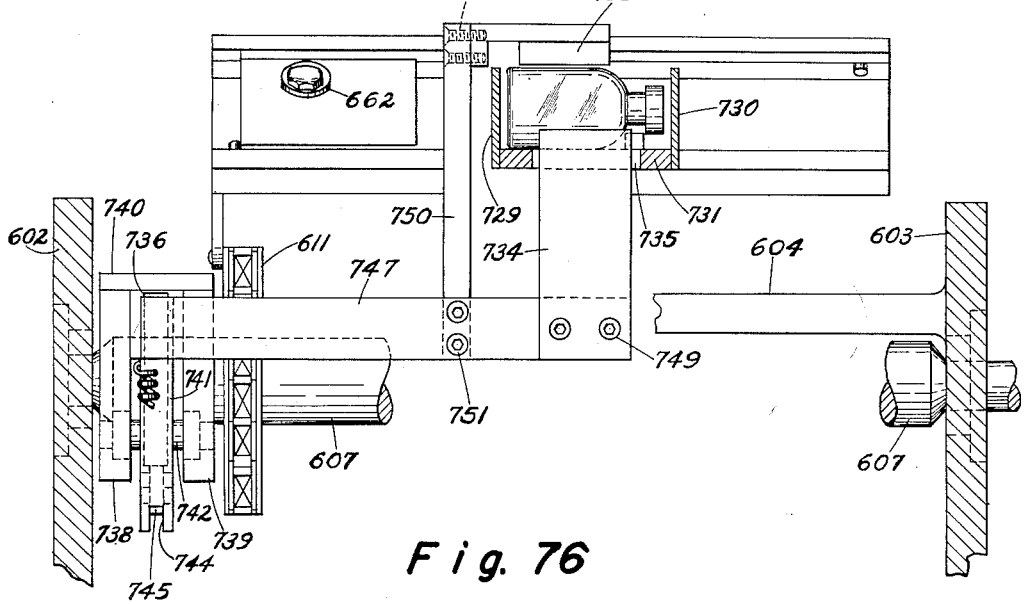
INVENTOR.
*Alexander H. Ross*
BY *Strauch & Hoffm*
attorney.

Dec. 15, 1953 A. H. ROSS 2,662,355
CARTONING MACHINE
Filed Feb. 27, 1947 27 Sheets-Sheet 25
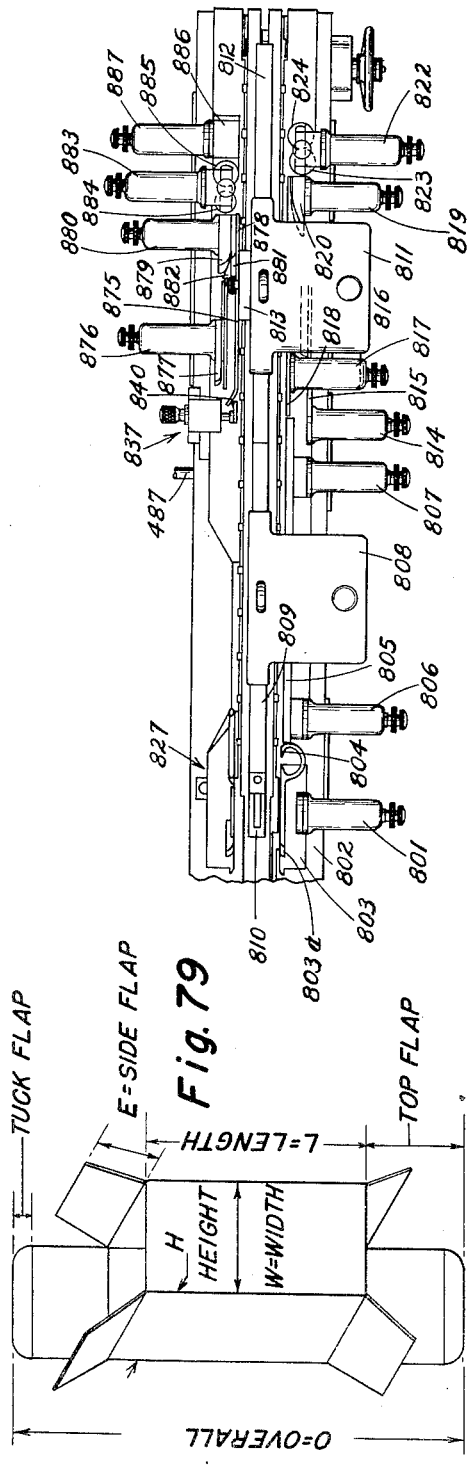
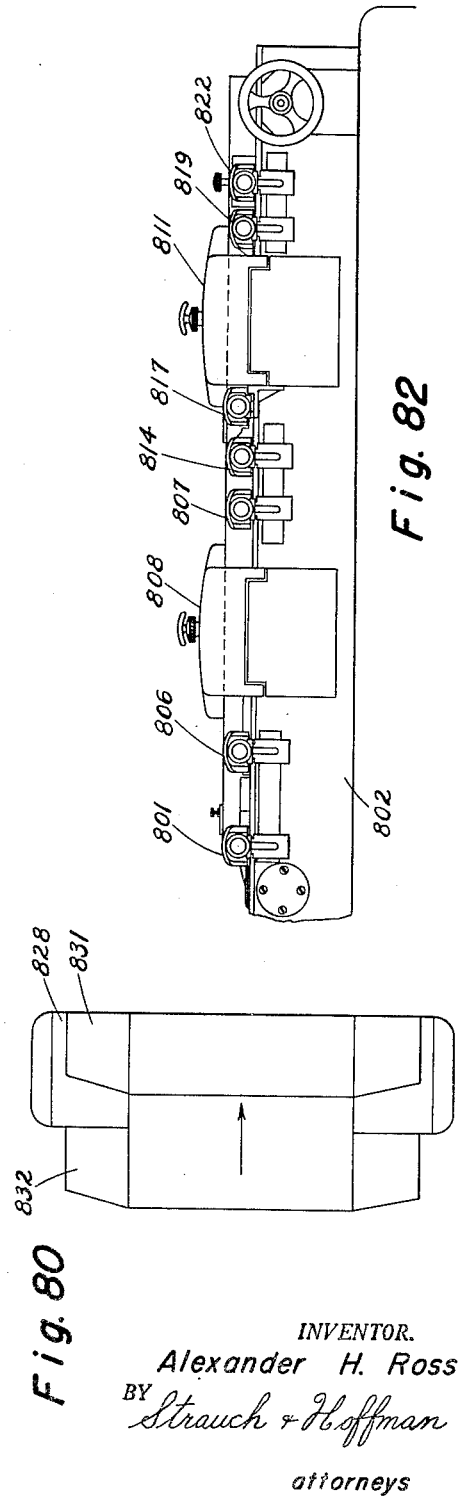
INVENTOR.
Alexander H. Ross
BY Strauch & Hoffman
attorneys Dec. 15, 1953          A. H. ROSS          2,662,355
CARTONING MACHINE
Filed Feb. 27, 1947          27 Sheets-Sheet 26
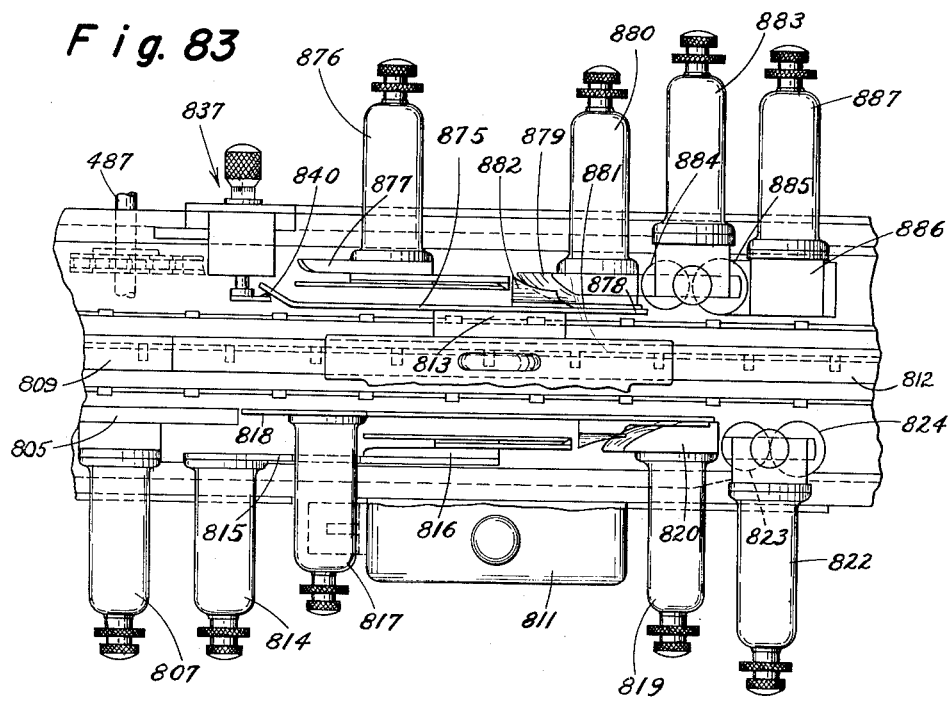
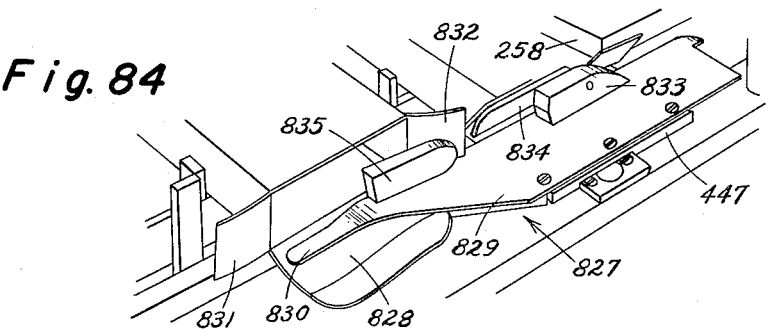
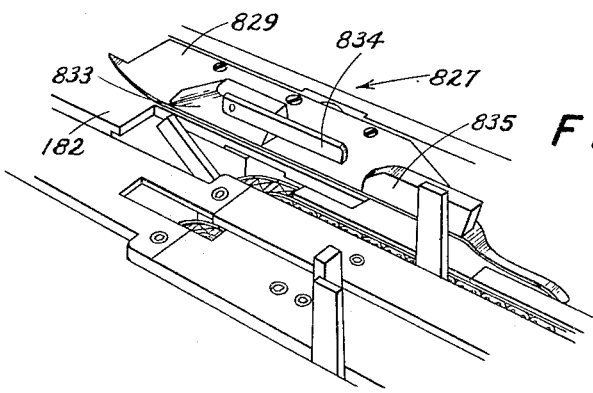
INVENTOR.
Alexander H. Ross Dec. 15, 1953 — A. H. ROSS — 2,662,355
CARTONING MACHINE
Filed Feb. 27, 1947 — 27 Sheets-Sheet 27

INVENTOR.
Alexander H. Ross
BY Strauch & Hoffman
attorneys

Patented Dec. 15, 1953

2,662,355

UNITED STATES PATENT OFFICE 2,662,355

CARTONING MACHINE

Alexander H. Ross, Fort Mitchell, Ky., assignor, by mesne assignments, to Emhart Manufacturing Company, a corporation of Delaware Application February 27, 1947, Serial No. 731,395

31 Claims. (Cl. 53—59)

This invention relates to improvements in machines of the type that are provided with a supply of collapsed cartons in a flat condition, and which erect or expand the cartons to their normal cross-sectional configuration, while holding and closing the end flaps on the cartons and inserting articles therein, so that each article to be packaged is totally enclosed by a carton.

The illustrated embodiments of the invention show a machine of this type wherein means are provided for simultaneously feeding the flattened cartons together with the articles to be packaged therein, the machine being operable to enclose the articles in the package. Advertising matter or instructions or the like, to be inserted with the packaged article, are also fed to the machine. The completely packaged articles are delivered from the machine ready for any subsequent operation such as stacking or packaging for shipment, etc.

My prior application, Serial No. 616,723, filed September 17, 1945, for "Cartoning Machine," discloses a machine for taking the flattened cartons one by one from the bottom of a supply stack thereof and erecting them and closing the flaps on one end so that the erected cartons are in condition for the reception of the article to be packaged. The insertion of the articles and the closing of the other end of the carton is generally done by hand, in this case.

This present application, to the extent that it discloses improvements over the machine disclosed in my aforesaid application, as well as means for automatically loading the articles and closing the other end of carton, etc., is a continuation in part of the aforesaid application.

In common with the machine disclosed in said aforesaid application, the present invention contemplates a machine which is fully adjustable within its designed range, whereby it can receive and properly operate upon cartons and articles of various sizes with a minimum of expenditure of time in changing the adjustments, whereby the "down-time" or the time that the machine is out of operation between runs of cartons of different sizes is reduced to a minimum.

A semi-skilled operator can change the adjustments on the machine to accommodate a different sized carton in a very short time. For such changes, it is entirely unnecessary to remove and replace parts with similar parts of different size. Calibrated scales in conjunction with the adjustable elements permit the resetting of the machine to accommodate the desired carton without the necessity of trial adjustments after it has once been set up.

While the construction of the machine is such that jamming thereof, as by an inferior carton or the like, will occur only very infrequently, if a jam does occur it can be quickly cleared with an absolute minimum of shut-down time, and some types of jams can be cleared while the machine is running. The machine is characterized by an absence of reciprocating elements and the cartons and articles handled by it are fed and carried through the machine in a uniform, uninterrupted motion.

The construction of the machine is also such that it will have an extremely long life. Bearing elements, such as ball bearings or the like, which require lubrication, are sealed for life so that they need not be lubricated and also to prevent spreading of lubricant materials on the machine where they will be smeared onto the cartons with consequent defacement thereof. Parts of the machine which contact the cartons or other articles handled, are of low friction materials such as chromium or the like.

While it has a high production rate, the machine is extremely quiet in operation. There is no danger to the operator. An important factor in its safety of operation lies in a friction clutch which disengages the drive motor in the event of a jam. This friction clutch will disengage the drive motor upon the imposition of only a slight over-load due to a jam or interference, and consequently any interference which might be caused by the operator's clothing becoming entangled will immediately stop the machine before any damage is done. Auxiliary means will automatically shut off the current to the drive motor when a carton fails to erect properly.

Another factor leading to safety of operation is the fact that it may be selectively driven by power means or by hand, the latter being used at any time that the machine is being adjusted, as when changes are being made, or as when jams are being cleared, etc.

Machines embodying the principles of my invention may be divided into two general classifications. The first of these is the "semi-automatic" machine, which erects the flattened carton and closes only one end thereof, the other end being left open for loading of the article or articles into the carton and subsequently the closing of the other end. A machine of this type is disclosed in my aforesaid application No. 616,723. The second type is designated as "fully automatic" which comprises a machine of the semi-automatic type plus a carton loading mechanism and devices for subsequently closing the remaining open end of the carton. In the instant application, I have disclosed a "fully automatic" machine which also includes a loader for automatically supplying the carton loading mechanism, wherein all of the elements comprising the complete machine are constructed and arranged so as to operate with a unitary interdependent action.

As disclosed in my aforesaid copending application, a feeder conveyor transfers single flat cartons from the bottom of a stack of cartons to a transport conveyor, which erects the cartons and conveys them during subsequent operations. One of the improvements of the instant invention is a means for adjusting the timing relationship between the feed and transport conveyors in order to assure the correct timing of the feeding of the cartons to the adjustable transport conveyor when a change in transport finger adjustment is made to accommodate cartons of a different width. Other improvements include means for holding the carton flat while being fed to the transport for deflecting the flaps for proper insertion under the parting blades, and simplified construction of the magazine.

The carton erecting mechanism is improved by the addition of a flop weight as an extension of the hold down bar, which assures that during erection the leading and trailing edges of the carton will snugly engage the leading and trailing fingers of the transport conveyor while they are closing upon each other as they leave the sprocket, and that the bottom of the carton will remain in engagement with the top of the transport table.

A carton loading unit, which acts in conjunction with and is driven by the transport conveyor, is disposed alongside and parallel to the transport. The loading unit moves at the same speed as the transport conveyor, and at a time when the carton flaps are in proper position to allow articles to be inserted into the cartons, the merchandise or article buckets on the loading unit are automatically shifted transversely toward the transport conveyor. Sliding plungers in the buckets are simultaneously operated to transfer the articles entirely from the loader conveyor to the cartons. After each bucket has loaded its respective carton in this manner, the bucket automatically resumes its former position on the conveyor and each sliding plunger likewise resumes its normal position. The buckets may be provided with means facilitating the inserting of advertising matter or the like into the cartons together with the articles of merchandise in a novel and improved manner, this operation taking place simultaneously with the insertion of the merchandise articles.

Full adjustability of the cartoning machine and loading unit is provided within the range of the machine, so that cartons of various sizes can be erected, filled, and closed with merchandise articles of corresponding sizes.

Also, the machine is so constructed and arranged that with a minimum number of modifications, cartons of different construction may be erected, filled and closed. In the first illustrated embodiment the machine is particularly arranged to handle "reverse tuck" cartons, wherein the two long tucking flaps on the ends of each carton are attached to opposite sides of the carton. By means of a few changes the machine is adapted to handle the "straight tuck" or "airplane flap" cartons, wherein the long tucking flaps are at the two ends of the same side of a carton. A machine of this type is shown in the second disclosed embodiment.

Cartons having a tuck flap on one end and glued flaps on the other end can be accommodated by a machine provided with suitable tuck and flap controls, shown in connection with either of these machines.

Machines designed for erecting cartons, filling them and closing them are well known, as exemplified by the patents numbered 1,935,269, 2,133,248 and 2,263,501 to R. A. Jones. My new and improved machine however is characterized by new principles of operation which result in a greater range in adaptability, higher speeds and increased output, and a simplification and reduction in the number of moving parts.

An inherent advantage of my machine is its ability to handle the loading of cartons with merchandise that is relatively heavy and has sharp corners that make difficult the insertion of the tuck flaps during the closing of the loading end of the carton. With my machine the carton may be so erected and conveyed by the transport that the top or end flap which closes the carton is folded upwardly after the merchandise is loaded. The tuck flap on the free end of the top flap is then inserted into the carton at the top edge thereof and it does not have to lift the merchandise in order to slip into the carton because the merchandise is resting upon the bottom of the carton. This is an important advantage when cartoning articles such as rubber heels, which lie on the bottom of the cartons and have sharp corners which obstruct the free entry of the tuck flap if it is attempted to fold the top flap downwardly and insert the tuck flap at the bottom of the carton and under the rubber heels. The obstruction offered by the rubber heels in such case is so great that the tuck flap cannot be fully inserted, and the tuck and top flaps become distorted as a result of the forces applied in attempting to insert the tuck flap. Another advantage of being able to load the carton with the top or end flap at the bottom of the carton in this manner, is that the end flap is connected to the bottom surface of the carton and presents an inclined plane leading to the plane of the carton bottom. Thus when the merchandise is inserted it cannot strike a bottom edge of the carton which would thereby impede its entrance into the carton. Such an edge is presented to the merchandise when the top or end flap is connected to the upper wall of the carton and folds downwardly to close the carton.

Where the merchandise consists of articles such as bottles, which have corners that are substantially rounded, there is no great difficulty encountered when inserting the tuck flap at the bottom, because the tuck flap can slip under the rounded corner and lift the bottle. However, if the bottle is large and heavy due to the weight of its contents, the tuck flap may buckle while being forced under it, so in such case it is preferable to insert the tuck flap at the top, and over the bottle.

It occasionally happens that the cartons provided to package the merchandise may be slightly undersize so that if the merchandise is inserted it will bulge the carton. Such cartons may be handled by my machine if the oversize article does not block entrance of the tuck flap and if the machine is arranged so that the end flap is folded upwardly after the merchandise is inserted. Adjustments can be made to the machine so that the tuck flaps will be directed to the proper point of entry, and the carton is closed in the usual manner.

The erection system and the construction of my machine is such that it is easily adapted to handle either the reverse tuck or the straight tuck types of carton merely by proper arrangement of the tuck and flap controls which operate upon the flaps to close the carton. By the addition or substitution of glue application devices as disclosed in my aforesaid copending application, it is adapted to handle cartons which have their flaps glued at either or both ends.

It is accordingly the major object of my invention to provide a new and improved machine for erecting, filling, and closing cartons while they are continuously moving from a supply stack to the discharge end of the machine.

It is another important object of my invention to provide a novel and improved machine which is adapted to handle cartons of various types and sizes.

Another important object is the provision of a machine loading carton wherein the end flap of the cartons lies below the merchandise while the merchandise is inserted.

Another important object is the provision of a carton erecting and loading machine adapted to insert the carton tuck flaps above the loaded merchandise so that the merchandise does not resist the insertion of the tuck flaps.

Another object is the provision of a machine adapted to erect and load cartons in such a manner that the carton end flaps provide a guide to lead the merchandise onto the bottom wall of the carton.

Another important object of my invention is the provision of an improved machine which is fully adjustable within its range of erecting, filling and closing cartons of various sizes. A means for adjusting the timing of the transport conveyor with respect to the carton feeder conveyor is an important provision in the machine.

Another important object is the provision of a novel and improved machine for simultaneously inserting separate merchandise articles and sheets or pamphlets of instructions or advertising material, etc., into cartons, after which the cartons are closed.

Another object is the provision of a machine which is safe to operate and provided with automatic devices to stop its operation in the event of interference with its normal operation caused by a jam or the like.

Other objects will become apparent as the description proceeds in connection with the accompanying drawings, wherein:

Figure 3 is a top plan view of the machine, with some parts omitted;

Figure 4 is a view in side elevation of the machine shown in Figure 3, with some portions omitted;

Figure 5 is a sectional view of the magazine, taken substantially along the line 5—5 of Figure 3;

Figure 6 is a sectional view taken substantially along the line 6—6 of Figure 5;

Figure 7 is a sectional view taken substantially along the line 7—7 of Figure 5;

Figure 7A is a sectional view taken substantially along the line 7A—7A of Figure 5;

Figure 8 is a top plan view of the feeder conveyor, and tail shaft of the transport conveyor, with the magazine and surface plates removed to show the mechanism;

Figure 9 is a side elevation view of the feeder, magazine, and transport, taken substantially along the line 9—9 of Figure 8;

Figure 10 is a side elevation, partly broken away, of the feeder and tail shaft taken substantially along the line 10—10 of Figure 8;

Figure 11 is a sectional view taken substantially along line 11—11 of Figure 9;

Figure 12 is a top plan view of that part of the machine shown at the left in Figure 8, where the flat cartons are transferred to the transport and erected, but with the surface or table plates in place, and also showing a plan view of a portion of the carton loading unit;

Figure 12A is a sectional view substantially along the lines 12A—12A of Figure 12;

Figure 12B is a partial sectional view, substantially along the line 12B—12B of Figure 12A;

Figures 13 and 14 (Sheet 5) are partial sectional views substantially along the line 13—13 of Figure 15, showing the transport in two sequential positions during the erection of a carton;

Figure 15 is a sectional view substantially along line 15—15 of Figure 9;

Figure 16 is a sectional view substantially along the line 16—16 of Figure 4;

Figure 17 is a partial sectional view through the top of the cartoning machine base, substantially along the line 17—17 of Figure 13;

Figure 18 (Sheet 5) is a pictorial view of a reverse tuck type carton;

Figure 19 (Sheet 9) is a section substantially the line 19—19 of Figure 16;

Figure 20 (Sheet 6) is a view of a portion of Figure 9 but with a more rectangular carton being fed to the transport;

Figure 21 is a view in side elevation of the parting blade and plow assembly for the loading end of the carton, the view being taken substantially along the line 21—21 of Figure 22;

Figure 22 is a top plan view of the elements shown in Figure 21;

Figure 23 is a sectional view substantially along the line 23—23 of Figure 21;

Figure 24 is a top plan view of the parting blade and reversing plow assembly;

Figure 25 is a sectional view substantially along the line 25—25 of Figure 24;

Figures 26 and 27 are pictorial views showing a carton passing through the assemblies of Figures 22 and 24;

Figures 28 and 29 (Sheet 7) are views showing the construction of a compound Figure 29 being taken substantially along line 29—29 of Figure 28;

Figure 30 (Sheet 11) is a pictorial view of a tuck flap creaser assembly with a carton passing it;

Figures 31 and 32 are top and side views of the tuck flap creaser assembly which is shown pictorially in Figure 30;

Figure 1:
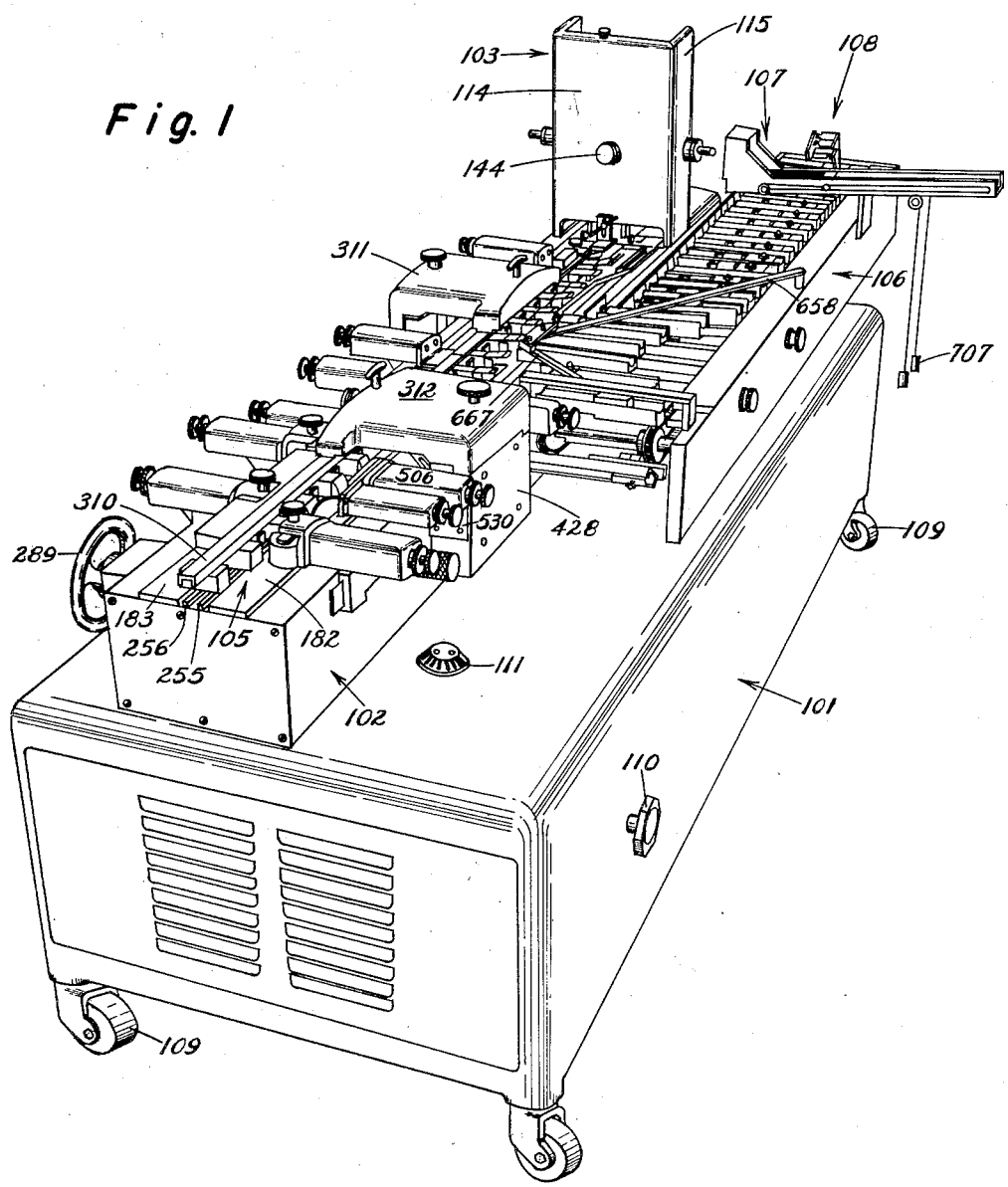
Figure 1 is a perspective view of the illustrated embodiment of my invention.
Figure 2:
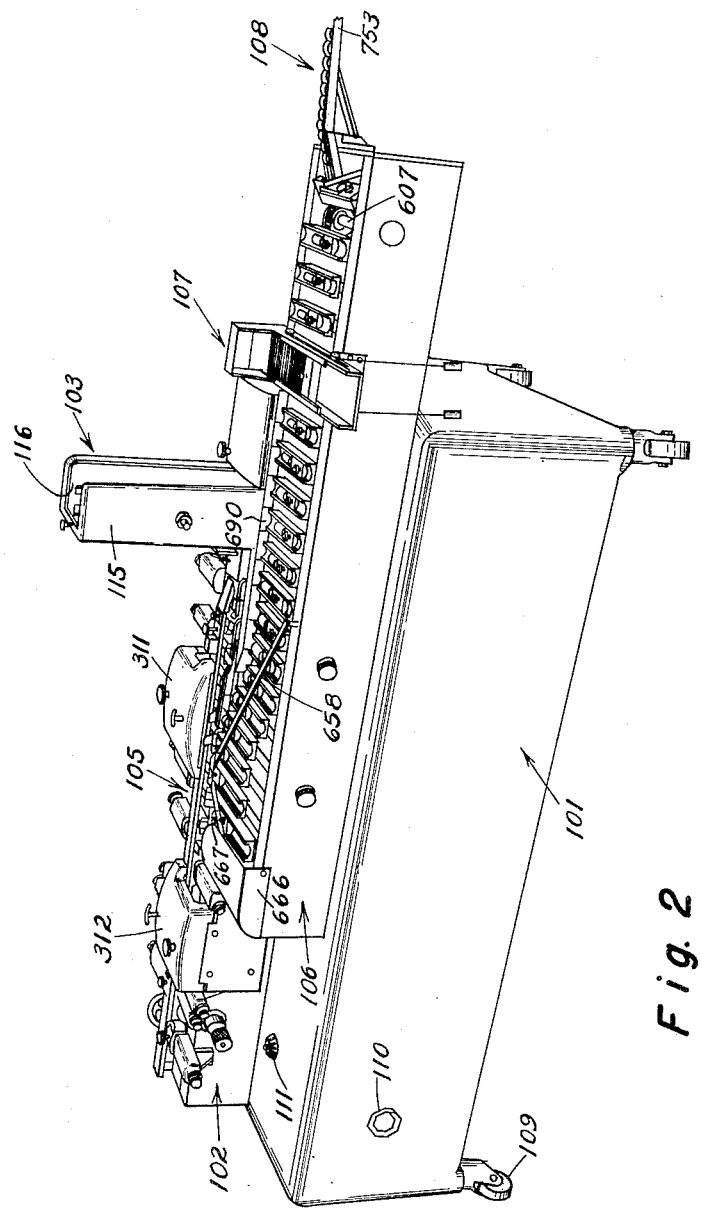
Figure 2 is another perspective view taken from a different angle.
Figure 35:
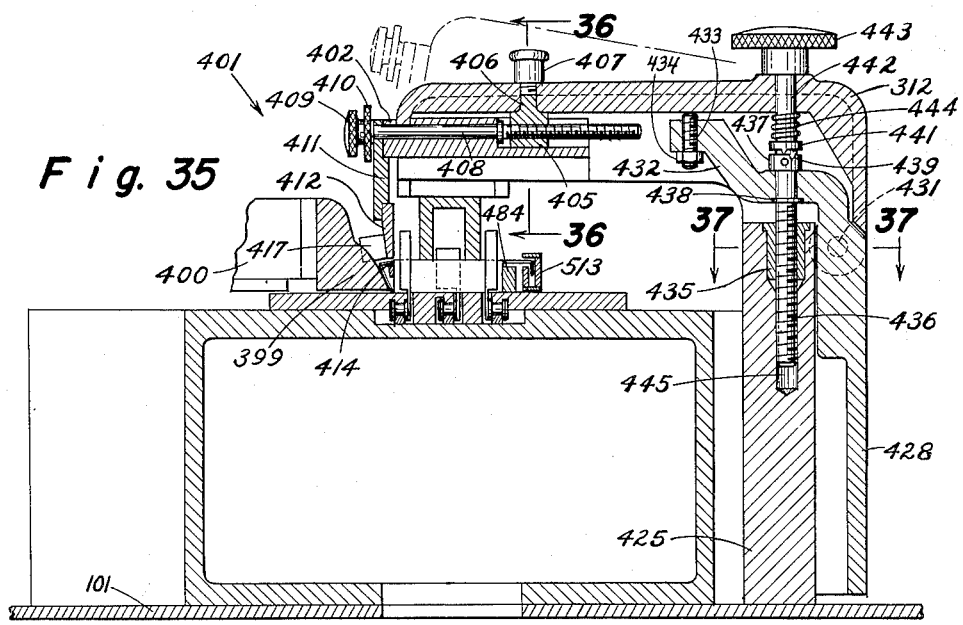
Figure 36:
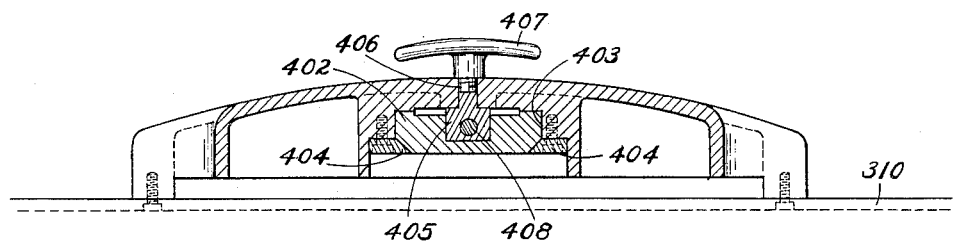
Figure 37:
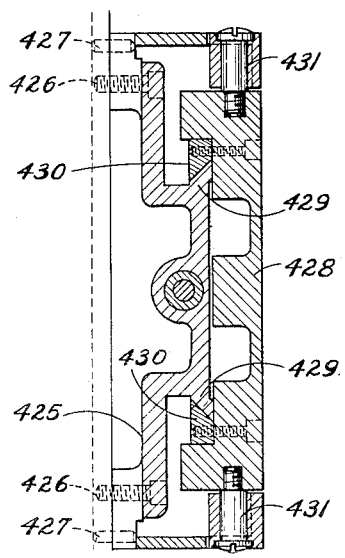
Figures 41, 42:
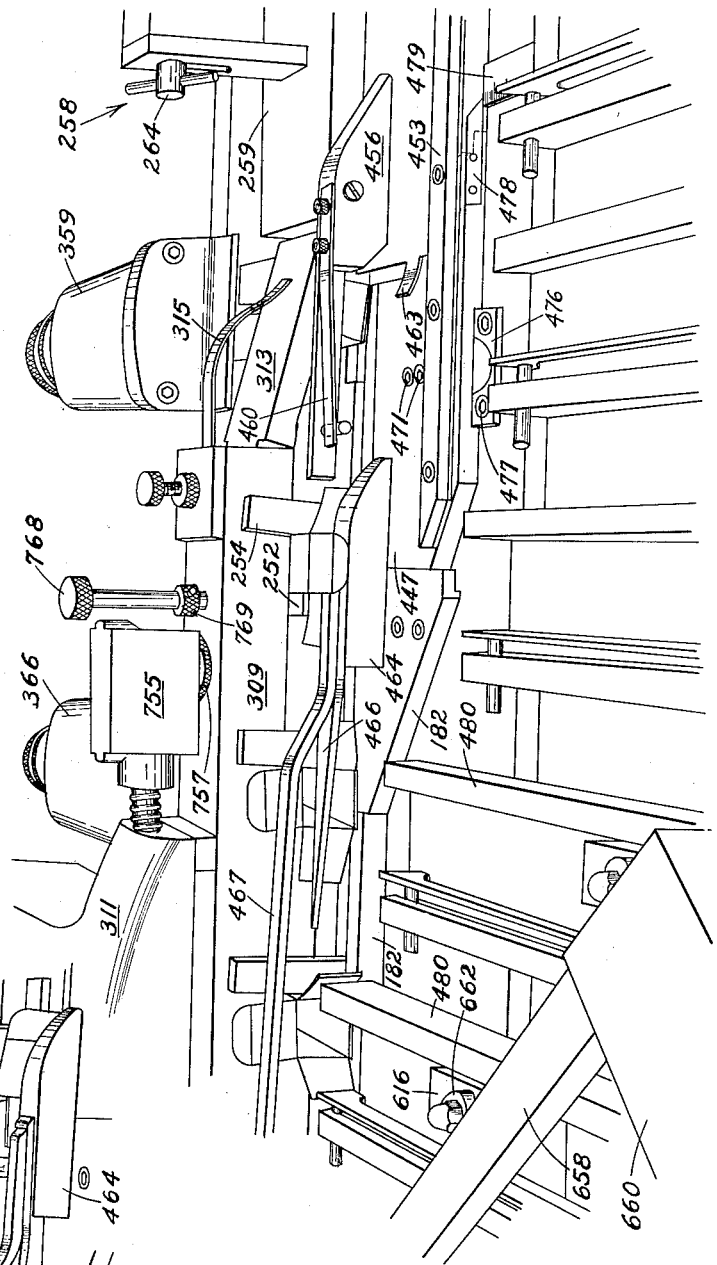
Figure 44:
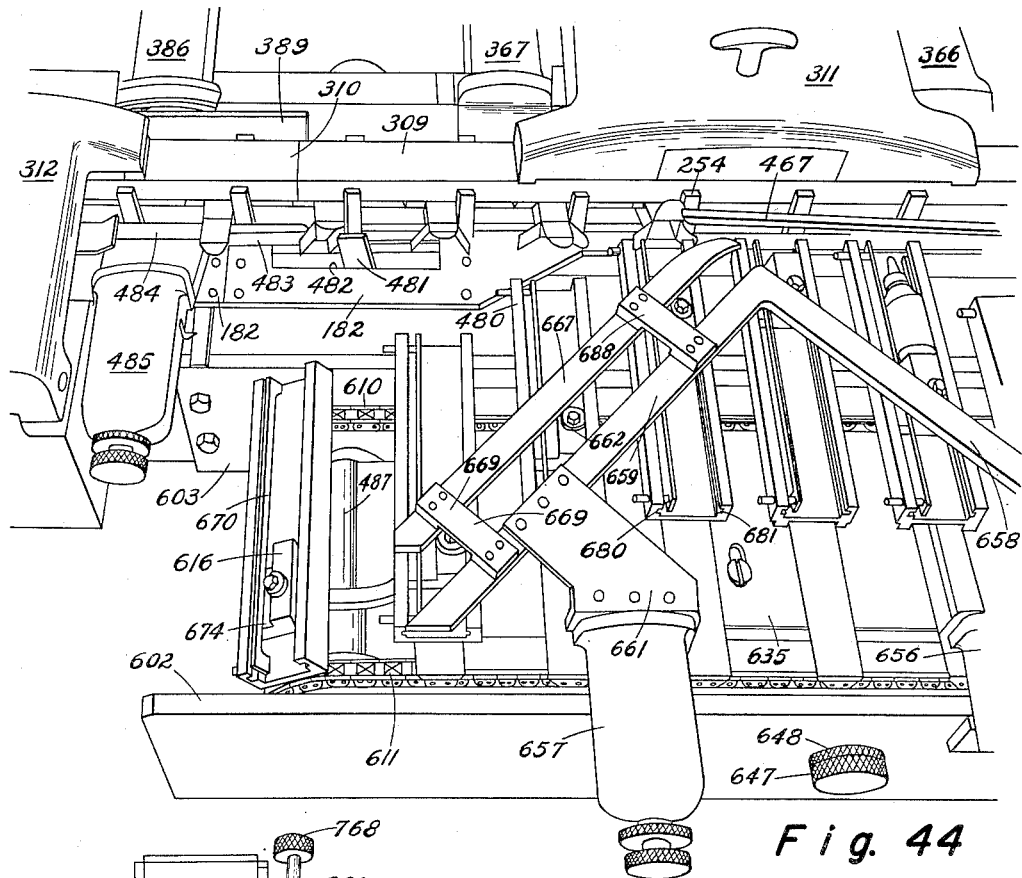
Figure 43:
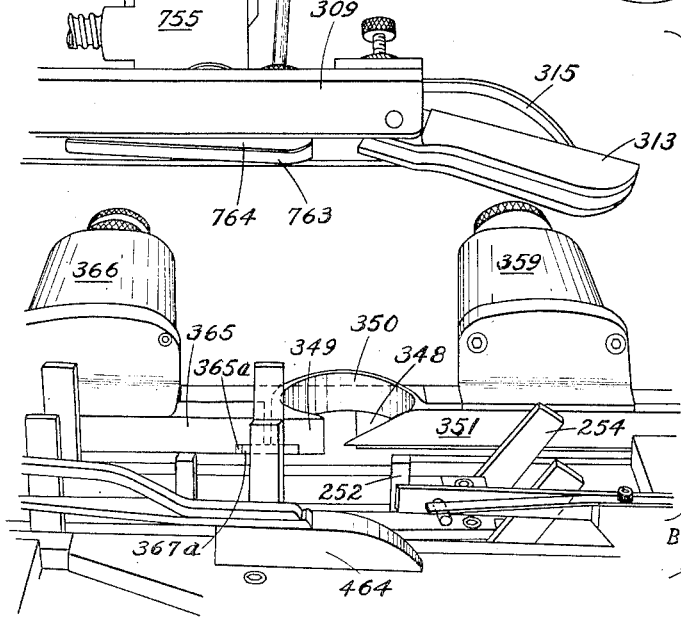
Figure 45:
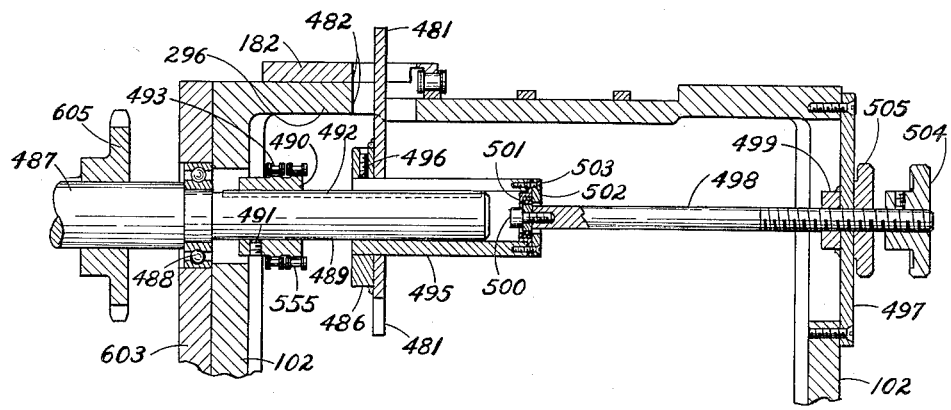
Figure 46:
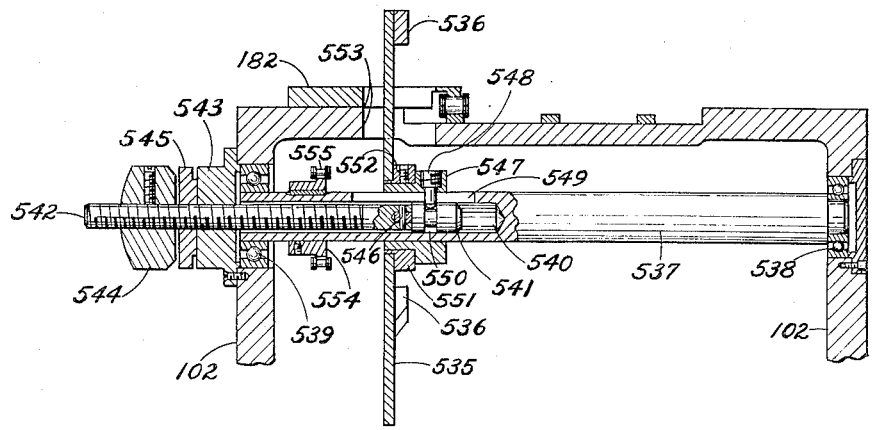
Figure 54:
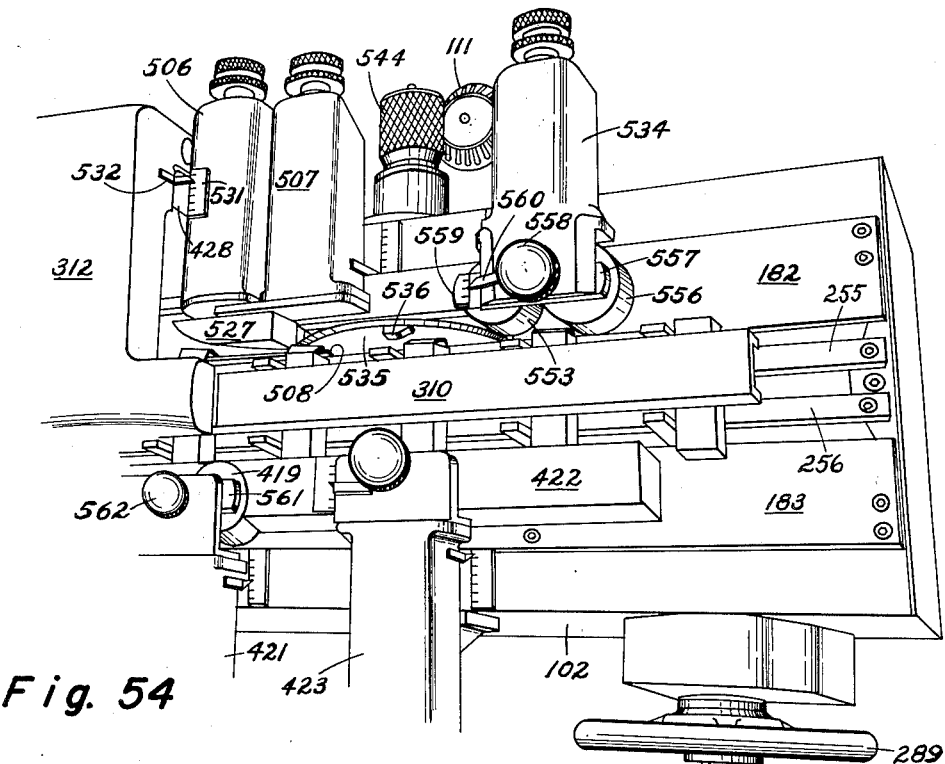
Figure 55:
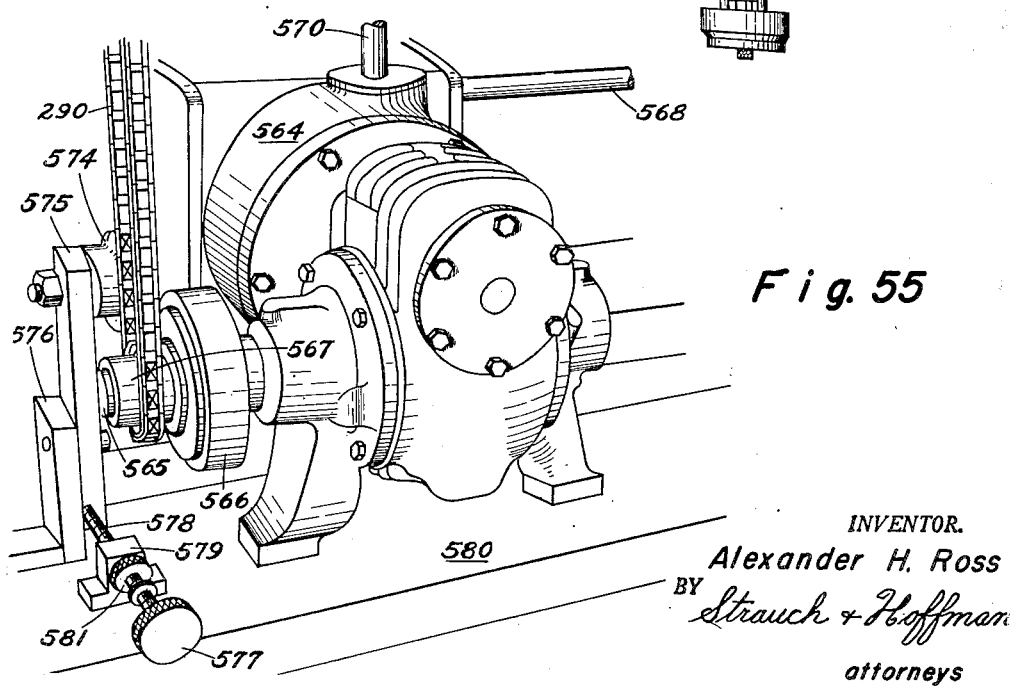
Figure 57:
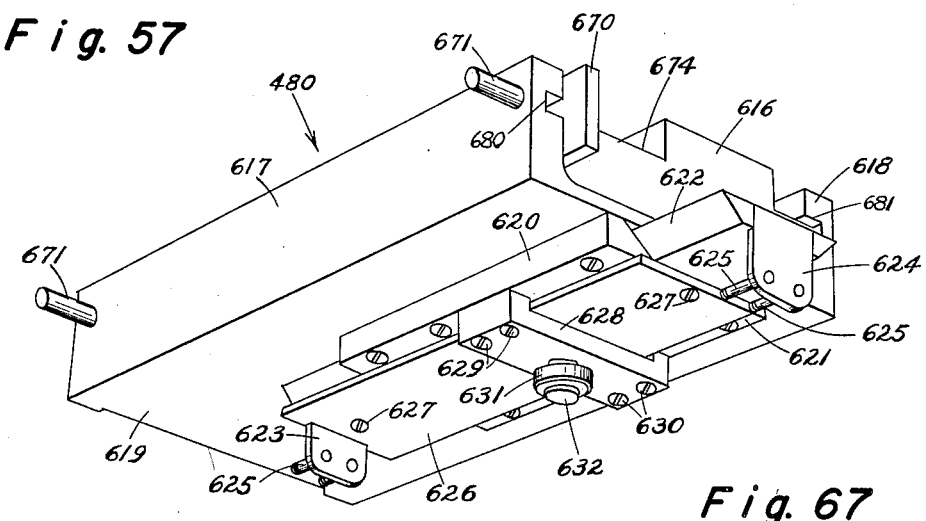
Figure 67:
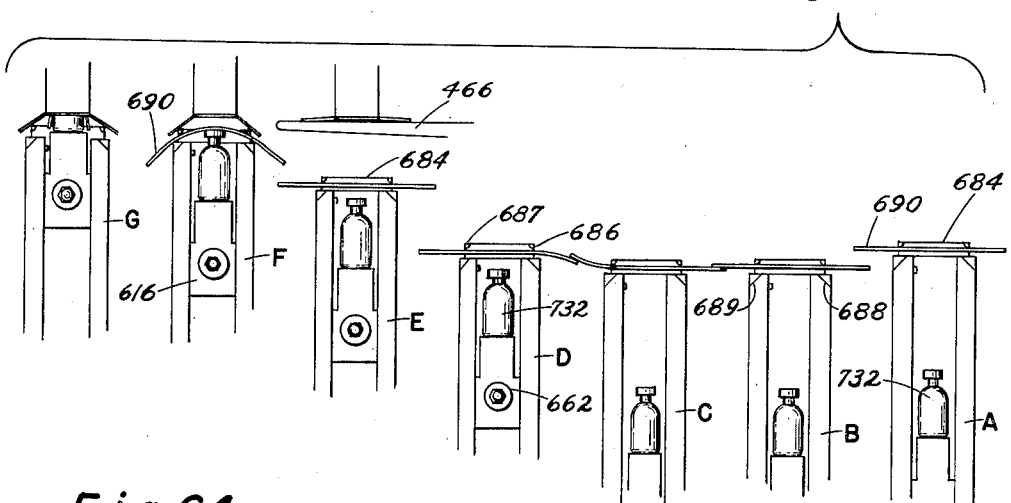
Figure 64:
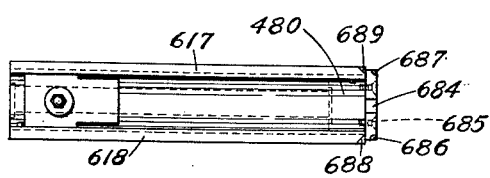
Figure 65:
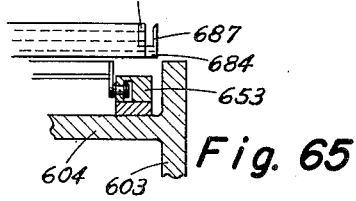
Figure 66:
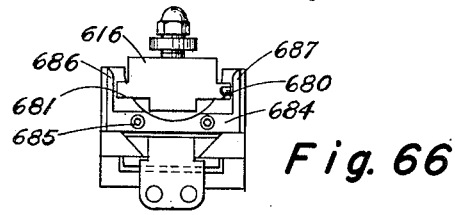
Figure 58:
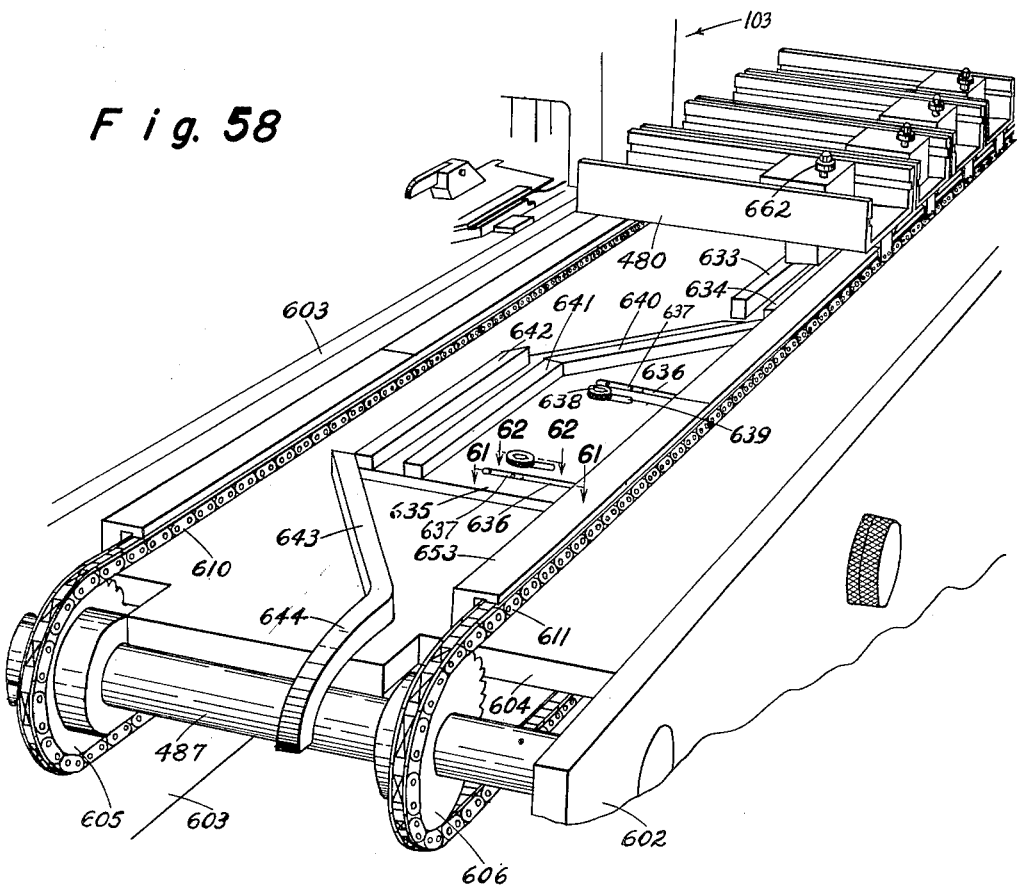
Figure 59:
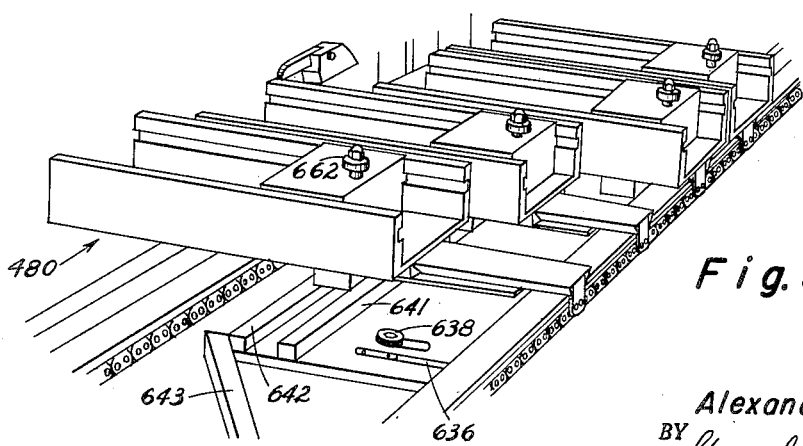
Figure 69:
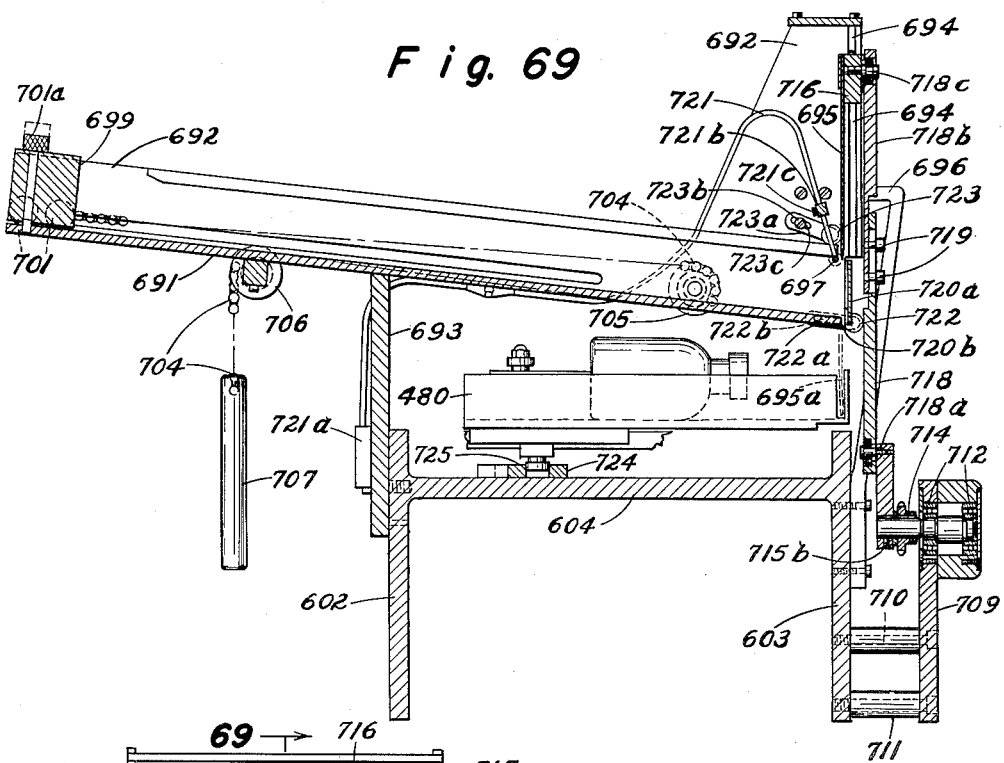
Figure 68:
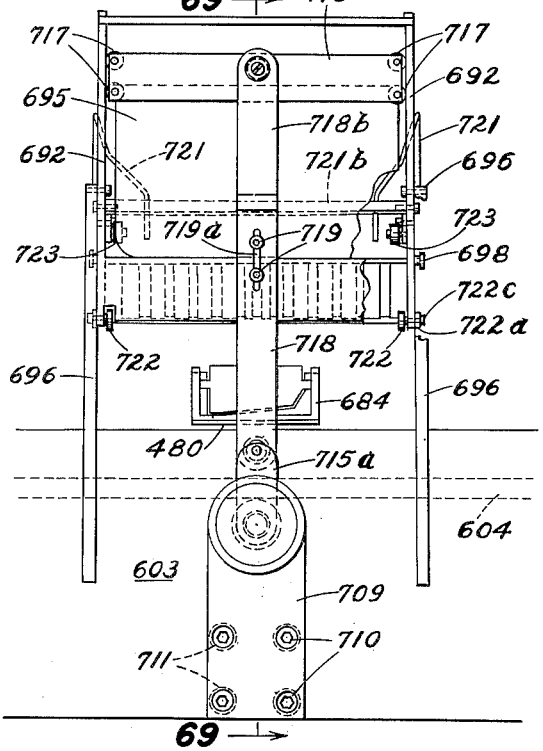
Figure 86:
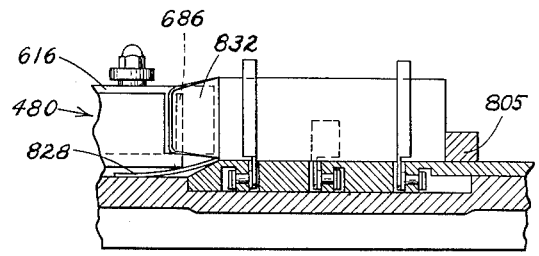
Figure 87:
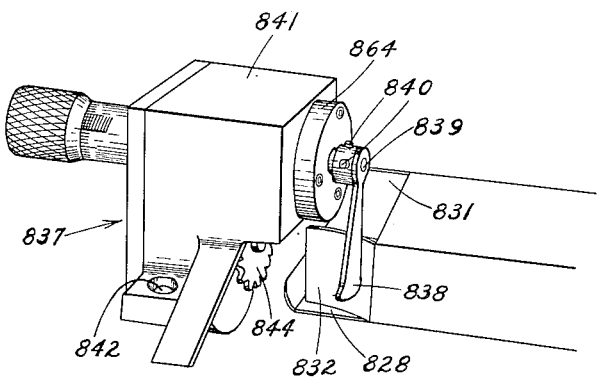
Figure 88:
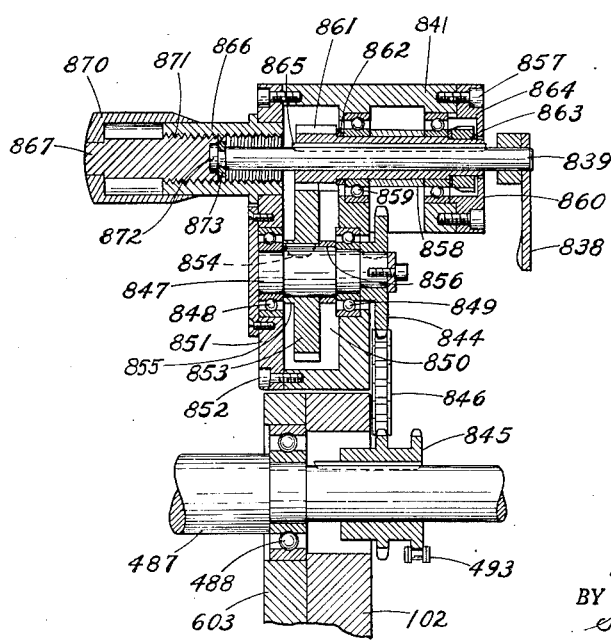

Figures 33 and 34 are sections substantially along the lines 33—33 and 34—34 of Figure 32;

Figure 35 is a transverse sectional view substantially through the center of the overarm and on the line 35—35 of Figure 4;

Figure 36 is a section substantially along the line 36—36 of Figure 35;

Figure 37 is a section substantially along the the line 37—37 of Figure 35;

Figure 38 is a top plan view of an assembly for inserting the tuck flap into the carton;

Figure 39 is a view in side elevation of the assembly of Figure 38;

Figure 40 is a sectional view substantially along the line 40—40 of Figure 39;

Figure 41 is a pictorial view of a portion of the machine showing how the end of the carton through which the load is to be inserted has its side and top flaps held open;

Figure 42 is a view showing a portion of the structure shown in Figure 41, but showing a carton which has not erected;

Figure 43 is a view of the same portion of the machine shown in Figures 41 and 42 but with the hold down bar raised;

Figure 44 is a view showing the cartons being loaded and the side flaps being closed;

Figure 45 is a sectional view substantially along the line 45—45 of Figure 3, showing the drive connection for the carton loading unit 106 and the means for closing the carton trailing side flap on its loaded end;

Figure 46 is a transverse sectional view showing details of the adjustment for the carton top flap closing disc;

Figure 47 is a perspective view showing the tuck flap creasing means on the loading side of the machine;

Figure 48 is an enlarged view similar to Figure 47 and showing a tuck flap being creased;

Figure 49 is a top plan view of the elements shown in Figures 47 and 48;

Figure 50 is a side elevation of the combination plow, back up bar and tuck flap guide of Figure 49;

Figure 51 is a side view of the tuck flap creasing device and the top flap closing plow of Figure 49;

Figure 52 is a section substantially along the the line 52—52 of Figure 51;

Figure 53 is a section substantially along the line 53—53 of Figure 51;

Figure 54 is a perspective view of the forward part of the machine where the carton end flaps are finally closed and the carton is discharged from the machine;

Figure 55 is a perspective view of the motor drive and speed control for the entire machine;

Figure 57 is a perspective view of one of the buckets on the loading unit;

Figure 58 is a perspective view of the forward portion of the loading unit with some of the buckets removed;

Figure 59 is a view similar to Figure 58 but with the buckets further advanced towards the front of the loading unit;

Figure 60 (Sheet 17) is a vertical transverse section through the loading unit in the plane of the adjusting means for the lower cam track, and substantially along the line 60—60 of Figure 3;

Figures 61 and 62 are vertical sectional views along the lines 61—61 and 62—62 of Figure 58;

Figure 63 (Sheet 13) is an end elevation view of one form of bucket for use in the loading unit;

Figure 63A is a top plan view of the bucket of Figure 63;

Figure 64 (Sheet 20) is a top plan view of a loading bucket which includes a support for an advertising pamphlet or instruction sheet or the like, carried in position to be inserted into the carton by the bottle;

Figure 65 is a side view of a portion of the bucket shown in Figure 64;

Figure 66 is an end elevation of the bucket, viewed from the right of Figure 65, with the guide tracks and chain omitted;

Figure 67 (Sheet 20) is a top plan view of a series of buckets showing how the pamphlets are inserted into the cartons;

Figure 68 is a side elevation view of the pamphlet magazine, looking at the end from which the pamphlets are inserted into the buckets;

Figure 69 is a sectional view substantially along the line 69—69 of Figure 68;

Figure 70 is a top plan view of the pamphlet magazine;

Figure 71 is a perspective view of a series of pamphlets showing the manner in which they are folded and aligned within the magazine;

Figures 72, 73 and 74 are enlarged views showing a sequence of operations during the feeding of a pamphlet from the magazine;

Figure 75 is a side view, partly in section, of the automatic merchandise loading unit 108 (Figures 1 and 2);

Figure 76 is an end view, partly in section of the devices of Figure 75, and taken substantially along the line 76—76 of Figure 75;

Figure 77 (Sheet 11) is a side elevation partly in section of the collapsed carton safety switch mechanism;

Figure 78 (Sheet 11) is a transverse section substantially along the line 78—78 of Figure 77;

Figure 79 is a perspective view of a "straight tuck" or "airplane flap" carton with its flaps open;

Figure 80 is a top plan view of a carton like the one of Figure 79, but in a flattened condition as it is moving from left to right while being transferred from the magazine to the transport;

Figure 81 is a top plan view of a portion of a machine which is adapted to handle "straight tuck" or "airplane flap" cartons;

Figure 82 is a side elevation of the portion of the machine shown in Figure 81;

Figure 83 is a substantially enlarged top plan view of a portion of Figure 81 with some parts cut away;

Figure 84 is a perspective view of a portion of the machine of Figure 81, showing a pair of cartons being erected and their flaps opened;

Figure 85 is a perspective view from another angle of the device shown in Figure 84 but with the cartons omitted;

Figure 86 is a transverse sectional view showing the relative positions of the carton, top flap, bucket and plunger during a carton loading operation of "straight tuck" carton, being similar to the right end portion of Figure 60 except for the type of carton being loaded;

Figure 87 is a perspective view of a rotating blade mechanism for closing the trailing side flap of the carton after it has been loaded;

Figure 88 is a sectional view through the device of Figure 87, in a vertical plane which includes the rotary shaft that carries the blade.

*General organization*

As shown in Figures 1 to 4, the machine comprises several main elements, which include a cabinet base 101; a cartoning machine base 102 which is secured to the top of the cabinet base; a carton magazine 103; a feed box 104 which is not visible in the assembly drawings of Figures 1, 2 and 3, because it is within the cartoning machine base 102, but which appears in Figures 8, 9 and 10; a transport indicated generally by the number 105, and which erects the carton and moves it past various stations where its flaps are closed and the articles of merchandise inserted; a carton loading unit indicated generally by the number 106, and which loads the articles into the cartons before their tops are closed; a magazine 107 for feeding instruction pamphlets or the like to the carton loading unit so that they may be inserted into the cartons together with the articles of merchandise; and an automatic merchandise loading unit 108 for loading the articles of merchandise to be packaged onto the carton loading unit. The cabinet base 101, which supports the entire machine, has castered wheels 109 so that it can be moved about, and houses the drive motor (Figure 55) that powers the machine. At 110 is shown a handwheel for adjusting the variable speed drive for the machine, 111 being a speed indicator. The flow of the articles handled by the machine is from right to left as viewed in Figures 1 and 2, the closed cartons being discharged from the left end of the machine. The machine shown in Figures 1 to 4 is arranged to handle "reverse tuck" cartons, one of which is illustrated in Figure 18 (Sheet 5).

Carton magazine

The carton magazine 103, while serving the same purpose as the magazine in my aforesaid application has several novel and improved features. The details of the magazine are shown in Figures 5, 6 and 7.

It comprises a housing substantially channel shaped in horizontal cross-section, having a vertical front wall 114 and vertical side walls 115 and 116. Inwardly projecting lugs or lips 117 on the bottom of the walls afford means by which cap screws 118 fasten the housing to the top of the cartoning machine base 102. Within the housing are four vertical guide elements 119, 120, 121 and 122 (also see Figure 3) which are horizontally adjustable to engage the corners of a vertical stack of flattened cartons. Each of the guide elements is angular in cross-section so that each element may engage two adjacent sides of the stack at a corner thereof. In order to facilitate the insertion of a stack, the upper ends of the guide elements are bent outwardly as shown at 125 in Figure 5.

In order to permit the magazine to accommodate cartons of various sizes, means for adjusting the spacing of the guide elements is provided. The two front elements 119 and 120 adjacent the front wall 114 of the housing are movable towards or away from each other, and the two rear elements 121 and 122, being carried by the same structure as the front elements, are simultaneously movable towards or away from each other together with the front elements. In addition, as will be described, means are provided to adjustably space each rear guide element from its respective front element.

All of the aforesaid guide elements and their supports are carried by a rectangular plate 126 which is attached to the front wall 114 of the housing by means of four cap screws 127 passing through the front wall 114, one at each of the four interior bosses 128. These bosses 128 space the plate 126 slightly from the front wall 114 and locate it in a vertical plane. Three horizontal strips 129, 130 and 131 are attached to the plate 126 at its top, center and bottom by rows of screws 132, but are slightly spaced from plate 126 by means of three narrower horizontal gibs 135, 136 and 137 which are also drilled for the passage of the rows of screws 132. Gib 136 is formed by two similar parts 136 and 136a (Figure 5) which are in longitudinal alignment but spaced at their adjacent ends for a purpose to be described. The narrowness of the gibs with respect to the strips provides two coplanar opposed pairs of horizontal guideways or tracks within which are mounted an upper slide block 138 and a lower slide block 139.

As will presently be apparent, the upper slide block 138 carries the guide elements 119 and 121. As viewed in Figure 5 the upper slide block 138 can move to the right through a distance indicated at 138R, and can move to the left through a distance indicated at 138L. Slide block 139 can similarly move to the right or left. As shown in Figure 6, the lower edge of slide block 138 has a longitudinal recess forming a shoulder to which a rack 140 with downwardly extending teeth is fixedly secured. In a similar manner a rack 141 with upwardly extending teeth is secured to the top of a shoulder formed by a recess in the top edge of slide block 139. The teeth of racks 140 and 141 engage the teeth on the top and bottom of a pinion 142 fixed to a shaft 143 rotatably mounted in and extending through the front wall 114 of the magazine. A knob 144 is affixed as by a set screw, to the outer end of shaft 143 whereby the pinion 142 may be rotated. As the knob 143 is rotated the slide blocks 138 and 139 will be shifted in opposite directions, moving the pair of guide elements 120 and 122 towards or away from the pair of guide elements 119 and 121 since one pair is carried by block 138 and the other pair is carried by block 139.

A block 147 (Figure 6) is secured to upper slide block 138 by screws 148. The guide element 119 is secured to the back of block 147 by screws 149. A dovetail guide arm 150 is secured to the side of block 147 by screws 151 and extends horizontally to the rear where it supports the rear guide element 121 for movement towards and away from the front guide element 119. As shown in Figure 6 the forward face of the block 147 is cut away at 152 to clear the horizontal strip 130 and the lower slide block 139.

A block 153 (Figure 5), similar to block 147, is secured to the back of the lower slide block 139 and cut away at 154 to clear the strip 130 and the upper slide block 138. The guide element 120 is secured to the back face of the block 153 by screws 155 and a dovetail guide arm 156 is fastened to the side of block 153, extending rearwardly and parallel to the dovetail guide arm 150. A plate 159 is mounted for horizontal sliding movement upon the guide arm 156 by means of upper and lower gibs 160 and 161 which have their lower and upper surfaces respectively inclined for sliding and mating engagement with the dovetail surfaces of the guide arm 156. The gibs are secured to plate 159 by screws 162.

A rotatable shaft 163 (Figure 5) passes through guide arm 156 and is journalled for rotatable and sliding movement in a boss 164 in the side wall 116 of the magazine. The inner end of shaft 163 has affixed thereto a pinion 165 which is received within an enlarged counter-bore in the guide arm 156. Axial movement of the shaft 163 with respect to guide arm 156 is prevented by plate 159 and by the shoulder at the root of the counterbore. The guide arm 156 has a longitudinal horizontal groove 166 on its inner face. A rack 167 having upwardly extending teeth is affixed to the outer side of the plate 159 so that it projects into the groove 166 and so that its teeth engage those on the lower periphery of the pinion 165.

A knob 168 is affixed to a shouldered cylindrical tube 169 the interior bore of which slidably receives the outer end of shaft 163. A key 171 in the shoulder of tube 169 engages a keyway 172 in shaft 163 to prevent relative rotation between the tube 169 and the shaft. From the foregoing description it will be apparent that when viewed as in Figure 4, clockwise rotation of knob 168 will move the plate 159 to the left and vice versa.

The rear guide element 122 is secured to and carried by the plate 159, so that rotation of the knob 168 adjusts the spacing between the guide elements 122 and 120. When the front knob 144 is turned to adjust the guide elements 120 and 122 towards or from the magazine side wall 116 the shaft 163 will slide within the tube 169.

The other rear guide element 121 is fastened to a plate 173 which is slidably carried by the dovetail guide arm 150 in the same manner that the plate 159 is carried by the dovetail guide arm 156, and the separation of guide elements 119 and 121 is similarly adjusted by a knob 174 affixed to a tube 175 journalled in a boss 176 in the side wall 115 of the magazine. The only difference is that the rack 177 engages the teeth on the upper periphery of the pinion 178 on the end of the shaft 179. Thus the three knobs 144, 168 and 174 provide means for quickly adjusting the spacing of the guide elements 119 and 122 to accommodate any size carton within the range of their adjustment. Each boss is provided with graduations as shown at 180 in Figure 5 whereby indicia marks on the knobs can be set at the proper graduations to preselect the positions of the guide elements.

A pair of table plates 182 and 183 (Figures 5, 1 and 3) are suitably fastened to the top of the cartoning machine base 102 and extend substantially its full length, providing a support for the outer ends of the cartons during their travel from the magazine 103 until they are ejected from the machine. As will be described later, plate 182 is in more than one piece and of varying width as shown in Figure 12, and as also shown in Figure 12 one section of it is replaced by a transversely adjustable cross slide 447. A separate plate 184 (Figures 1 and 5) supports the central portions of the cartons while they are being transferred from the magazine to the transport 105.

In view of the fact that different sizes of cartons are frequently of different thickness when lying flat in the magazine, means are provided to assure that only one carton at a time will be removed from the bottom of the stack by the feeder conveyor. This means comprises a vertically adjustable center guide bar 185. At its upper end it is provided with a slot 186 (Figure 7) through which passes a screw 187 threaded into the downwardly depending flange 188 on the inside of the top of the magazine front wall 114. A lug 189 is fixed to the front of the guide bar 185 and has threaded engagement with a screw 191 which passes through to the top of the magazine where it carries adjustment knob 192. A compression spring 193 keeps knob 192 in engagement with the top of the magazine and urges the guide bar 185 downwardly, thereby eliminating backlash in the threads. The knob 192 is provided with graduations which can be read against a fixed index mark to tell the gap between the bottom end of the bar 185 and the plate 184, this gap determining the thickness of the carton which can be fed from the magazine and preventing the feeding of more than one carton at a time. Adjacent its lower end the bar 185 has a second vertical slot 194 through which passes a screw 195 threaded into a vertically upwardly extending wall 196, the bottom edge of which marks the lower edge of the front wall 114. As shown in Figure 7A, the wall 196 is a continuation of the front wall 114, as is the wall 188 of Figure 7.

Feed box

The details of the feed box, which removes the flat cartons from the bottom of the stack in the magazine and feeds them one by one to the transport, is shown in detail in Figures 8, 9, 10 and 11.

The bottom plate 197 (Figures 9 and 11) rests upon bosses 198 on the inside of the cartoning machine base 102 and is secured to the base by cap screws 199. Vertical side walls 201 and 202 are secured to the bottom plate 197 by screws 203. The previously described table plates 182 and 183 rest upon the tops of the side walls 201 and 202 as shown in Figure 11. The feed box drive shaft 203' is journalled between the side walls and extends through the wall 202 where it carries a drive sprocket 204. Two sprockets 205 and 206 are fixedly attached to shaft 203' between the feed box side walls, and link chains 207 and 208 pass over these sprockets and over two aligned sprockets 209 and 210 mounted on a shaft 212 adjacent the other end of the feed box. The ends of shaft 212 are rotatably journalled in slide blocks 213 and 214, each slide block being slidable in tracks formed by the upper and lower edges of a slot cut in a side wall as shown at 215 in Figure 10. Yokes 216 close the open ends of these slots and are bored to slidably receive the threaded studs 217 and 218 which are seated in the slide blocks 213 and 214. A nut 219 on each shaft is turned to adjust the tension of the chains 207 and 208, and lock nuts 221 secure the nuts 219 against shifting.

On their lower run between the shafts 203' and 212 the chains 207 and 208 are unsupported. On their upper run however, the chains ride upon horizontal tracks 222 and 223 shown in Figure 11. A portion of track 223 is shown in Figure 8. These tracks are secured by screws 224 (Figure 8) to spacer bars 225 and 226 which are secured to the side walls 202 and 201 respectively by cap screws 227. Washers 228 separate the spacer bars slightly from the side walls as appears in Figure 8.

A series of feeder fingers 229 are attached to the inner side of chain 208, and a similar series of fingers 230 are attached to the inner side of chain 207, the leading edges of the fingers on the two chains being in transverse lines perpendicular to the chain travel so that two such leading edges will engage an edge of the bottom carton in the magazine at the same time. This disposition of the leading edges is shown in Figure 8. Each feeder finger is elongated in its direction of travel as seen in Figure 9 and is secured only at its trailing portion to its respective chain by means of the same pins which hold the chain links together, as indicated at 231 and 232 in Figure 8. This connection causes the fingers to extend substantially horizontally forwardly towards the transport 105 as shown in Figure 9, while the portion of the chain to which it is affixed is passing around and still horizontally tangent to the front sprocket.

Means are provided to support the leading portions of the feeder fingers so that they will extend upwardly the proper distance to engage the bottom carton in the magazine. Adjacent its leading edge each finger has an inwardly extending pin (Figures 8 and 11) 233 carrying a roller 234. As shown in Figure 11 a vertical plate 235 has a horizontal groove 236 in its outer face which forms a supporting track for the rollers 234 on the feeder fingers 239, the track extending beyond the shaft 203' as shown in Figures 8 and 9 to keep the fingers horizontal as previously described. The rollers 234 will leave the end of the track or groove 236 at the same time that the portion of the chain 208 to which the fingers are attached begins to change from a rectilinear to a curvilinear path when passing around the sprocket 206. By this time the carton which has been conveyed by these particular fingers will have come under the influence of the transport 195 as will be subsequently described.

At the end remote from the transport, the groove 236 is enlarged as shown at 237 and 238 in Figure 9 and as shown at 239 in Figure 8 to receive and guide the rollers 234 into the track or groove 236 after their respective fingers have passed around the sprocket 210.

As shown in Figure 11, the fingers 229 and 230 project above the upper surface of the table plates 182 and 183 as well as the central plate 184, so that they will engage the edge of the bottom carton in the magazine and convey it to the transport. Means to adjust the projection of the fingers above the plates are provided as follows. The vertical plate 235 is fastened to the chain track 223 by means of a pair of screws 242 and 243 which pass through vertical slots 244 and 245 in the plate, through spacing washers 246, and which are tapped into the track 223. When the screws 242 and 243 are loosened, the plate 235 is adjusted vertically to allow the fingers 229 to project the proper distance above the table plates 182 and 183, and then the screws are tightened to secure the plate 235 in place. The details of construction, and manner of support and adjustment of the vertical plate 247, whereby it supports the outer ends of the fingers 230, are the same as for the plate 235.

While the shifting of plates 235 and 247 will raise or lower the free or leading portions of the fingers it will not disturb the support of the chains by the tracks 222 and 223 since the normal amount of play between the chain links and pins will permit the leading portions of the fingers to be slightly raised or lowered without any appreciable buckling of the chains. The previously described slack adjustment for the chains permits proper adjustment of the tension therein to permit this play and reduce the buckling if the leading portions of the fingers are raised or lowered more than a nominal amount.

The plate 184 (Figure 11) which lies between the two table plates 182 and 183 is supported at its right end (Figure 9) by a post 248 which extends upwardly between the vertical plates 235 and 247 and is connected to a horizontal cross piece 249 extending between and mounted on the feed box side walls 201 and 202 by screws 251. At its left end in Figure 9 the plate 184 is bifurcated as shown in the plan view of Figure 12 to permit the central fingers 252 of the transport conveyor to round their sprocket on the tail shaft 253 (Figure 8). The side fingers 254 (Figure 12) of the transport are on either side of and to the rear of the central fingers 252, and intermediate surface plates 255 and 256 (Figures 12 and 15) together with the table plates 182 and 183 form a flat surface over which the cartons slide. The right ends of the intermediate surface plates 255 and 256 as viewed in Figure 13 are recessed at 257 to receive and support the bifurcated left end of the plate 184.

A presser foot assembly is generally indicated at 258 in Figures 4, 5 and 9, its purpose being to resiliently press down upon the flattened carton to keep it flat after being removed from the bottom of the stack and while it is being conveyed to the transport. A rectangular horizontally disposed plate 259 is attached by screws 261 to a vertical plate 262 having an elongated vertical slot 263 therethrough. A cap screw 264 having a handle 265 through its head passes through the slot 263 and is threaded into a lug 266 integral with the front wall 114 of the magazine. The horizontal plate 259 may thus be raised to clear a jam or the like by loosening the screw 264 and sliding the vertical plate 262 upwardly. A rearwardly extending lug 267 is attached as by screws (not shown) to the back of the plate 262 and has adjustable set screws 268 extending vertically therethrough where they engage an upper surface 269 of the lug 266. When returning the lower plate to its normal position after clearing a jam the set screws 268 determine its final setting, and this final setting can be changed for different thickness of cartons by adjusting the set screws.

The plate 259 has three longitudinal and vertically extending grooves 271 in its lower surface, as shown in Figures 5 and 9, and each groove receives a hold down bar 272 mounted for vertical movement in the groove by means of pins 273 and 274 which pass through vertical slots in the bars. Compression springs 275, one adjacent each end of the bars resiliently press the hold down bars downwardly against the flat cartons as they move towards the transport.

*Transport*

As previously described, the function of the transport 195 is to erect the cartons from their flattened to their normal rectangular configuration, and to continuously move them past various stations where the articles of merchandise are inserted and the carton end flaps are tucked in and closed. The transport therefore comprises primarily a horizontal surface formed by the table plates 182 and 183 and the intermediate surface plates 255 and 256, over which surface the cartons slide while the tucking and filling operations take place, these plates being shown in Figures 15 to 17 and also in Figure 12. Plate 182 is interrupted along its length so that it is in several sections as will be apparent as the description progresses.

In order to erect the cartons and move them along the transport, three conveyor chains 276, 277 and 278 (Figure 8) are provided. Each chain passes around two sprockets, one carried by the tailshaft 253 and the other by a headshaft 288. The tailshaft 253 (Figure 15) carries three sprockets 279, 280 and 281, each of which supports one end of the chains 276, 277 and 278 respectively. Sprockets 279 and 281 are keyed to the shaft. The tailshaft also has keyed thereto a fourth sprocket 282 over which passes a chain 283 (Figures 9 and 10) for driving the feeder. The tailshaft 253 is supported by ball bearing assemblies 284 mounted in the opposed side walls of the base 102 and the sprockets are located along its length by means of collars 285 and spacer washers 286, one of which has a reduced portion 287 upon which the sprocket 280 is mounted so it may be rotated with respect to the other two sprockets for a purpose to be described.

A headshaft 288 (Figure 16) is selectively rotated by a handwheel 289 or by a drive motor (Figure 55) through a chain 290 and is journalled in the opposed side walls of the base 102 by ball bearing assemblies 291 and 292. A pair of outer sprockets 293 and 294 are keyed to the headshaft 288 and carry the forward ends of chains 276 and 278 respectively. The central sprocket 295, while fixed to the headshaft for rotation therewith, is mounted thereon so that it is angularly shiftable about the axis of the shaft, and carries the other end of the central chain 277.

Between the tailshaft sprockets and the headshaft sprockets the side walls of the base 102 are connected by an integral top wall 296 (Figures 15 to 17) which has a continuous wide longitudinal groove 297 (Figure 17) in its upper surface thus forming a web 296a (Figures 13 to 17). The upper runs of the chains 276, 277 and 278 travel above this web 296a and their lower runs travel below it.

In order to support the upper runs of the chains in a horizontal plane tangent to the pitch circles of the sprockets, tracks 298, 299 and 300 (Figure 17) are provided for the chains 276, 277 and 278 respectively. Each track is narrow enough so that only the rollers of the chains ride on it, the sides of the links lying along the sides of the tracks. Each track is secured in place to the top surface of the web 296a by screws, not shown, and extends only for the length of the web 296a which extends only between the sprockets, as shown in Figure 13. The intermediate surface plate 255 is also secured to the top surface of the web 296a by screws which are not shown, and the other intermediate surface plate 256 is secured thereto in the same manner.

These plates 255 and 256 extend beyond the vertical plane which contains the tailshaft, as shown in Figure 13, and also beyond the vertical plane which contains the headshaft, to the discharge end of the cartoning machine base 102 as shown in Figure 1. In the region where it overlies the web 296a, the plate 256 has an integral overhang 301 (Figures 17 and 15) which overlies the central chain 277 and provides an upper guide which holds the chain rollers down so that the chain will not buckle.

The table plates 182 and 183, in the region where they overlie the web 196a, also have integral overhangs 302 and 303 respectively, as shown in Figures 17 and 15, to provide upper guides for the chains 278 and 276 and prevent them from buckling.

The central chain 277 carries the series of equally spaced central transport fingers 252 which extend outwardly from the chain and vertically upward above the plane of table plates 182 and 183 and have relatively thin downwardly extending integral portions 305 that form chain links through which the pins 306 pass, as seen in their side elevation in Figure 13. The rear faces of the fingers 252 are relatively wide, as seen in Figure 15, so that they will engage a considerable area of the cartons. When passing from the tailshaft to the headshaft above the web 296a the fingers are held substantly vertical by the confinement of the rollers of chain 277 between the track 299 and the overhang 301.

The outer series of equally spaced transport fingers 254 are attached to and carried by chains 276 and 278 in the same manner as the central fingers are carried, being held vertically erect by the tracks and overhangs which confine the chains. The outer fingers 254 are not as wide as the central fingers 252, but are longer, as is apparent from Figures 13 and 15. It will be apparent that after a carton is erected and while it is travelling through the transport its forward and rear faces will be confined between a central transport finger 252 and a pair of laterally aligned outer transport fingers 254. The bottom face of the carton will rest upon and slide over the surface formed by the four plates 182, 255, 256 and 183.

The cartons are held down against the said surface by a pair of longitudinally aligned hold down bars 309 and 310 (Figure 3) carried by overarms 311 and 312 respectively. As shown in Figures 15 and 16, the bars 309 and 310 are channel-shaped in cross section with their legs depending downwardly. In the illustrated embodiment the legs extend between the central transport fingers 252 and the outer fingers 254. Means providing for the vertical adjustment of the hold down bars to accommodate cartons of various heights will be described later.

Carton erection

As described in my aforesaid co-pending application, the cartons are erected from their flattened condition when they leave the influence of feed box 104 and while they are coming under the influence of the transport. In the instant invention however I have provided an improved erecting system and also provide means whereby one or more of the carton flaps are closed during the erecting operation.

A conventional "reverse tuck" type carton is pictured in Figure 18. It will be seen that when the carton is flattened it has one dimension equal to H plus W which is its total width when flattened. However, when the carton is erected its width is reduced to the W shown in Figure 18.

The improved method and apparatus by which the cartons are erected by the transport is illustrated in Figures 9, 13 and 14. In Figure 9 is shown the relationship of the feeder fingers 229 when a pair of them has nearly reached the end of their forward stroke and have pushed a carton C to proper position to come under the influence of the transport fingers. The apparatus is so timed that the carton C reaches this position as the proper portion of the leading edges of the outer transport fingers 254 are coming into the plane of the surface upon which the carton is resting, as shown in Figure 9. The leading edge of the carton is adjacent the central transport finger 252, which is just clearing the sprocket 280 and is moving in a rectilinear path.

Figure 9 shows a fully erected carton B engaged between fingers 252 and 254 moving in a rectilinear path and with a longitudinal spacing indicated at W, the width of the carton. The next carton C has not yet been engaged by the transport fingers which will have a longitudinal spacing at least as great as that shown at W plus H when the leading edge of fingers 254 intersects the upper surface of plate 184 and the trailing edge of the carton C. In Figure 13 the longitudinal spacing of the fingers is still greater than W, since the trailing fingers 254 have not completed their rounding of the sprocket. Here the carton C is partially erected and the longitudinal distance between its contacts with the fingers is shown as W plus Y, and Y is less than H. Figure 14 shows the carton fully erected, and the longitudinal spacing between the fingers has been reduced to its minimum value W. Thus the cartons are erected by the squeezing of the fingers upon their forward and rear edges which results when the longitudinal spacing between the fingers is reduced as they pass from a curvilinear to a rectilinear path, and the system so far disclosed is similar to that disclosed in my co-pending application Serial No. 616,723.

An improvement in the system results from the application of the devices shown in Figures 13 and 14 where the hold down bar 309 does not extend as far towards the magazine as disclosed in my aforesaid application. A flop weight 313 which is channel shaped in cross section is pivotally attached at one end to the hold down bar 309 by a suitable pin 314. A spring 315 is attached to the over arm and presses down upon the free end of the flop weight 313. The purpose of the flop weight is to hold the trailing portion of the carton down and against the leading edges of the side fingers 254 while the fingers 254 are rounding their sprockets. By resiliently holding the cartons down in this manner their trailing portions are prevented from riding upwardly upon the inclined leading edges of the fingers 254 while the cartons are being erected, as is shown in Figure 13. The limit of the downward swing of the free end of the flop weight is determined by a vertically adjustable screw 316 threaded through the web of the hold down bar 309. The bottom of the screw 316 engages the top of the flop weight behind its pivot and after being set the screw is locked in position by a nut 317.

As previously mentioned, the center sprocket 295 on the headshaft 288 is fixed to but angularly adjustable about the axis of the headshaft while the central sprocket 280 on the tailshaft 253 is rotatable about the tailshaft. This is for the purpose of changing the position of the central chain 277 with respect to the side chains 276 and 278 whereby the longitudinal spacing W (Figures 9 and 14) between the central fingers 252 and the side fingers 254 may be adjusted. This adjustment is the same as that described in my aforesaid co-pending application. As shown in Figures 16 and 19, a bushing 318 is keyed to the headshaft and has a radial flange 319 with an annular groove 320 therein. The central sprocket 295 is journalled for rotation on the bushing and has a worm wheel 321 attached to it as by rivets 322. The worm wheel 321 is nested within the groove 320 where it is engaged by a worm 323 (Figure 19) lying within a notch in the flange 319 and fixed to a shaft 324 journalled in the flange. The periphery of the flange 319 has a notch for the head of shaft 324, the head being shaped to receive a wrench for turning the worm. Rotation of the worm changes the angular position of the sprocket 295. Access to the head of shaft 324 is through a hole 326 (Figure 9) in the intermediate surface plate 256. The shaft 324 has a friction fit in the flange 319 so that its setting will not be disturbed during operation of the machine.

*Feed box and transport phase adjustment*

An examination of Figures 9, 13, 14 and 18 shows that a carton C (Figure 9) in its flattened condition has a dimension from its leading to its trailing edge of H plus W (Figure 18), but that after it is erected its dimension from its leading to its trailing edge is reduced to W. The carton of Figure 9, when erected, is almost square in cross-section. Figure 20 shows a carton D having a dimension from its leading edge to its trailing edge of H plus W which equals the H plus W of the carton of Figure 9 but having a smaller height and greater width when erected, to form a more rectangular carton.

In order to accommodate the carton D of Figure 20 a different setting of the sprocket 295 on the headshaft is required, so that the distance W between the central fingers 252 and the side fingers 254 is increased. At the same time the hold down bar 309 and its attached flop weight must be lowered, to compensate for the decreased height of the carton.

The carton D of Figure 20 is not reduced as much in width when erected from its flattened condition to its erect position as is the carton C of Figure 9. To accomplish this, the point at which the side fingers engage the trailing edge of the flattened carton is changed as can be seen by comparing Figure 20 with Figure 9. In Figure 9 the side fingers 254 of the transport engage the trailing edge of the carton adjacent the outer ends of the fingers and before the feeder fingers 229 have reached the end of their forward travel. In Figure 20 the side fingers engage the trailing edge of the carton later, and farther from the outer ends of the fingers, while the feeder fingers 229 have pushed the carton farther onto the transport. Thus the timing of the feeder fingers 229 is variable so as to deliver the carton later when the height of the carton increases, and earlier if the height of the carton decreases. This timing varies in direct proportion to the H dimension of the carton.

Means for varying the timing of the feed box with respect to the transport are shown in Figures 8, 9, 10 and 11. A vertical plate 329 is pivotally mounted onto the side wall 202 of the feed box by a pin 330 so that the plate is rotatable about a horizontal axis. The plate has an extension 331 protruding forward of the side plate 202 where it journals a sprocket 332, lying in the same vertical plane as the sprocket 282 (Figures 8 and 15) on the tailshaft and the drive sprocket 204 on the feed box drive shaft 203. A take-up sprocket 333 lies in the same plane, being journalled on the forward end of a lever 334 pivotally mounted on the side wall 202 of the feed box in the same plane as plate 329 by a pin 335.

The angular position of the plate 329 is adjusted by a knob 336 (Figure 9) fixed to a screw 337 which has a threaded passage in a block 338 pivotally attached to the side of plate 329 by a pin 339. A tension spring 340, connected to plate 329 and side wall 202 by pins 341 and 342 respectively, urges the plate 329 clockwise about its pivot pin 330 as viewed in Figure 10 so that the underside of knob 336 bears upon the upper surface of a feed box cover plate 343. The lever 334 is urged in a counterclockwise direction as viewed in Figure 10 by a tension spring 344 connected to plates 329 and 334 by pins 345, so that the sprocket 333 will take up the slack in chain 283. The right end of lever 334 engages the underside of plate 329 under the influence of spring 344.

It will be apparent that if sprocket 332 is raised by the clockwise rotation of plate 329, sprocket 333 will be simultaneously lowered to take up the resulting slack in the chain 283 by the counterclockwise rotation of lever 334. The lever 334 and plate 329 are so dimensioned that the right end of lever 334 will always contact the underside of the plate 329.

When the sprocket 332 is raised in the aforesaid manner the phase relationship between the feed box conveyor and the transport conveyor is changed so that the feeder fingers 329 will deliver the flattened cartons to the transport fingers a little later. Such a timed relationship of delivery of the flattened carton is illustrated in Figure 14. If on the other hand the sprocket 332 is lowered, the flattened carton will be delivered to the transport fingers a little earlier, which timed relationship is illustrated in Figure 20. It will be noted in Figure 20 that the feeder fingers 229 are substantially at the end of their forward movement when the transport fingers 252 arrive in position to pick up the carton, whereas in Figure 9 the feeder fingers 229 are farther from the end of their forward movement.

Flap folding and tucking

Referring to Figure 18 it will be seen that as the carton is removed from the magazine 103 and conveyed through the transport it will have a leading and a trailing side flap at each end of the carton. One of the features of the instant machine is an improved system of closing the side flaps on one end of the carton. The corresponding flaps on the other end of the carton could be simultaneously closed in the same manner, but they must be left open for the insertion of the article to be packaged. Accordingly, another feature of the machine is a system of opening the flaps on the other end and holding them in open position for the reception of the articles at the same time that the first mentioned system is closing the side flaps on the first mentioned end. Both of these improved systems operate in conjunction with the previously described mechanism for erecting the cartons by reason of the fact that the flaps on each end of the carton are properly positioned partly as a result of the movement of the carton during its erection.

The element which operates upon one end of the carton to close its two side flaps is a combination parting blade 348 and reversing plow 349 shown in Figures 3, 24, 25 and 27. The reversing plow 349 is part of an integral element including a loop 350 and a leg 351 which has a plow portion 352 at its rear end. The entire element is attached to a vertical wall 353 of an angle 358 by means of cap screws 354 which pass through horizontal slots 355 in the leg 353 whereby the reversing plow may be adjusted longitudinally of the machine. Graduations 356 on the leg 351 can be read against an index mark 357 on the wall 353 when setting the reversing plow assembly. The angle 358 is fixedly mounted upon a compound 359 which is attached to the side wall of the cartoning machine base 102 and which adjusts the lateral position of the reversing plow assembly. The details of construction of a compound, by which it provides this lateral adjustment, will be described later.

The parting blade 348 is affixed, as by screws, to the underside of the reversing plow 349 and the leg 351, and is slightly spaced above the top surface of the table plate 183 so that the top flap of the carton can pass between them. As shown in Figure 25 the table plate has a depression 360 in its upper surface, and the rear edge 360a (towards the magazine) of the parting blade is bent downwardly, extending slightly into the depression.

Each of the forward guide elements 119 and 120 of the carton magazine have attached at their bottom ends a plate 361. Each plate 361 has threaded therethrough a screw 362 which has a roller 363 journalled on its end. The rollers are advantageously in the form of ball bearing assemblies with the inner race affixed to the end of the screws 362 and their outer races forming the rollers. The rollers may be adjusted towards or away from each other by turning the screws 362, and locked in place by nuts 364. As shown in Figure 25, the bottom of the roller 363 on the guide element 120 extends into the depression 360 and below the downwardly bent portion 360a of the parting blade. The lateral position of the roller 363 is such that it does not engage the side flaps of the flattened carton as it emerges from the magazine but does engage the relatively longer top flap to depress and guide it below the parting blade.

After the leading edge of the top flap passes under the roller it engages the gradually rising top surface of the depression 360 and eventually passes into the space between the parting blade 348 and the table plate 183. In the meantime the downwardly bent portion of the parting blade has passed under the two side flaps of the carton which were not depressed, and they ride over its upper surface until their leading edges engage the plow 352 on the rear portion of the leg 351. The plow 352 slides under the flaps and successively raises them to a substantially vertical position. Figure 27 shows the carton in several positions while engaging the parting blade and reversing plow assembly.

In the first position shown, at the left of the figure, the leading side flap is just beginning to be bent upwardly by the plow 352 and the trailing side flap is riding over the parting blade, while the top flap has nearly disappeared under the parting blade. During this period the body portion of the carton is still confined under the presser foot assembly 258, previously described in connection with Figure 9. In the second position shown, both of the side flaps are still extending substantially upwardly but are beginning to also extend to the right because the carton has now been picked up by the transport fingers, and is partially erected.

In the third position the carton is almost erected. Due to the fact that the carton side walls are now nearly vertical, the leading side flap has been rotated until it extends forwardly of its hinge and is almost parallel to the leg 351. As it rotates it slides down the inclined portion 351a at the forward end of the leg 351 which facilitates and guides its entry into the space between the forward end of leg 351 and the reversing plow 349. The trailing side flap has been similarly rotated and now extends forwardly to partially close the end of the carton. The carton has become fully erected before passing to its fourth position. Although the side flaps have been bent substantially at right angles with respect to the side walls of the carton, there is sufficient resiliency at their hinge joint to impart to them a tendency to straighten out again. This tendency, together with the fact that the carton is still erecting when passing from the third to the fourth position, causes the leading side flap to enter the space between the end of the leg 351 and the reversing plow 349. Continued movement of the carton causes the reversing plow to rotate the leading side flap through 180 degrees so that it overlies the trailing side flap as shown in the fifth position of the carton. Attention is directed to the fact that the leg 351 lies closer to the end of the carton than does the plow 349, as shown in the plan view of Figure 24. Thus if the carton is so proportioned that the leading side flap does not overlap the trailing side flap to hold it closed, the trailing side flap will not enter between leg 351 and plow 349 but will pass this gap and remain in its closed position. During the erection of the carton and the closing of the side flaps the top flap has remained in horizontal position, confined between the parting blade 348 and the table plate 183. The parting blade ends at the loop 350, whereupon the top flap passes under the plow 349.

When the carton is in the fifth position of Figure 27 it is in condition for further operations to close the top flap. If the machine is of the "semi-automatic" type, which erects the carton and closes only one end of it, the closing of the top flap would be the next step. In the instant machine however the top flap closing is delayed while the carton is being loaded through the other end. For this reason, an elongated back up bar 365 (Figures 3 and 43) is provided, carried by two spaced compounds 366 and 367, mounted on the side wall of the cartoning machine base, one on each side of the overarm 311. It is spaced slightly above the table plate 183 to permit the top flap of the carton to pass therebetween.

The back up bar 365 keeps the side flaps closed, and forms an abutment preventing transverse movement of the carton while it is loaded at the other end. It is transversly adjustable by means of the compounds 366 and 367 to accommodate cartons of different lengths. When adjusting it, both compounds 366 and 367 should be adjusted at the same time. The reversing plow 349 carries a short forward extension 367a which holds the side flaps of the carton closed while the carton is passing the gap between the plow 349 and the bar 365, as shown in Figure 27. The forward end of the extension slides in a slot 365a (Figure 43) so that the gap will be closed irrespective of the longitudinal position of the plow 349 as adjusted by the cap screws 354.

The details of construction of compound 366, by which transverse adjustment is accomplished, are shown in Figures 28 and 29. The previously mentioned compounds 359 and 367 are similarly constructed, as are the other nine compounds shown in Figure 3, so that this description covers all of the compounds, it being understood that the compounds provide structures by which the various elements carried thereby may be adjusted transversely of the machine so that cartons of varying lengths may be accommodated. The principal components of a compound are a hollow movable slide block 368, an angle bracket 369, and an adjustment spindle 370 rotatable in the slide block and threaded through a nut 371, integral with the bracket 369 and extending into the hollow portion of the slide block. Turning a handle 372 affixed to the spindle shifts the slide block, and a locknut 373 locks it in place. Outwardly opposed flanges 374 on the bracket 369 have sliding engagement in grooves provided by flanges 375 and gibs 376 on the slide block. The face plate 377 may be bored and threaded to receive any suitable fitting such as the bracket 378 of Figure 27, by which means the desired element is attached to the compound.

A horizontal dovetail 379 is attached to the side of the base 102 by screws 380. The bracket 369 is provided with a mating dovetail groove 381 and is clamped to the dovetail 379 in any desired longitudinal position thereon by means of a gib 382 which is tightened by screws 383. The dovetail mountings of the compounds permit a longitudinal adjustment of the elements carried thereby so that they may be shifted longitudinally which may be necessary in the event of cartons which vary greatly from the average size of cartons for which the machine is designed. They also facilitate the initial setting up and adjustment of the machine during which the elements carried by the compounds are positioned for their most effective operation. As seen in Figure 4, a single dovetail 384 mounts the compounds 359 and 366, and another single dovetail 385 mounts four compounds carrying elements now to be described.

The description of the devices by which the flaps are closed on the cartons opposite their loading end will now be resumed. It will be seen from Figure 3 that the back up bar 365 extends to the right and overlaps a portion of the next compound 386. As mentioned before, this is for the purpose of holding the carton while it is loaded through the other end. The compound 386 carries a tuck flap creaser assembly shown generally at 387 in Figure 30, with a carton shown at various stages in its passage past it.

As shown in Figures 30 to 34, the assembly 387 comprises a plow 388 which is mounted directly upon the face plate of the compound 386 by screws 393. The bottom of the plow lies closely adjacent or against the upper surface of the table plate 183 so that the leading edge of the carton tuck flap will rise, when it engages it, towards a vertical position (see Figure 30). A hold down bar 389 is mounted upon the plow 388 by screws 390, but a thin spacer plate 391 and a plow plate 392 space the hold down bar 389 from the plow 388, forming a slot 394 between the plow 388 and the plow plate 389, to form a passage for the carton tuck flap after it is bent to vertical position by the plow 388. The hold down bar 389 holds the outer end of the top flap down while the tuck flap is being bent upwardly.

The hold down bar 389 ends at 395 but has a horizontal extension 396 which extends forwardly to the end of the plow plate 392, and is secured by screws to the underside of the hold down bar and spaced above the table plate 183 to permit the carton top flap to pass therebetween. Forwardly of the end 395 the plow plate 392 extends downwardly to the plane of the extension 396, and its leading edge, or the edge presented to the advancing tuck flap, is bent outwardly at 397 (Figures 30 and 31) so that when the tuck flap passes the end 395 of the hold down bar it will be deflected by the bend 397 so as to pass between the plow plate 392 and the extension 396. At the forward end of the plow plate 392 is attached, as by brazing, a crease over plow 398 which bends the tuck flap towards the carton, as seen in the third position of the carton in Figure 30, whereupon, after passing the plow, the tuck flap will spring back slightly and be in proper angular relation with the top flap so that it is substantially in position to be inserted into the carton when the top flap is raised.

After leaving the assembly 387 the top and tuck flaps are subjected to the joint action of a plow 399 carried by a compound 400, and a transversely adjustable assembly carried by the overarm 312 and indicated generally at 401 in Figures 3 and 4 and also shown in Figure 35. The overarm 312 includes a transversely adjustable slide 402 confined in a wide groove 403 in the overarm by a pair of gibs 404. A nut 405, affixed to the top of the overarm by a bolt portion 406 threaded into a handle 407, is transversely threaded to receive a screw 408 rotatably journalled in the slide 402 but fixed against axial movement with respect to the slide. The slide 402 is transversely adjusted by turning the handle 409 on the screw 408 and locked in position by a locknut 410.

Figures 38 to 40 show details of the assembly 401 carried by the slide 402. A downwardly extending plate 411 screwed to the outer face of the slide 402 serves as a fitting to carry the assembly. An elongated longitudinally extending blade 412 is attached to the plate 411 as by screws 413. As best shown in Figure 3, the inner face of blade 412 lies in the same plane as the inner face of the back up bar 365, and the rear end of blade 412 abuts the forward end of the back up bar, so that the blade 412 continues to hold the side flaps of the carton closed, and to hold the carton against transverse movement. The top flap of the carton passes under the blade 412. Beginning at a point opposite to the plow 399 (Figure 3) and extending to the forward end of the blade, the blade 412 has a horizontal slot 414 therethrough which provides a passage for the tuck flap and guides it into the end of the carton as the top flap of the carton is raised by the plow 399. Since the point at which the tuck flap enters the carton is determined by the height of the carton, the slot 414 is raised or lowered, depending upon the height of the cartons being filled, by the raising or lowering of the overarm 312 which is accomplished by turning a knob 443 (Figure 35). Thus the position of the slot 414 will always have a fixed position with respect to the hold down bar 310 which is necessarily raised or lowered according to the carton height.

In order to guide the carton tuck flap through the slot 414 a curved guide plate 416 is mounted on the outer face of the blade 412 by a spacer bar 417, the under surface of which provides a continuation of the guiding surface as shown in Figure 40. The plow 399 is so disposed with respect to the guide plate 416 that it begins to raise the carton top flap as the leading edge of the top flap begins to pass under the guide plate 416. As the steepness of the side wall of the plow 399 increases, the top flap is continuously raised to a near vertical position. During the raising of the top flap the tuck flap moves upwardly and inwardly towards the carton, its top edge being guided into the slot 414 and into the end of the carton by the guide plate 416 and the spacer bar 417. When the carton passes beyond the forward end of the blade 412 and the plow 399 its tuck flap has been properly inserted into the carton and the top flap is almost vertical.

As the carton continues its forward movement, the top flap first engages a small roller 418 which closes it further, and then a larger roller 419 which pushes it to fully closed position. The rollers are journalled in ball bearings on a bracket 420 for rotation about vertical axes, the bracket 420 being mounted on a compound 421 so that the rollers are transversely adjustable.

After leaving the final closing roller 419 the closed end of the carton passes along a back up bar 422 which holds the carton against transverse movement while the flaps on the loading end are being fully closed. The bar 422 is mounted upon a compound 423 for transverse adjustment.

*Overarm adjustment*

As mentioned before, the hold down bars 309 and 310 are carried by overarms 311 and 312 respectively, which are vertically adjustable to raise or lower the hold down bars to accommodate cartons of various heights. While the two overarms are mounted upon opposite sides of the cartoning machine base 102 they are of identical construction. In the illustrated machine for reverse tuck cartons however, since the rear overarm 311 does not carry anything except the hold down bar 309, the transversely adjustable slide 402 is omitted and the open end of the groove 403 is covered by a plate 424 (Figure 15).

Each overarm includes a bracket 425 (Figures 35 and 37) affixed to the side of the base 102 as by screws 426. Dowel pins 427 prevent any shifting of the brackets upon the base. A vertically sliding block 428 is mounted upon a dovetail 429 by a pair of gibs 430 which provide means to take up any wear. Each overarm 311 and 312 is pivotally attached to its respective sliding block 428 by a pair of pintles 431 screwed into the sides of the slide block. At the top center of the slide block an integral knee 432 extends under the overarm and is provided with a set screw 433 which may be locked by a nut 434, the set screw providing a stop for the overarm to hold it in horizontal position when lowered.

A threaded bushing 435 is fixed in a vertical counterbore in the bracket 425 to threadedly receive a screw shaft 436 which is journalled for rotation in the knee 432, being held against axial movement in the knee by upper and lower collars 437 and 438. The upper collar is pinned to the screw shaft and has a diametrical groove 439 in its upper surface to engage a mating tooth on a bottom flange 441 of a shaft 442 slidably and rotatably journalled in the top wall of the overarm. Shaft 442 is rotated by turning an attached knob 443, and is urged downwardly by a coiled compression spring 444. Thus the overarm with its slide block 428 is raised or lowered by turning the knob 443. That part of the screw shaft 436 which protrudes below the threaded bushing 435 extends into an unthreaded bore 445 in the bracket 425.

*Tuck and flap operations on loading end of carton*

That end of the carton into which the merchandise is loaded must have its side and top flaps held upon until after the merchandise is inserted. Figures 21, 22, 23 and 26 show the details of an assembly for opening and holding open these flaps until they are engaged by the buckets of the loading unit 106. The assembly, shown operating upon the carton flaps in Figure 26, is mounted for unitary transverse movement upon a cross slide 447. The cross slide is of the same height as the table plate 182 which is cut away at that point and presents overhanging ledges 448 and 449 to guide the cross slide and hold it against the top of the cartoning machine base. A parting blade 450 is mounted upon the cross slide by screws 451 but is spaced from its upper surface by a spacer block 452 (Figure 23) to provide a passage for the carton flaps under the parting blade. A back up bar 453 overlies the parting blade and the spacer block 452 and extends toward the magazine end of the parting blade to stiffen it, being attached to it by screws 451 and 454.

The parting blade 450 extends toward the magazine and at its rear edge has a pointed portion 455 extending into the depression 360. Roller 363 carried by guide element 119 of the magazine extends slightly below the pointed portion 455 to depress the top flap of the carton and guide it under the parting blade. The trailing side flap, which lies under the top flap, also goes under the blade. The leading side flap, which does not extend outwardly far enough to be depressed by the roller 363, rides up onto the top of the parting blade. A plow 456 is suitably affixed to the top of the parting blade, to bend the leading side flap upwardly to a near vertical position as shown by the carton in the third position of Figure 26.

A longitudinal bar 457 is hingedly attached to the plow by a pin 458 for movement about a transverse axis. The plow has a recess in its face adjacent the cartons, the bar 457 lying in the recess so that its face is flush with the face of the plow on the carton side. The carton is erected when it is passing the bar 457, the mechanics of its erection having been previously explained. In the illustrated embodiment, which is for a reverse tuck carton, the top flap and the underlying side flap emerge from under the forward edge 459 of the parting blade as the carton is being erected. Since the relatively long top flap is lifted upwardly during the carton erection by the underlying side flap, it will raise the bar 457 slightly. The back up bar 453 engages the end of the carton top flap during this stage, as shown in Figure 26, to prevent transverse shifting of the carton under influence of forces resulting from the operations on its other end at the time.

The upward movement of the bar is resiliently resisted by a spring 460 fastened to the plow 456 and engaging a pin 461 near the free end of the bar. When the carton has cleared the bar 457 the bar will drop with a resulting shock to its pivot 458. To prevent this shock a spring 462 (Figure 21) is fixed to the plow and engages the under side of bar 457 to cushion its drop. The forward edge 459 of the parting blade has a lip 463 extending forwardly and upwardly to hold the trailing edge of the carton top flap away from the spring 462 as the carton erects.

A second plow 464 is attached by screws 465 (Figure 21) to the top of the cross slide 447 and is therefore transversely adjustable with it. As the carton is erected and as it moves from the fourth to the fifth position shown in Figure 26 its leading side flap rotates so that its hinged connection to the carton is vertical and the flap is held in open position. The top flap of the carton is lifted to a substantially horizontal position by the plow, and as the trailing side flap reaches the plow it is turned around to open position as shown in Figure 26. A side flap holder extension 466 is mounted upon the plow 464 and as the carton moves to its loading stage it holds the side flaps open. When the carton reaches the end of extension 466 the side flaps are held open by the buckets of the loading unit, as shown in Figure 41. A second and much longer extension 467 is also attached to the plow. Its function is to bend the top flap upwardly out of the way of the loader buckets and to hold it there until after the carton is loaded.

The means for providing transverse adjustment of the cross slide 447 and the elements carried thereby is shown in Figures 12 and 12A. A transverse rod 468 has its outer threaded end passing through a mating threaded hole in the outer wall of the carton loading unit 106. A knob 469 is affixed to its outer end, and by turning the knob the rod 468 is moved transversely of the machine. Adjacent its inner end the rod is journalled for sliding and rotary movement in the inner wall 603 of the unit 106, and the inner end of the rod extends underneath the cross slide 447. A yoke 470 is affixed to the underside of the cross slide by screws 471 and extends downwardly where rod 468 is journalled in its lower end but held against sliding movement therethrough by a shoulder 472 and a nut 473. Thus transverse adjustment of the cross slide 447 and all of the elements mounted upon it is accomplished by turning the knob 469. A nut 474 adjacent the knob locks the rod 468 in place. In order to assure that the cross slide 447 does not cock during its movement, its underside is provided with a transverse groove which receives a fixed center guide 476 mounted upon the top of the cartoning machine base 102 by screws 477. As shown in Figure 41 a pointer 478 is affixed to the cross slide 447 and cooperates with a graduated scale 479 on the top of the cartoning machine base to indicate the position of the cross slide.

Figure 41 also shows how the carton slide flaps are held open by the loading unit buckets after the flaps reach the end of extension 466. The longer extension 467 continues to hold the top flap elevated and out of the way until after the carton is loaded as shown in Figure 44. Also, after the carton is loaded the buckets 480 shift outwardly to release the side flaps, as shown in Figure 44. Leaving the details of the loading operation for subsequent explanation, the closing of the carton flaps on the loaded end will now be described.

After the buckets have released the side flaps and the top flap has run off the end of extension 467 the top flap will remain slightly elevated and out of the way of the side flaps so that they can be closed. As the carton is moved along at a uniform speed by the transport fingers the trailing flap is closed by a rotating blade 481 (Figures 44 and 45) which projects upwardly through a slot 482 in the table plate 182 and the top of the transport. As soon as the trailing flap is closed the leading side flap is engaged by a stationary plow 483 (Figure 44) which turns the flap to closed position overlapping the trailing side flap. The plow 483 is the rear end of a long back up bar 484 (Figures 47 and 49) mounted upon a compound 485 for transverse adjustment.

The rotating blade 481 is one of three similar equiangularly spaced and coplanar blades that are welded to a hub 486 (Figure 45). Means are provided to adjust the blades 481 transversely of the transport in order to properly act upon side flaps of different size cartons. As shown in Figure 45 a shaft 487 projects through a side wall of the cartoning machine base 102, being journalled for rotation in a bearing 488 mounted in the inner wall of the loading unit 106. Shaft 487 is the drive shaft for the loading unit 106, as best shown in Figure 3, its other end being journalled in a bearing in the outer wall of the loading unit. That portion 489 of the shaft 487 which projects into the cartoning machine base has a double sprocket 490 affixed thereto by a set screw 491 and a key 492.

A chain 493 engages one set of teeth on the double sprocket 490 to drive the shaft 487, the other end of chain 493 passing around a sprocket 494 (Figure 16) which is keyed to the headshaft 288. A sleeve 495 is slidably mounted upon the shaft portion 489 but keyed by 492 to rotate with the shaft. The hub 486 carrying the three fingers 481 is affixed to the sleeve 495 by a set screw 496.

While the angular speed of the drive shaft 487 of the loading unit is the same as the speed of the headshaft 288 of Figure 16, and the angular speed of the rotating blades 481 is therefore the same as the angular speed of the side fingers 254 of the transport as they round their driving sprockets 293 and 294 of Figure 16, the shaft 487 lies below the horizontal plane which contains the headshaft 288. Thus those portions of the rotating blades 481 which project above the table plate 182 have a higher speed than side fingers 254 and the cartons carried thereby. This higher speed of the rotating blade 481 allows it to pass the carton which is moving in the same direction, and in doing so the blade 481 pushes the trailing side flap of the carton forward as shown in Figure 44. In the illustrated embodiment, the cartons are of such size that three of them pass the zone of shaft 487 for each revolution thereof, and three blades 481 are provided, so that the side flaps on three consecutive cartons are folded forward for each revolution of the shaft 487.

The other side of the cartoning machine base 192, opposite to the carton loading unit 108, has an opening closed by a removable cover plate 497. A shaft 498 is threaded at one end through the cover plate 497 and a nut 499 welded thereto. At its inner end the shaft carries a ball bearing assembly the inner race of which is affixed to the end of the shaft by a small cap screw 500. The outer race is clamped between two radial flanges 501 and 502 secured to the end of the sleeve 495 by screws 503.

A knob 504 is affixed, as by a set screw, to the outer end of the shaft 498, and since the shaft is threaded in cover plate 497 and nut 499, rotation of the knob 504 will move the shaft axially, with consequent axial movement of the sleeve 495 and the fingers 481. After being correctly adjusted by the knob 504 the blades 481 are locked by the nut 505 on the shaft 498. The bearing attached to the inner end of shaft 498 permits free rotation of the sleeve 495 and the rotating blades 481 with respect to the shaft 498.

The previously mentioned back up bar 484, which forms a plow 483 at its rear end, extends underneath the overarm 312 all the way to the other side thereof, past a compound 506, and partially past a compound 507 (see Figures 3 and 49) and cooperates with elements carried by these two compounds. The overarm 312 is not shown in Figure 49. After the leading side flap of the carton has been closed, the bar 484 holds the side flaps closed and bears against the end of the moving carton to keep it from moving sideways under the influence of forces developed by the flap tucking and closing operations on its other end.

The back up bar is made in two pieces, there being a forward extension 508 attached to the rear portion as by screws 509. A tuck flap guide plate 510 is attached to the bottom of the back up bar 484 as by screws 511, the bar 484 being recessed where the guide plate 510 is attached so that their bottoms form a planar surface. The thickness of the plate 510 should be approximately the thickness of the walls of the carton, and it is of substantial width. The extension 508 is spaced slightly above the guide plate 510 to form a groove 512 (Figure 50) through which the carton tuck flap passes and is guided into position in the end of the carton.

Before the tuck flap can be inserted into the end of the carton in this manner however, it must be creased with respect to the top flap. The compound 506 carries the elements for accomplishing this. An elongated plate 513 is attached to a supporting bar 514 as by screws 515, and the bar 514 is in turn secured to the mounting face of the compound 506 by screws 516. The plate 513 extends rearwardly underneath the overarm 312 substantially to the compound 485 where it terminates in a curved plow 517. A horizontal strip 518 is secured to the top of the plate 513 by screws 519. At its rear end the strip 518 terminates in an upwardly extending guide 520, and at its forward end it terminates in a downwardly extending guide 521.

A vertical plate 522 (Figures 51 and 52) is attached in spaced parallel relationship with the inner wall of plate 513 by means of a yoke plate 523 and screws 524, thus forming an inverted L shaped passage for the carton top and tuck flaps as shown in Figure 52. An extension 525 is secured to the top of the vertical plate 522 by screws (not shown) and extends forwardly past a crease over plow 526 which is attached, as by brazing, to the inner face of the plate 513. A plow 527 is carried by a plate 528 which is affixed to the compound 507, the rear edge of the plow being just forward of the downwardly extending guide 521 on the strip 518.

In operation, after the carton side flaps have been closed and the carton moves along the back up bar 484, it moves from left to right as viewed in Figures 47 to 49. The guide 520 and the plow 517 deflect the carton top flap downwardly. The rear end of plate 522 forms a plow 529 (Figure 51) which coacts with strip 518 to position the top flap horizontally and bend the tuck flap vertically downward so that they will pass through the inverted L shaped passage shown in Figure 52. While continuing its movement to the right the carton passes the plate 522 but the top flap continues to be supported in horizontal position by the extension 525. When the tuck flap engages the crease over plow 526 it is folded back as shown in the third position of the plow in Figure 48. The action of the elements carried by the compound 506 is therefore the same as those carried by the compound 386 on the other side of the transport, and shown in Figures 30 to 34.

When released after passing the crease over plow 526 the tuck flap will spring back slightly to a position approximately at right angles to the top flap. With continued movement, the carton reaches the end of extension 525 and the guide 521 on the forward end of strip 518 bends the top flap downwardly. With further continued movement of the carton the plow 527 bends the top flap further downwardly. The tuck flap, guided by the tuck flap guide plate 510 passes through the groove 512 under the back up bar extension 508 and enters the carton and the carton becomes nearly closed as shown by the second from the left carton of Figure 54.

As previously explained the purpose of mounting the various elements upon compounds is to provide means for adjusting their position transversely of the transport. The compound 506 however, instead of being attached to the cartoning machine base, is carried by a bracket 530 (Figure 1) which is mounted upon the forward side of the vertically adjustable slide block 423 that carries the overarm 312. This permits vertical adjustment of the tuck flap creasing assembly carried by the compound 506 so that cartons of various heights can be accommodated. The compound 506 also provides transverse adjustment of the assembly to accommodate cartons of various lengths. As shown in Figure 54 a scale 531 on the compound 506 cooperates with a pointer 532 on the overarm 312 to indicate the transverse position of the tuck flap creasing assembly. The vertical position of the assembly is determined by the adjustment of the overarm which positions the hold down bar 310 in accordance with the height of the cartons being loaded.

Referring to Figure 54, after the carton top flap runs off the forward end of the back up bar extension 500 its tucked end is still not closed, as shown by the third carton from the left. With continued forward movement the forward edge of the top flap is engaged by a smaller roller 533 carried by a compound 534. Since the forward edge of the flap is first pressed inwardly by the roller there is a tendency for the flap to be deformed if the rear portion of the flap is not simultaneously pressed inwardly. The reason for this is that in many instances the tuck flap has to force its way under the article which has been loaded. Where considerable force is required to force the tuck flap under the article, deformation of the tuck and top flaps is avoided by pressing them in at another spaced point while roller 533 presses against the leading edge.

In order to apply a force spaced from the roller 533 to assist in closing the top flap, a rotary closing disc 535 (Figures 54 and 46) is provided, having three equiangularly spaced plows 536 brazed to its inner surface at its periphery. The top of the disc 535 rotates from left to right in Figure 54, and the disc is so located between the plow 527 and the roller 523 that a plow 536 engages a rear portion of the top flap and pushes it toward the carton at substantially the same time that the leading edge of the top flap is pressed toward the carton by the roller 533.

Figure 46 shows the construction of the mounting for the disc 535 whereby it is rotated and is transversely adjustable so that it can be properly positioned with respect to the roller 533 when different length cartons are used. A shaft 537 is journalled at its ends in ball bearings 538 and 539 in the side walls of the base 102. The left end of the shaft has an axial bore. Slidably received within the bore is a cylindrical element 541 which has a loose enough fit so that it will remain fixed in the bore while the shaft 537 is rotating. A threaded rod 542 extends through the left end of the bore without engaging the walls thereof. Rod 542 is threaded through a nut 543 which is affixed to the side wall of base 102. A knob 544 is affixed to the protruding end of rod 542 in order to rotate the rod and move it axially within the bore 540. A lock nut 545 locks the rod in any adjusted position. The cylindrical element 541 is affixed to the inner end of rod 542 by means of a tapered pin 546 which passes through a male and female connection between element 541 and rod 542. Thus rotation of knob 544 will shift the element 541 axially in the bore 540. A hub 547 is slidably mounted upon the shaft 537, but is fixed for rotation therewith by means of a pin 548 which is threaded in the hub and passes through a longitudinal slot 549 in shaft 537 and into a peripheral groove 550 in the element 541.

A second hub 551 fits upon a reduced portion of hub 547 and is secured thereto by a set screw 552. The rotary closing disc 535 is secured to the second hub 551 as by welding, and it may be secured in any adjusted angular position with respect to the shaft 537 and hub 547 by means of the set screw 552. A slot 553 in the top of the base 102 and through the table plate 182, through which the closing disc 535 protrudes, is wide enough to permit axial adjustment of the disc by means of the knob 544. A sprocket 554 is secured to the shaft 537 by a key and a set screw, and is in alignment with one set of teeth on the double sprocket 490 (Figure 45) so that shaft 537 receives its rotary motion from the double sprocket by means of a chain 555. The rotary closing disc is thus driven in timed relation with the transport so that the plows 536 carried thereby, once adjusted, will operate upon the carton top flap to assist in closing it, in the manner previously described.

As the carton continues its movement to the right in Figure 54 it passes the smaller roller 533 and is engaged by a larger roller 556 which presses the top flap further into the carton and fully closes it. The other end of the carton has been already closed, and the back up bar 422 on the other side of the transport holds the carton against transverse movement while the closing disc 535 and the rollers 533 and 556 close the top flap.

Both rollers 533 and 556 are freely rotatable about their vertical axes, being mounted upon ball bearings carried by a yoke 557 (Figure 54). This yoke is carried by the compound 534 so that both rollers may be simultaneously adjusted transversely of the transport. The yoke is pivotally mounted about a vertical axis on the compound. By turning the yoke, roller 533 may be moved closer to the carton while roller 556 is simultaneously moved farther from the carton, and vice versa. A knob 558 has a screw threaded into the yoke to mount the yoke upon the compound, and when tightened it clamps the yoke in its adjusted angular position. A cooperating scale 559 on the yoke and an index 560 on the compound indicate the angular disposition of the rollers. The rollers 418 and 419 mounted on compound 421 on the other side of the transport are similarly carried by an angularly adjustable yoke 561 clamped in position by a knob 562. When the carton passes the last roller 556 as seen in Figure 54 it is completely closed and is delivered to the forward end of the cartoning machine for removal.

The description so far completes the disclosure of that part of the machine which erects and closes the flaps on the two ends of the carton. The embodiment so far described relates to a machine for erecting and closing the flaps on a carton of the type shown in Figure 18, wherein one top flap is attached to one end of one of the carton sides and the other top flap is attached to the other carton side and at its other end. This carton is generally called a reverse tuck flap carton. Where both top flaps are attached to the same side of the carton but at opposite ends thereof, as shown in Figure 79, the carton is generally called a "straight tuck" or "airplane flap" carton.

The drive for the machine is shown in Figure 55. Suitably mounted adjacent the bottom of the cabinet base 101 is a combined motor and continuously variable speed reducer 564. The power take-off shaft 565 carries a slip-clutch device 566 which drives a chain sprocket 567, also mounted on the shaft 565. The details of the continuously variable speed reducer 564 and of the slip-clutch device 566 are unimportant here since they are well known easily procurable devices. The slip-clutch device is of the type which will normally drive the sprocket 567 but will slip when the load which is driven by the sprocket 567 exceeds a predetermined figure. The clutch is adjustable so that it will slip at any desired overload, while the motor and speed reducer 564 will continue operation. When used in this machine, it is intended that when an overload occurs, such as to cause slippage of the clutch 566, the operator will shut off the motor, eliminate the cause of the overload and start the motor again. Also shown in Figure 55 is a shaft 568 which leads to a speed control handle 110 (Figures 1 to 3) on the outside of the cabinet base 101, which handle is turned by the operator to shift the variable speed reducer 564 to obtain the desired output speed. A vertical shaft 570 which is suitably geared to the shaft 568 extends through the top of the cabinet base 101 where it carries the speed indicator dial 111.

The chain 290 shown in Figures 16 and 55 passes over the sprocket 567 and a sprocket 573 which is axially fixed but freely rotatable upon the head shaft 288. Referring again to Figure 55, an idler take-up sprocket 574 engages the slack side of the chain 290 to take up the slack therein. The sprocket 574 is carried on a lever 575 pivotally mounted upon a bracket 576. A control knob 577 on a shaft 578 threaded through a block 579 mounted upon the same fixed base member 580 as the bracket 576 engages the lever 575 to shift the idler sprocket 574 to take up the slack in the chain. The threaded shaft 578 is locked by a nut 581.

Reviewing the drive of the machine then, all of the power is applied through the chain 290 and the sprocket 573 on the head shaft 288. Means by which the sprocket 573 is connected to drive the head shaft 288 will be described later. The head shaft 288 drives the chains which carry the transport fingers and these chains in turn drive the tail shaft 253 (Figure 15). The tail shaft 253 drives the transport feeder through the chain 283 (Figure 9). Referring now to Figures 16 and 45, the chain 493 drives the drive shaft 487 of the loading unit 106, and since the rotating blades 481 are keyed to the shaft 487 they rotate with it to close the trailing side flaps on the loaded side of the cartons. The other chain 555 which passes over the double sprocket 490 of Figure 45 drives the rotary closing disc 535 of Figure 46 by means of the sprocket 554 on the shaft 537.

The devices by which the chain 290 (Figure 16) drives the head shaft 288 are as follows. As previously mentioned, the sprocket 573 is axially fixed but freely rotatable upon the shaft 288. A sleeve 584 having a pair of diametrically spaced teeth 585 is mounted for sliding movement upon the shaft 288 but fixed against rotating with respect thereto by a key 586. That side of the sprocket 573 which faces the sleeve 584 has a pair of substantially diametrically opposite abutments 587 in its face, the teeth 585 on the sleeve 584 being designed to engage the abutments 587 when the sleeve 584 is moved to the left as viewed in Figure 16. In order to make it easier to engage the teeth 585 with the abutments 587, the side of the sprocket is provided with inclined surfaces 588 against which the teeth 585 can slide until they come up against the abutments. Since the sprocket is driven in one direction only by the chain 290, there is no opportunity for the teeth 585 to ride up onto inclined surfaces 588 because the sprocket is never driven in that direction.

Engagement of the teeth 585 against the abutments 587 causes power to be transmitted from the chain 290 to the shaft 288 since sleeve 584 is keyed to the shaft 288.

The hand-wheel 289 may rotate freely upon shaft 288 and may also slide axially thereon. The sleeve 584 has a peripheral grove that receives a radial flange 590 which is secured to the hand-wheel so that axial movement of the hand-wheel will shift the sleeve into or out of engagement with the abutments 587 on the sprocket. The flange 590 may be made in two parts so that it may be assembled into the peripheral groove in the sleeve before being attached to the hand-wheel. A pair of axially extending pins 591 are securely mounted in the hand-wheel 289. A collar 592 is affixed to the shaft 288 and secured against rotation thereon by a key. The collar has a pair of holes 593 extending therethrough, these holes being in axial alignment with the pin 591 in the hand-wheel and of such size that when the hand-wheel is shifted to the right in Figure 16, the heads of the pins 591 will enter into the holes 593. When the hand-wheel is in this right-most position, the teeth 585 on the sleeve 584 are disengaged from the abutments 587 in the sprocket. Since the hand-wheel 289 is now connected to the shaft 288 by means of the pins 591 and the collar 592, the hand-wheel may be turned in either direction to operate the machine in either direction.

An extremely large driving thrust is transmitted from the sprocket 573 to the sleeve 584. There is no coasting of the machine after the motor is shut off, and as a consequence the teeth 585 on the sleeve will still be securely engaged with the abutments 587 because of the pressure against the teeth by the abutments. This pressure is so great that the hand-wheel 289 cannot be pulled to the right as viewed in Figure 15 to disengage the teeth 585 from the abutments. The following device is employed to turn the sleeves 584 backwards to relieve the aforesaid pressure so that the engagement between the teeth 585 and the abutments can be disconnected by moving the hand-wheel outwardly. A cup shaped element 594 is slidably mounted on the outer reduced end portion of the shaft 288. A coiled compression spring 595 urges the cup 594 toward its normal position against a retaining washer 596 which is secured to the end of shaft 288 by a screw 597. A pair of diametrically spaced, axially extending pins 598 are fixed secured to the element 594 and have a sliding passage through the holes 593 in the collar 592. When the hand-wheel 289 is turned so that the pins 591 are not in alignment with the holes 593 in the collar 592, the elements 594 may be pushed inwardly until the pins 598 engage the vertical wall of the hub of the hand-wheel. The hand-wheel may now be turned in the direction of rotation of the shaft 288 when it is driven by the motor. As the hand-wheel is turned in this direction, the sides of the pins 591 will engage the sides of the pins 598 which are projecting through the collar 592. A sufficient force is applied to the hand-wheel to turn the shaft 288 through the collar 592 which is keyed thereto. The turning of the shaft 288 in such manner relieves the pressure between the teeth 585 and the abutments 587 in the sprocket so that the teeth may be disengaged from the sprocket by pulling the hand-wheel outwardly.

Through disengagement of the teeth and sprocket in this manner, the element 594 is released and the spring 595 returns it to its normal position. The hand wheel may now be turned until the pins 591 are in axial alignment with the holes 593 and the hand wheel may then be pulled outwardly to insert these pins into the holes. The hand wheel 269 is now connected to turn the shaft 288 in either direction through the pins 591 and the collar 592 which is keyed to the shaft. Thus the machine may be reversed in direction to clear a jam or the like or it may be operated slowly in its normal direction by hand to check the operation of any element of its mechanism.

Loading unit

The carton loading mechanism 106 has an integral frame comprising spaced vertical side walls 602 and 603, which are connected by a horizontal wall 604 as best shown in Figure 12A. The previously mentioned shaft 487 lies at the front end of wall 604 and slightly below the plane thereof. A pair of spaced sprockets 605 and 606 are axially fixed and keyed for rotation with the shaft. A second shaft 607 (Figures 2, 3 and 70) is mounted in the same horizontal plane as shaft 487 and at the rear end of the horizontal wall 604 at the rear end portion of the loading unit 106, being mounted in suitable ball bearings in the side walls 602 and 603. The sprocket 608 lies in the same vertical plane as the sprocket 606 on the forward shaft 487, and the sprocket 609 on shaft 607 lies in the same vertical plane as the sprocket 605 on the shaft 487, so that link chains 610 and 611 (Figure 44) pass over and around each aligned pair of sprockets. As shown in Figure 12A, the upper run of the chain lies above the horizontal wall 604 and the lower run passes underneath it.

To prevent sagging of the lower run of the chain, each is supported by a longitudinal track 612 and 613 respectviely, as shown in Figure 12A. The tracks 612 and 613 are suspended from the horizontal wall 604 by downwardly extending hangers 614 and 615, which may be welded to the wall 604. The tracks 612 and 613 and the hangers 614 and 615 need not be continuous and each may comprise a series of longitudinally aligned sections spaced at equal distances to support the chains at a number of points on their lower run as shown in Figure 12B.

The chains 610 and 611 carry the buckets 480 over the top of the horizontal wall 604 while the buckets are loaded with the merchandise to be inserted into the cartons and while the merchandise is loaded into the cartons. As shown in Figures 3, 41 and 44, the buckets are shifted transversely of the chains while the merchandise is being inserted into the cartons, after which the buckets are moved back to their original positions before they pass around the forward sprockets 605 and 606 to pass under the horizontal wall 604 and back to the rear of the loading unit.

As also shown in Figures 3, 41 and 44, the insertion of the merchandise into the cartons is the result of the transverse movement of the buckets 480 as well as of sliding plungers 616 within the buckets which are shifted within the buckets to eject the merchandise from the buckets into the cartons. I prefer to make the plungers 616 of a plastic, such as "Bakelite," a phenol condensation product, because of its light weight and relatively low friction with the supporting guides.

Figure 57 shows details of construction of one of the buckets 480 whereby it may be shifted transversely of the chains 610 and 611. Each bucket is substantially channel-shaped in cross section, and comprises side walls 617 and 618 and a connecting bottom wall 619. A pair of parallel and opposing gibs 620 and 621 are affixed as by screws to the bottom wall 619. The gibs engage the opposite sides of a dove-tail slide 622 which has downwardly depending ears 623 and 624 recessed into and brazed to the ends thereof. Adjacent their bottom ends, the ears 623 and 624 each has a pair of parallel chain link pins 625 affixed thereto. The length of the dove-tail slide 622 is such and the spacing between the pins 625 of each pair is such that the ears 623 and 624 with their attached pins may be substituted for a link in each of the chains 610 and 611. After mounting on the chains in such manner, the closing link is placed over the projecting ends of the pins 625, as will be understood.

Each of the dove-tail slides 622 is thus carried by the chains in a position such that it extends at right angles to their path of travel, and the sliding mounting of the buckets 480 upon the dove-tails permits the shifting of the buckets transversely of the chains while moving forwardly with the chains. A plate 626 is secured to the undersurface of the dove-tail slide 622 as by screws 627, and overlaps the bottom edges of the gibs 620 and 621, thus preventing any relative vertical movement between the buckets 480 and the dove-tail slide 622 which would otherwise result from the clearance space between the top surface of the slide and the bottom wall 619 of the bucket.

During their upper run, the chains are prevented from buckling by being confined between upper and lower guides as will be described later. This assures that the buckets 480 will be carried in substantially horizontal position and that their weight will not cause them to tilt due to buckling of the chain. A yoke 628 spans the gibs 620 and 621, and is connected thereto by screws 629 and 630, the upper surface of the yoke being recessed so as to avoid contact with the plate 626. A ball bearing assembly which forms a cam follower 631 is mounted on a vertical axis by a stud 632 which is affixed to the yoke 628. The outer race 631 of the ball bearing assembly or cam follower is engaged by the cam tracks shown in Figure 58, which shifts the buckets 480 transversely of the loading unit.

As shown in Figures 3 and 58, when a bucket has passed onto the top of the loading unit at the rear end of the machine, a pair of parallel guide tracks 633 and 634 engage the follower 631 to hold the bucket against transverse movement. As shown in Figures 12 and 12A, the forward ends of the guide tracks 633 and 634 lie in the region of the plane of Figure 12A. Forward of the tracks 633 and 634, a horizontal mounting plate 635 rests upon the horizontal wall 604 of the loading unit and is mounted thereon for transverse sliding movement towards or away from the transport 195. The mounting plate 635 has two transverse slots 636 (Figures 58 and 61). Each of these slots engage a guide member 637 which are secured to the horizontal wall 604 by screws or the like. The guide members 637, being elongated, prevent the mounting plate 635 from twisting during its transverse movement. A pair of holddown bolts 638 pass through slots 639 in the plate 635 and are threaded into the wall 604. The enlarged heads of the bolts 638 overlap the slots 639 and hold the plate 635 against the horizontal wall 604 but do not interfere with its sliding movement.

Secured to the top of the mounting plate 635 are three guide tracks 640, 641 and 642. The guide track 640 is inclined to the direction of travel of the chains 610 and 611 so that when a follower 631 engages the track during the forward movement of a bucket, the inclined track 640 will cause the bucket to shift transversely towards the transport. The track 641 at the forward end of the track 640 is parallel to the chains 610 and 611 and to the guide track 642. Thus, when the follower 632 on the bucket reaches the end of the inclined track 640, it enters between the parallel tracks 641 and 642 to hold the bucket against transverse movement while it continues to move forwardly during the loading of the carton. Figure 59 shows a bucket at the extreme left end of its stroke towards the transport, which is the position it will have during the time that its follower 631 is engaged between the guide tracks 641 and 642. Attention is called to Figure 41 and Figure 60, which show buckets in this same position and also show how the side flaps of the carton are held in open position by the buckets during this phase of the operation. It will be noted that the details of the structure of the buckets of Figures 58 and 59 are different than those shown in Figures 12, 12A and 41. As will be made clear, this difference is due only to the fact that the buckets of Figures 58 and 59 are not adjustable to accommodate merchandise articles of different widths, as are the buckets of Figures 12, 12A and 41.

Figure 44 shows that the articles of merchandise are transferred from the buckets to the cartons on the transport while the buckets are in their extreme position adjacent the transport, and that after the merchandise has been loaded, the buckets are shifted away from the transport as they continue their forward movement. This shifting of the buckets back to their normal position is accomplished by an inclined guide track 643 best shown in Figure 58. As the follower 631 leaves the tracks 641 and 642, it engages the inclined track 643 to shift the buckets back to their normal position. At its forward end, the track 643 terminates in a portion 644 which lies in longitudinal alignment with the guide track 633 and also curves downwardly over the end of the wall 604 and the shaft 487 for a short distance as shown in Figure 8.

While the buckets may be easily shifted by the engagement of their followers 631 with inclined guide tracks such as 640 and 643, there is enough friction between their relatively sliding parts on the dove-tail slide 622 so that the buckets will not move transversely while they are passing from the front to the rear of the loading unit on the underside of the horizontal wall 604, and as they ride back onto the upper run at the rear of the machine they are still in proper transverse position for their followers to enter the space between the tracks 633 and 634.

Figure 60 shows the construction by which it is possible to adjust the mounting plate 635 transversely of the loading unit so that the transverse movement of the buckets towards the transport can be adjusted in accordance with the length of the cartons being handled by the machine. A shaft 645 is journalled for rotation at one end in the outer side wall 602 of the loading unit and at its other end in a bracket 646 which is attached to the wall 604 by screws or the like. The shaft 645 protrudes through the wall 602 and has a knob 647 affixed and keyed to its outer end. A lock nut 648 is threaded onto the knob 647 and may be turned to engage the wall 602 to lock the knob 647 and shaft 645 against rotation after the adjustment is made. At its inner end the shaft 645 is held against axial movement by means of a collar 649 which is keyed in place, and by a shoulder on shaft 645 on the other side of the bracket 646. The shaft has a threaded engagement with a vertical lug 650 which passes through a slot 651 in the wall 604 and is secured to the underside of the mounting plate 635 by screws or the like. Thus when the lock nut 648 is loosened, the shaft 645 may be rotated to shift the plate 635 transversely towards or away from the transport. Suitable graduation and index marks are provided on the mounting plate 635 and the wall 604 to indicate the relative position of the two elements so that the plate can be pre-set in accordance with the length of the cartons which are to be handled by the machine.

Figure 60, and also Figure 12A, also shows the means which hold the chains 610 and 611 against buckling during their upper runs. Referring to Figure 60, a longitudinal plate 651 has a track 652 secured to its upper surface adjacent its outer edge. The track 652 engages the rollers of the chain and supports the chain along its whole length on the top of the horizontal wall 604. A hold-down member 653 rests upon the plate 651 and has an extension which terminates in a downwardly extending track 654 that engages the upper parts of the rollers on the chains. There is sufficient clearance between the tracks 652 and 654 to allow the chain to pass between them but not enough to permit the chain to buckle. The hold-down members 653 and the plates 651 extend the length of the horizontal wall 604 and are held in assembled relationship with respect thereto by screws 655. The other chain 610 is supported and guided by a similar hold-down member 653 in exactly the same manner, as shown in Figure 60.

Figures 3, 41 and 44 show the construction of an upper or pusher cam track which serves to shift the plungers 616 transversely of the buckets to discharge the merchandise from the buckets and insert it into the cartons.

In the embodiment shown in these figures, a pair of compounds 656 and 657 are mounted on the outer side wall 602 of the loading unit. An angular element having a rear leg 658 and a forward leg 659 is secured in a horizontal position directly overlying the buckets, by means of brackets 660 and 661 which are mounted on the compounds 656 and 657 respectively. The rear leg 658 forms an inclined surface or pusher cam track against which the followers 662 on the tops of the plungers 616 bear to shift the plungers transversly of the buckets during the forward movement of the buckets. As best shown in Figure 12A, the followers 662 comprise ball bearing assemblies having their inner races mounted upon studs 663 which are threaded into the tops of the plungers 616. The studs 663 may have integral heads 665 to engage the tops of the inner races; or elements 665 may be separate acorn nuts threaded on the upper ends of the studs. Spacer washers 664 underneath the inner races raise the followers slightly above the plungers. The outer races of the bearing assemblies thus form followers which engage the aforesaid rear leg 658 and shift the plungers within the buckets. The apex or the juncture of the pusher cam track 658 and the front leg 659 determines the final position of the plunger when inserting the merchandise. This final position is indicated in Figure 60, where the plunger is shown at the extreme end of its stroke with respect to the bucket. The mounting of the legs 658 and 659 upon the compounds 656 and 657 permits adjustment of the pusher cam track so that the final position of the plunger will correspond to the extreme position of the bucket in accordance with the length of the cartons being handled. Where such an adjustment of the pusher cam track 658 is not required, it may be fixedly mounted upon supporting posts or the like as shown in Figures 1 and 2.

A second inclined surface or return cam track 667 is mounted in the same horizontal plane as the pusher cam track 658, but forwardly spaced from the front leg 659 as best shown in Figure 44. The return cam track 667 is mounted upon the front leg 659 by a pair of yokes 668 and 669. This return cam track 667 is engaged by the followers 662 after they pass the forward end of the pusher cam track 658, and they then urge the plungers 616 back to their normal positions near the outer end of the buckets as shown in Figure 44. Since the return cam track 667 is mounted upon the front leg 659, its transverse position will always correspond to that of the pusher cam track 658 as determined by the compounds 656 and 657. Where the rear leg 658 is fixed as in Figures 1 and 2, the cam track 667 is fixed as shown in those figures. In Figure 2 a cover guard 666 overlies part of the cam track 667.

As mentioned before, the conveyor of the loading unit 106 moves at the same speed as the transport conveyor so that there is no relative movement in a longitudinal direction between the loading unit conveyor and the transport. While the buckets do move transversely towards the transport in order to load the cartons, this transverse movement is in addition to their longitudinal movement which does not vary.

Care must be taken that each bucket 480 is properly aligned with its respective carton as its plunger 616 transfers the merchandise from the buckets to the cartons. It is only the central fingers 252 of the transport that may be adjusted relative to the side fingers. The side fingers 254 always have a fixed position with relation to the chains upon which they are mounted. This is also true of the buckets of the loading unit which are carried by the chains 610 and 611. The buckets of the loading unit are therefore disposed on the chains 610 and 611 so that the trailing side wall 618 (Figure 57) will be in alignment with a side finger 254 on the transport. This alignment is such that the forward edge of each side finger lies in substantially the same vertical transverse plane as the forward face of the bucket side wall 618. Where the wall thickness of the carton has any substantial dimension, the forward face of the side finger 254 should be a little to the rear of the aforesaid plane so that the inner surface of the trailing side wall of the carton lies in that plane. Thus if the article of merchandise to be inserted lies against the trailing side wall 618 of the bucket, it will slip easily into the carton when transferred from the bucket to the carton by a plunger 616.

In the embodiment shown in Figures 12, 12A, 41, 44 and 57, the bucket is constructed so as to handle merchandise of various sizes and still assure that the merchandise lies against the trailing side wall of the bucket. Each of the buckets in this embodiment has a supplementary forward wall which is adjustable towards or away from the trailing wall 618 so as to vary the distance between them. As best shown in Figure 12A, the adjustable wall 670 is spaced a substantial distance above the bottom wall 619 of the bucket. Adjacent each end of the adjustable wall 670 there is affixed thereto a pin 671. These pins pass through holes bored through the side wall 617 and support the adjustable wall 670. Set screws 672 and 673 shown in Figure 12 are threaded through the wall 617 and clamp the pins 671 to hold wall 670 in adjusted position. The top of each plunger 616 is cut away as shown at 674 (Figure 57) in order to allow the movement of the wall 670 towards the other wall. At each end, the adjustable wall 670 projects downwardly as shown in Figure 12A to provide stops to limit the movement of the plunger within the bucket. The plunger itself is cut away on its side towards the transport as shown at 677 (Figure 12) in order to allow the plunger to project beyond the end of the bucket at the end of its stroke as shown in Figure 60.

Plungers 616 do not rest upon the bottom wall 619 of the buckets. Each bucket has a forward projecting flange 678 (Figures 12, 63 and 66) and a rearwardly projecting flange 679 which engages guide-ways 680 and 681 respectively in the side walls 617 and 618 of the buckets. This type of support for the plungers 616 is used in each of the types of buckets, which will now be described.

In the embodiment shown in Figures 58 and 59, no means for adjusting the buckets to accommodate different sizes of merchandise is shown. In the embodiment shown in Figures 63 and 63A no means for adjusting the buckets is used but the bottom wall 619 slopes towards the trailing side wall 618. The sloping of the bottom wall in this manner assures that if the merchandise article is cylindrical, it will always seek the lowest point of contact with wall 619 so that it will also rest against the trailing side wall 618. This type of bucket is particularly suited for cylindrical articles of different diameters because they will roll down in this manner so that they will always be aligned with the cartons when they are transferred thereto from the buckets. A bucket having a sloping bottom is also shown in Figure 75, but it is of slightly different form, not having the sharp corner at the bottom as does the one in Figure 63.

The face of the plunger 616 which ejects the merchandise is inclined as shown at 616a in Figure 63A so that it also urges the merchandise towards the trailing side wall 618 while shifting it to eject it from the bucket and insert it into the carton.

In the embodiment shown in Figure 63 the inclined bottom wall and the trailing side wall meet at an acute angle. This angle provides a cavity for the purpose of receiving a projecting flattened end of an otherwise cylindrical article such as a toothpaste or shaving cream tube. Merchandise articles of this type are inserted into the cartons so that their flattened and crimped ends are disposed diagonally between opposite corners of the carton. The aforesaid cavity permits such articles to be properly positioned in the bucket to be inserted in the proper manner. One such article is indicated by the phantom outline 732 in Figure 63, and its flattened crimped end is indicated at 732A. A larger diameter article of merchandise is indicated at 732B in Figure 63. A pin 682 suitably fixed to the wall 618 adjacent its outermost end provides a stop which is engaged by the plunger 616 to limit the outward movement of the plunger within the bucket. A similar stop 682a (Figure 63A) is provided to limit the movement of the plunger in the other direction, towards the transport. This other stop is suitably located to engage a recess 632b in the plunger so as to allow the plunger to project beyond the bucket in the manner shown in Figure 60.

Insertion of literature

One of the features of my improved machine is a novel system of inserting advertising literature or instruction pamphlets or the like into the cartons together with the merchandise. In accordance with my invention, the pamphlets are disposed in the path of the merchandise so that it will be inserted into the carton by the merchandise during the movement of the merchandise. In the embodiment of the machine shown in Figures 1 and 2, provision is made for the insertion of pamphlets in this manner. Figure 67 shows in enlarged detail the manner in which this is accomplished.

Referring to Figures 64, 65 and 66, a bucket 480 has a pamphlet holder 684 mounted by screws 685 on the end of the bucket that faces the transport. The holder comprises a horizontal bar having vertical legs 686 and 687 at its ends and spaced from the face of the bucket to which it is attached. The horizontal portion of the holder 684 provides a support for a pamphlet which is disposed transversely of the bucket and with the plane of the pamphlet vertical. The legs 686 and 687 hold the pamphlet in substantially vertical position once it has been inserted.

The holder 684 is so dimensioned that the pamphlet is held in a high enough position to clear the bottom of the carton as it is inserted by the bucket. When used in connection with a bucket of the type shown in Figures 64 to 69, the top of the holder 684 is recessed so as to have the same profile as the bottom of the bucket and to be in alignment therewith as can be seen from Figure 66. The inner surface of the side and bottom walls of this particular bucket form a substantially circular profile, so that when a cylindrical article of merchandise such as a bottle is used, it will rest upon the lowest portion of the bucket. Thus the bottom of the bottle will extend slightly below the bottom edge of the pamphlet. Only cylindrical articles of merchandise such as bottles or the like are intended to be used with the buckets shown in Figures 64 to 69 and these buckets are not adapted to handle articles of various diameters. While the pamphlet holder 684 is only shown in connection with the bucket of Figures 64 to 67, and with the sloping bottom bucket of Figures 68 to 70, the same type of support is adapted to be used with any of the other forms of buckets including the adjustable type of Figures 12 and 12A.

It is also desirable to bevel or round the corners of the side walls of the bucket as shown at 688 and 689 in Figure 64 so that the pamphlet will not catch upon the corners of the bucket as it is deformed by the bottle during its insertion into the carton. While the pamphlet holder is shown as an attachment in Figures 64 to 66, it may be integral with the bucket, as in Figure 69.

Figure 67 shows the action of the bottle during the insertion of the pamphlet into the carton. Seven buckets are shown in this figure, identified as A, B, C, D, E, F and G. The bucket at A is shown in the position that it assumes when having a pamphlet 690 inserted into the holder 684 by the pamphlet magazine shown in Figures 68 to 70. As shown in Figure 3, the guide tracks 633 and 634 have offset sections 724 and 725 respectively adjacent the rear end of the loading unit which shifts the buckets towards the transport to allow the pamphlets to be inserted, and then shifts them back to normal position. In positions B and C, the bucket has had the pamphlet inserted and has been shifted back to the same position transversely of the loading unit 106 that it has in Figure 12A before it starts its movement toward the transport to load the carton. It will be seen from Figure 67 that the pamphlet can be of substantial length and that the pamphlets of adjacent buckets may overlap at their ends.

At the position shown at D in Figure 67, the bucket has begun its transverse movement towards the transport under the influence of the guide track 640 (see Figures 12 and 58). During the initial phase of this movement, the overlapping edges of adjacent pamphlets are deformed so that they clear each other. When in position E, the bucket is further advanced towards the transport, and adjacent pamphlets do not touch each other. One of the cartons which is moving towards the forward end of the machine at the same speed as the buckets is shown just above the bucket at position E in Figure 67, and the leading and trailing side flaps of the carton are still held in open position by the extension 466 (Figure 41). In Figure 67, the top flap of the carton is not shown since it is held out of the way either by the longer extension 467 of Figure 41 in the case of a reversed tuck flap, or in the case of an airplane tuck flap carton, it will be below the bucket when the bucket is in the extended position. The next position of the bucket, at F in Figure 67, shows the bottle 732 engaging the pamphlet and starting to push it into the carton ahead of itself. Since the vertical legs 686 and 687 of the holder 684 project beyond the end of the bucket, the trailing and side flaps of the carton are held in open position by these legs rather than by the side walls of the buckets, as shown in Figure 67. The bottle is being moved towards the transport because of the engagement of the follower 662 on plunger 616 with the pusher cam track 658, as previously explained. When in the position shown at G in Figure 67, the bottle and the pamphlet have been almost wholly inserted into the carton, only a portion of them being visible because the plunger 616 has not yet reached the end of its stroke with relation to the bucket.

Pamphlet magazine

The details of construction and method of operation of the magazine 107 are shown in Figures 68–74. The general disposition of the magazine with respect to the carton loading unit 106 is shown in Figures 1 and 2. A trough having an inclined bottom 691 (Figure 69) and vertical side walls 692 is supported substantially at its mid-point by a bracket 693 which is attached thereto and also to the outer side wall 602 of the loading unit 106. At their inner ends the side walls 692 have a substantial upward dimension and their inner surfaces are provided with vertical grooves 694 which face each other to provide guide tracks for a vertically reciprocating blade 695. The inner end of the trough is supported in spaced relation above the carton loading unit 106 by means of a pair of spaced brackets 696 which are attached at their upper ends to the side walls 692 of the trough and at their lower ends to the vertical side wall 603 of the loading unit.

A stack of the pamphlets 690, previously described in connection with Figure 67, is placed within the trough so that they can be fed one by one into the buckets. Before inserting the pamphlets into the trough of the magazine, each pamphlet is folded so that it has a long flap 690a (Figure 71) and a short flap 690b extending upwardly from a fold where they are joined at the bottom. Figure 71 shows a series of three pamphlets as they are disposed in the magazine except that they are not compressed together as they are in the magazine. The trough may be filled with the pamphlets as shown in Figure 71 and stacked therein from end to end thereof.

At the right end as viewed in Figure 69, the stack is restrained by a horizontal and transverse bar 697 which extends through the side walls 692 and is suitably secured against axial movement therein by collars 698 on the outside of the walls. As shown in Figures 72-74, the height of the restraining bar 697 within the trough is such that it will engage the long flaps 690a of the pamphlets but will not engage the shorter flaps 690b, which pass beneath it. A pusher bar or plunger 699 is mounted within the trough and is moved to the right as viewed in Figure 69 so as to continually urge the stack of pamphlets towards the right as they are fed one by one to the buckets. The top surface of the trough bottom 691 is provided with a series of parallel grooves 700, as best shown in Figure 70. These grooves in the surface of the trough bottom decrease the friction of the stacks of pamphlets moving thereover. The pusher bar or plunger 699 is provided adjacent each side thereof with a pair of spaced rollers 701 which support the plunger 699 for rolling movement. A vertical pin 701a extending through the plunger 699 protrudes from its bottom to pass through a hole in the trough bottom 691 and hold it at the top of the trough while loading the trough. When the pin 701a is raised as shown in the dotted line position, the plunger is free to move to the right.

Studs 702 are threaded into each end of the plunger 699 and protrude vertically from each end face thereof. Each stud extends through a slot 703 in a side wall 692 of the trough, where the protruding portions provide means for the attachment of flexible chain elements 704, one of which is provided on each side of the trough. Each chain extends to the right, as viewed in Figure 69, where they pass over pulleys 705 and thence back to pulleys 706. After passing over the pulleys 706, the ends of the chains 704 depend vertically downwardly and each chain has attached thereto a weight 707. The two weights 707 are of equal weight so that each side or end of the plunger 699 is urged with equal force to the right, as viewed in Figure 69, to thereby urge the stack of pamphlets in the trough to the right so that the stack is constantly pressed against the restraining bar 697.

The operation of the blade 695 which is vertically reciprocated to discharge the pamphlets one by one from the magazine and into each bucket as it passes under the magazine will now be described. As shown in Figure 3, the shaft 697 at the rear of the carton loading unit 106 protrudes through the vertical side wall 603 and carries a sprocket 708. As shown in Figure 69, a bracket 709 is attached to the outer surface of the vertical side wall 603 by screws 710 and separated from the wall 603 by spacers 711 so that the bracket 709 is vertical and parallel to the wall 603. At its upper end the bracket 709 supports a pair of spaced bearing assemblies 712 which support a stub shaft 713 for rotation and also hold it against axial movement. A sprocket 714 is suitably keyed to the shaft 713 and a chain 715 passes over the sprocket 714 and the sprocket 708 of Figure 3, so that the shaft 713 is driven at a speed proportional to the speed of the buckets 480 of the loading unit 106. A crank 715a is secured to the end of the shaft 713 and secured thereto by a suitable set screw 715b which prevents rotation of the crank upon the shaft but which may also permit angular adjustment of the crank upon the shaft for timing of the operation of the blade 695 with respect to the buckets 480 passing underneath the magazine. The blade 695, which extends transversely of the trough with its side edges slightly spaced from the side walls 692 thereof, as best shown in Figure 68, is secured to a cross-head 716 which has two vertically spaced rollers 717 on each end and riding in the grooves or tracks 694 on the insides of the walls 692. The rollers 717 and the tracks 694 guide the cross-head for vertical movement between the side walls 692 of the trough, whereby the blade 695 is properly supported and guided for its vertical reciprocating movement. A connecting rod having a lower section 718 pivotally connected to the crank 715a by a pin 718a has an upper part 718b which is pivotally connected to the cross-head 716 by a pin 718c. The length of the connecting rod is adjustable by reason of the fact that its two sections are connected by cap screws 719 which pass through a slot 719a in the lower section 718 and are threaded into the bottom of the upper section 718b. Rotation of the stub shaft 713 by the chain 715 therefore drives the cross-head 716 and the blade 695 with a vertical reciprocating movement through the crank 715a and the connecting rod. When in the position shown in Figures 68, 69 and 72, the blade 695 is at the upper end of its stroke and is ready to begin its downward movement and the discharge of a pamphlet from the magazine as pictured in Figures 73 and 74.

Although the lowermost pamphlet in the magazine is held therein by the engagement of its longer flap 690a with the restraining bar 697, its shorter flap 690b is not so restrained and may naturally spring forward to the position shown in Figure 72, due to the resiliency in the fold between the two flaps. A lower end wall 720a is attached to the side walls 692 at their lower or right end as viewed in Figure 69, being secured thereto as by brazing. This end wall 720a limits the separation of the shorter flap 690b from its longer flap 690a, as shown in Figure 72. As shown in Figures 69 and 72, the bottom wall 691 of the trough does not extend to the right as far as the ends of the side walls 692, and the lower end wall 720a is spaced slightly from the ends of the walls 692, by which construction there is provided a slot 720b in the bottom of the trough through which the pamphlet is ejected from the magazine, as shown in Figures 72-74.

As mentioned before, Figure 72 shows the relative positions of the bottom-most pamphlet in the trough with respect to the trough and with the blade 695 which is then at the upper end of its stroke. Figure 73 shows the blade 695 passing between the long and short flaps of the pamphlet during its downward movement. In this figure, the blade has not quite engaged the fold of the pamphlet to eject it from the magazine, and the long flap 690a is still engaging the restraining bar 697. As the blade 695 continues its downward movement, it engages the fold of the pamphlet and pushes the entire pamphlet vertically downward, as shown in Figure 74. The bucket 480 is passing beneath the magazine at the time that the blade 695 is pushing a pamphlet down to be engaged by the pamphlet holder 684 on the end of the bucket. The vertical distance between the pamphlet holder 684 on the bucket and the bottom of the magazine is such that the pamphlet will be partially inserted into the holder 684 before the top of the pamphlet has passed entirely through the slot 720b in the bottom of the magazine, as best shown in Figure 74. The blade 695, however, continues its downward movement until it reaches the bottom of its stroke, as indicated by the dotted line view 695a thereof in Figure 69, at which point the pamphlet has been inserted into and seated within the pamphlet holder 684 on the end of the bucket.

When the blade reverses direction and moves upwardly, the pamphlet will remain seated within the holder and be carried by the bucket 480 to be subsequently inserted in the carton in the manner previously described in connection with Figure 67.

While the natural resilience of the pamphlet will tend to cause the two flaps thereof to separate in the manner indicated in Figure 72, means is provided to assure that this separation takes place in the desired manner. A pair of air supply tubes 721 lead from an air pressure supply manifold 721a which is mounted upon the bracket 693 (Figure 69). These two air supply tubes 721 extend along the outer sides 692 of the magazine and then cross over to the inner sides thereof and pass through a support member therefor indicated at 721b. The tubes continue downwardly past the support 721b and terminate just above the restraining bar 697, as best shown in Figure 69, where they deliver a continuous blast of air downwardly and to the right, as viewed in Figures 69 and 72 to 74. The tubes 721 are adjustably secured within the support member 721b by means of screws 721c, so that their ends may be raised or lowered to obtain the most effective action of the air jets. While only two such tubes are shown, one adjacent each side of the trough, any number of such tubes may be provided between the side walls of the trough, depending upon the width of the trough, to assure that the long and short flaps of the pamphlets will be separated along their entire length. The jets or blasts of air from the tubes 721 assure that the short flap 690b will be separated from the long flap and blown towards the right, as indicated in the drawings. It is apparent that the only flaps which are subjected to this air pressure will be the short flap of the bottom-most pamphlet in the magazine. When a pamphlet is being ejected, as shown in Figure 74, the next pamphlet will have its short flap separated from the long flap in the same manner, but the blade 695 itself restrains the shorter flap from completely opening, as best shown in Figure 74. When the blade is on its upward stroke and clears the end of the short flap, then its restraining influence is terminated and the short flap is positively opened to the position shown in Figure 72. For this reason, there is no necessity of interrupting the air jets to render them effective only when the blade is in the upward position, and therefore it is not necessary to provide means to interrupt the air jets and time them in relation to the movement of the blade.

A pair of rollers 722 are provided adjacent the inside surface of each of the side walls 692 and adjacent the slot 720b in the bottom of the magazine. These rollers serve to guide the pamphlet through the slot 720b. Each roller is mounted upon a bar 722a having an elongated slot 722b therethrough, and the bar is adjustably secured to a side wall 692 by a screw 722c. This permits adjustment of the rollers 722 towards or away from the right hand edge of the inclined bottom 691, as viewed in Figure 69.

Similar rollers 723 are mounted upon bars 723a and adjustably secured to the inner surfaces of the side walls 692 by means of screws 723b, which are threaded into the side walls and pass through slots 723c in the bars. The pair of rollers 723 are arranged above the pamphlets in the magazine and are slightly separated from the side walls 692 of the trough by the thickness of their supporting bars 723, so that they engage the blade 695, which, as shown in Figure 68, does not extend completely to the inner surfaces of the side walls 692.

It is pointed out that, as shown in Figure 69, the buckets 480 have a position corresponding to that shown at the position A in Figure 67, wherein it is shifted slightly towards the transport so that the pamphlet can be inserted. This shifting of the buckets towards the transport is accomplished by the offset sections 724 and 725 in the guide tracks 633 and 634, as shown clearly in Figure 3. This shifting of the buckets, to allow the pamphlets to be inserted into the holders 684 thereon, makes it possible to insert pamphlets which have a total length such that the pamphlets in adjacent buckets overlap, as shown in the positions at B and C in Figure 67. If the bucket were not shifted in this manner, the overlapping edges of such elongated pamphlets would jam during the insertion of the pamphlet into the holder.

The reciprocating movements of the blade 695 are so timed with respect to the movement of the buckets 480 that the bucket is in the proper position to receive and hold the pamphlet when the blade 695 is substantially at the bottom of its stroke. The timing of the blade 695 to accomplish this is by the adjustment of the angular position of the crank 715a upon the stub shaft 713 by means of the set screw 715b, although it is to be understood that any other suitable method of timing the motion of the blade may be used. For example, the sprocket 714 might be mounted for angular adjustment upon the shaft 713 in the same manner that the sprocket 295 is shown to be angularly adjustable in Figures 19 and 16.

*Merchandise loading unit*

One embodiment of the automatic merchandise loading unit 108 of Figures 1 and 2 is shown in enlarged detail in Figures 75 and 76. At the rear end of the carton loading unit 106, the side walls 602 and 603 are connected by an end wall 726, shown in Figures 3 and 75. The loading unit 108 is not shown in Figure 3 but is shown generally in Figures 1 and 2. Referring to Figure 75, a bracket 727 is secured to the end wall 726 as by screws 728. A trough having side walls 729 and 730 and a bottom 731 is secured to the top of the bracket 727 as by welding, and is inclined downwardly towards the loading unit there so that the bottles 732 will feed by gravity.

A bucket 480, which is a modification of the type shown in Figure 63, is shown in position to receive one of the bottles 732 from the trough, and in Figure 75 a bottle is shown resting in the bucket. It is to be understood that the particular form of bucket shown in Figure 75 is by way of example only, and that any of the disclosed forms may be used, as well as any other suitable type of bucket.

Means are provided to allow a bottle to be discharged from the trough only when a bucket is in the proper position to receive it. An upper stop member 733 and a lower stop member 734 are simultaneously actuated upwardly and downwardly. When they are in their upper position, as shown in Figure 75, the upper stop 733 has released a bottle at the bottom of the trough so that it has rolled into the bucket 480. The remaining bottles in the trough are kept from rolling downwardly by the lower stop 734 which has been raised to a position where it retains all of the remaining bottles in the trough. When the two stop members are moved to the lowest part of their stroke, the upper stop 733 is lowered to a position where it closes the trough and retains all of the bottles therein. The two stop members are at the lowest part of their stroke when the lever 741 is in the position shown at 741a. At the same time the lower stop 734 is withdrawn to a position below the bottom 731 of the trough so that the remaining bottles of the trough can roll down until they are stopped by the upper stop member 733. The bottom 731 of the trough has a slot 735 therethrough so that the lower stop 734 can pass therethrough and engage the bottles.

The reciprocating movement of the stops 733 and 734 results from the action of a cam 736 which is mounted on the shaft 607 and secured in any adjusted angular relation with respect thereto by a set screw 737. As shown in Figure 76, the cam 736 has an axial position on the shaft 607 between the sprocket 609 and the outer wall 602 of the loading unit. A pair of spaced brackets 738 and 739 are carried by a yoke 740 which secures them to the horizontal wall 604 of the loading unit. A lever 741 is mounted on a shaft 742 which is journalled for rotation in the brackets 738 and 739 so that the lever 741 is rotatable in a vertical plane. A coiled tension spring 743 is attached to the lever 741 and urges it in a clockwise direction as viewed in Figure 75. At its forward end, the lever 741 has a vertical slot 744 within which a cam follower roller 745 is journalled, as by a pin 746. The cam follower roller is engaged by the cam 736 to rotate the lever 741 clockwise against the resilient force of the spring 743. A bar 747 is attached to the rear end of the lever 741 as by screws 748. The bar 747 extends horizontally towards the other side of the loading unit as shown in Figure 76. At its free end the lower stop member 734 is secured to the free end of the bar 747 as by screws 749. A yoke 750 is secured to the bar 747 as by screws 751, and extends upwardly to a point adjacent the top of the trough where it carries the upper stop member 733 which is secured to the yoke as by screws 752.

Thus the upper and lower stop members 733 and 734 are reciprocated in timed relationship with the movement of the bucket 480 so that a bottle 732 is released to drop into a bucket as the bucket reaches the proper point in its travel. Proper timing of the stop members is accomplished by adjusting the angular position of the cam 736 upon the shaft 607 and securing it by the set screws 737. The stop members are actuated to release three bottles into three consecutive buckets for every revolution of the shaft 607 by reason of the fact that the cam 736 has three equally angularly spaced inclines 752 thereon. The bottles 732 may be fed to the trough which is supported by the bracket 727 in any desired manner, and in Figure 2 is shown an inclined ramp 853 which delivers the bottles from a source of supply to the entrance of the trough.

*Automatic safety stop controls*

During the operation of the machine, it occasionally happens that a carton does not properly erect. When this happens the carton is squeezed and usually deforms so as to take a position shown by the right hand carton in Figure 42, where the top flap of the carton is shown extending to the rear of the machine. When the carton does erect properly the leading and trailing side flaps and the top flap take positions such as shown by the right hand carton of Figure 41. I have provided means to automatically stop the operation of the machine by disconnecting the electric supply to the drive motor when a carton fails to erect as shown in Figure 42. Referring to Figure 77, a switch box 755 carries a hollow stud 756 which is threaded through the top web of the hold-down bar 309. A lock nut 757 secures the stud and switch-box against movement due to vibration or the like. A pin 758 is slidably mounted in the bore of the hollow stud 756 and actuates a suitable switch mechanism inside the box 755 so as to close the switch when the pin 758 is in an upward position as shown in Figure 77. The pin 758 is spring biased downwardly so that it requires a force against the pin 758 to push it upwardly and close the switch. This switch is in the circuit of the drive motor for the machine and if the switch is open, the motor will not run.

A lug 759 is secured to the top web member of the hold-down bar 309 as by a screw 761. A channel shaped weight having downwardly depending legs 763 and 764 is pivotally secured at its rear end portion to the lug 759 by a pin 765. The weight 762 is so disposed between the side wall members of the hold-down bar 309 that the bottom edges of its legs 763 and 764 will lie in the same horizontal plane as the bottom edges of the hold-down bar 309.

This construction allows the weight 762 to rest upon the top of a carton which has been properly erected and is moving towards the forward end of the transport. If, however, a carton does not erect, as has happened with the right hand carton of Figure 42, the free rear end of the weight 762 will drop to a position as shown in Figure 43 because there is no carton to hold the rear end of the weight up. The top wall of the weight 762 is provided with an adjustable set screw 766 as shown in Figure 77. When the free end of the weight is resting upon an erected carton, it will have the position as shown in Figure 77 and the set screw 766 will hold the pin 758 in its upper position to close the switch in the box 755. If the rear end of the weight falls because there is no carton underneath it or because the carton has failed to erect, then the weight will drop, lowering the set screw 766 and permitting the pin 758 to fall and open the switch.

When the machine has been stopped by the opening of the switch in the box 755, the operator may raise the pivoted overarm 311 and the hold-down bar 309 carried thereby so that he can have access to the machine to clear it of the collapsed carton. Figure 43 shows the hold-down bar 309 raised to this position. A rod 767 passes through the bore in the top wall of the hold-down bar 309 and is threaded into the top wall of the weight 762. At its upper end, the rod 767 has a handle 768 by which the operator can raise the rod and the weight 762 to close the switch in the switch box 755 in order to close the circuit to the motor when resuming operation of the machine. Just above the top wall of the hold-down bar 309 a collar 769 is adjustably secured to the rod 767 by a set screw. This collar provides a stop to limit the downward movement of the weight 762. When the machine is operated normally and the weight 762 is raised to close the switch, the collar 769 is spaced slightly above the hold-down bar 309, as shown in Figures 77 and 41. Figure 42 shows the collar 769 resting upon the hold-down bar because the collapsed carton has allowed the weight 762 to fall.

Machine for straight tuck cartons

The machine so far described is a complete machine for the handling of reverse tuck cartons wherein the top flaps are attached to different walls of the carton as shown in Figure 18. As mentioned before, the elements on the cartoning machine can be readily rearranged so that they can handle straight tuck or airplane flap cartons. An example of a straight tuck or airplane flap carbon is shown in Figure 79, and it will be seen that the top flaps are attached to the same side wall of the carton at the open ends of the carton. While both Figures 18 and 79 show cartons of such proportions that the side flaps will overlap, it is to be understood that they are illustrative examples only and the cartoning machine also handles the cartons where the carton width is such that the side flaps do not overlap when the carton is closed.

When handling airplane flap or straight tuck cartons, the only part of the machine that has to be changed to the extent that elements are rearranged thereon is the cartoning machine itself. No changes are required in the magazine 103 or in the mechanism which feeds the flattened cartons to the transport for erection and closing except those adjustments normally required when changing over to handle cartons of different sizes. No changes are required in the structure or arrangement of the carton loading unit 106, except that adjustment of the various parts thereof may be needed to handle a particular size carton.

Figure 81 is a top plan view of the cartoning machine as rearranged to handle the straight tuck cartons. Figure 81 therefore corresponds to Figure 3, with the exception that the carton loading unit 106 of Figure 3 is not shown at all in Figure 81 since the details of its construction and its method of cooperation with the cartoning machine are the same, whether the cartoning machine is handling reverse tuck cartons as shown in Figure 18, or whether it is handling straight tuck cartons as shown in Figure 79. Also, that part of the cartoning machine which includes the carton magazine (103 in Figure 4) and the mechanism for feeding the cartons from the magazine to the transport are omitted from the top plan view of Figure 81 and the side elevation of Figure 82, because the details of their construction are exactly the same as shown in Figures 3 and 4.

Referring now to Figure 81, the flattened cartons pass from left to right thereon while they are being filled and their ends closed. Figure 80 is a top plan view of the carton of Figure 79 but flattened as it is in the magazine 103, showing the relative disposition of its side and top flaps as it moves to the right to come under the influence of the cartoning machine beginning at the left end of Figure 81. It will be noted that leading side flap 831 overlies the top flap 828 on each side of the carton. The flaps on the unloaded end of the carton are handled in exactly the same manner in the machine shown in Figure 81 as they are handled in the cartoning machine shown in Figure 3.

In Figure 81 the compound 801 is attached to the side of the cartoning machine base 802 and carries a parting blade 803, a plow 803a, and a reversing plow 804 in the same manner as does the machine shown in Figure 3, and these elements carried by the compound 801 operate upon the side flaps of the carton to close them in the same manner as is shown in Figure 27. With the side flaps closed, the carton is moved to the right in Figure 81 and an elongated back-up bar 805 keeps the side flaps closed and holds the carton against endwise movement on the transport while it is being loaded through the other end. The back-up bar 805 is mounted upon two compounds 806 and 807 for adjustment transversely of the transport. An over-arm 808, similar to the over-arm 311 of Figure 3, carries a hold-down bar 809. A flop weight 810 which is similar in all respects to the flat weight 313 of the first machine described, is pivotally attached to the left end of the hold-down bar 809. A second over-arm 811, similar to the over-arm 808, is mounted upon the same side of the cartoning machine base 802 and carries a hold-down bar 812. The over-arm 811, however, is also provided with an adjustable slide 813 which is identical with the slide 402 (Figures 35 and 36) of the first described machine. The reason for reversing the position of the over-arm 811 from the position of the over-arm 312 of Figure 3 will be apparent as the description progresses.

In Figure 83 the over-arm 811 is partly cut away to expose several elements which lie under it and operate upon the flaps on the carton opposite to its loading end. A compound 814 has attached to it an elongated supporting bar 815 which extends to the right and under the over-arm 811 where it carries a tuck flap creasing assembly 816, which is similar to the assembly shown in Figures 30–34 and carried by the compound 386. A compound 817 is attached to the vertically movable portion of the over-arm 811 instead of being attached to the side of the cartoning machine base 802. This compound 817 carries a blade 818 which provides a back-up bar for the closed end of the carton while the tuck flap is being creased by the assembly 816, and which also contains a longitudinally extending slot extending towards the forward or right end of the machine as viewed in Figures 81 and 82 to guide the tuck flap into the carton, all as previously explained in connection with Figures 38 to 40 which relate to the reverse tuck machine. The blade 818 therefore corresponds to the blade 412 of Figures 38 to 40, and its functions are identical thereto although it is considerably longer and extends farther to the right in the machine shown in Figures 81 and 82. Since the compound 817 is carried by the over-arm 811, the blade 818 is both transversely and vertically adjustable on the machine so that the slot therein for guiding the tuck flap into the carton may be moved vertically to accommodate cartons of various heights as well as being moved transversely to accommodate cartons of various lengths. The elongated supporting bar 815 carried by the compound 814 is recessed on its upper edge portion to provide a passage for the compound 817.

Compound 819 is mounted upon the cartoning machine base and carries a plow 820 which cooperates with the blade 818 to raise the top flap of the carton and direct the tuck flap through the slot in blade 818 and into proper position in the carton, in the same manner as does the plow 399 carried by the compound 408 in Figures 3 and 38.

A compound 822 carries a pair of rollers 823 and 824 in the same manner and for the same purpose as does the compound 421 of Figure 3. Thus, when the carton passes the last roller 824, its lower end, as viewed in Figure 80, is entirely closed. While these operations have been taking place on the said lower end of the carton, the other or the loaded end of the carton has been loaded and has had its side and top flaps closed as will presently be described.

By reason of the fact that the top flap of the carton on the end through which it is loaded is attached to the bottom wall of the carton, the parting blade assembly, indicated generally at 827 in Figure 81, and shown also in Figures 84 and 85, differs slightly from the one used in connection with the reverse tuck carton and illustrated in Figures 21, 22 and 41. As shown in Figure 84, the top flap of the carton is held down by the parting blade during the entire time that the carton is erected and until the side and top flaps thereof come under the influence of a bucket 480 which holds them in open position for insertion of the article of merchandise as shown in Figure 86.

The rollers 363 shown in Figures 21 and 22, which guide the top flap 828 under the parting blade, are not shown in Figures 84 and 85 because they are identical to and operate in the same manner as those shown in Figures 21 and 22. The parting blade 829 is attached to and spaced slightly above the cross slide 447 in the same manner as is the parting blade 450 of Figures 21 and 22, to allow the top flap 828 of the carton to pass underneath the parting blade while the carton is being erected. At its forward end, the parting blade 829 is provided with an integral extension 830 which lies slightly below the plane of the rest of the parting blade and serves to depress the carton top flap 828 as shown in Figure 84, and to hold it in this position until a bucket 480 engages the said top flap to hold it down as shown in Figure 86 while the article of merchandise is being inserted into the carton.

Referring to Figure 80, it will be seen that the leading side flap 831 overlies the top flap 828. The trailing side flap 832 lies in substantially the same plane as the top flap 828. Since the top flap 828 is longer than the side flaps 831 and 832, the rollers 363, illustrated in Figures 21 and 22, are so positioned when the magazine is adjusted to accommodate the cartons that the roller depresses the top flap 828 to insert it under the parting blade, but does not engage the shorter flaps 831 and 832, which therefore ride over the top surface of the parting blade 829 until they engage a plow 833 mounted on its upper surface which bends them upwardly as shown in the carton in the right hand position of Figure 84. Attention is here called to the fact that the particular carton shown in Figure 84 is so proportioned that when closed, its side flaps will not overlap.

A bar 834 is attached to the forward portion of the plow 833 and serves to hold the side flaps 831 and 832 in their upward position. A second plow 835 is mounted upon the upper surface of the parting blade 829 adjacent its forward end and near the extensions 830 thereon. The carton becomes erected while it is moving from right to left in Figure 84 and while passing the plow 833 and the bar 834 attached thereto. When the carton erects, its leading side flap 831 extends forwardly from the carton in the direction of travel, and it is held in this position by the plow 835. The trailing side flap 832, however, since it was bent upward before the carton was erected, extends to the left in Figure 84 and overlying the open end of the carton when the carton has finished erecting. As the carton continues to move from right to left, however, the trailing side flap 832 enters the gap between the end of the bar 834 and the plow 835. Continued movement of the carton towards the left causes the trailing side flap to be rotated to an open position as shown in Figure 84, so that the plow 835 is in effect a reversing plow which reverses the position of the trailing side flap 832 from a closed position to an open position so that it does not obstruct the passage of the merchandise into the carton. While the bar 834 is shown to be hingedly attached to the plow 833 so that the bar can rotate in a vertical plane, this hinged construction is not required when the plow 833 and the bar 834 are used in connection with the straight or airplane flap cartons since there is no force lifting the bar 834 upwardly as is the case when a reverse tuck carton is being handled.

As the carton leaves the influence of the parting blade assembly 827 and the extension 830 on the forward end thereof, the leading side flap 831 and the top flap 828 are held in the positions shown at the left end of Figure 84 by the engagement of the buckets 480 with the flaps as shown in Figure 86. The trailing side flap 832 is also held in open position by the end of the bucket, all as previously described in connection with the handling of the reverse tuck cartons. Under some circumstances it may be found necessary to attach an extension to the plow 835 to hold the side flaps open in the same manner as does the extension 456, shown in Figure 41. Figure 86 shows how the top flap 828 is held down by the buckets 480 and how it furnishes an inclined plane connecting with the plane of the bottom of the carton to assist in guiding the articles of merchandise into the carton during their insertion therein.

The merchandise is loaded into the cartons by the same mechanisms and in the same manner as it is loaded into the reverse tuck cartons, as illustrated in Figures 41 and 44, and no further description of this operation is necessary.

After the merchandise has been inserted into the carton, the carton continues to move from left to right as viewed in Figures 81 and 83. Its leading end and trailing side flaps 831 and 832, and its tuck flap 828 are still substantially in the same positions as they were during the carton loading operation. Indicated generally at 837 in Figure 81 is a star wheel assembly 837, which is shown pictorially in Figure 87 and in section in Figure 88. The essential element of the assembly 837 is a blade 838 which is fixed to a shaft 839 as by set screws 840 so that it may be angularly adjusted about the shaft and fixed in any desired position. The blade 838 is rotated in a counterclockwise direction as viewed in Figure 87 so that the bottom portion of its path lies in a plane slightly beyond the open end of the carton. The blade is driven at such an angular velocity that the blade itself, during the bottom portion of its path, moves in the same direction as the carton but at a faster speed, so that it can come up behind a trailing flap 832 and turn the flap forwardly to its closed position. Indicated at 840 in Figures 81 and 83 is the rear end of a fixed plow which engages the leading end flap 831 to push it backwards into its closed position. Thus the action of the rotating blade 838 and the plow 840 is the same as the action of the rotating blade 481 and the plow 483 of Figure 44.

It will be noted in Figures 81 and 83 that the left end of the back up bar 875, which forms the plow 840, is inclined outwardly instead of being substantially coplanar with the bar as is the case with the plow 483 and the back up bar of Figures 44 and 48. This outward inclination is a preferred construction in either event, whether the carton side flaps overlap when closed, as in Figure 44, or whether the carton width is such that the side flaps do not overlap when closed, as in the carton of Figure 84. Since the leading side flap 831 will not overlap the trailing side flap 832 to close it in the latter case, the trailing side flap may spring back slightly, after being properly turned by the rotating blade 838 (or 481 in the case of the reverse tuck machine shown in Figure 44). In such case if the plow 840 were straight as is the plow 483 of Figure 44, then it might enter under the trailing side flap and reverse it back to its open position. Since the plow 840 is inclined, however, it will ride over the trailing side flap and urge it back to closed position as the carton moves forward and behind the back up bar 875.

The shaft 839 which carries the blade 838 is mounted within a housing 841 which is adapted to be mounted upon the side wall on the cartoning machine base by cap screws passing through holes 842 in the housing. The sectional view of Figure 88 shows the interior construction of the housing 841 and the means by which the shaft is adjustable transversely towards or away from the transport to vary the vertical plane of rotation of the blade 838 in accordance with the length of the carton being handled.

As shown in Figure 88, the drive shaft 487 of the carton loading unit 106 is rotatably mounted at one end in a bearing 488 in the side wall 603 of the loading unit and projects into the cartoning machine base 102 where it has keyed thereto a double sprocket 845. The chain 493 passes over one set of the teeth of the double sprocket to drive the sprocket 845 and the shaft 487 from the sprocket 494 on the head shaft 288 as shown in Figure 16. The other set of teeth on the double sprocket 845 receive a chain 846 that also passes over a sprocket 844 which is affixed and keyed to a shaft 847 which is rotatably mounted in spaced bearings 848 and 849 of the housing 841. The housing 841 has a recess 850 therein, the open end of which is closed by a plate 851 secured thereto as by screws 852 and carrying the aforesaid bearing 848. The shaft 847 has mounted thereon a gear 853 which is secured against rotation by a key 854 and is axially located between the bearings 848 and 849 by an integral shoulder 855 and a spacer washer 856.

In the upper part of the housing 841 a sleeve 858 is journalled for rotation in a pair of spaced bearings 859 and 860. At its left end the sleeve 858 has an integral pinion 861 which is in meshing engagement with the gear 853 and is of such size that it is driven at three times the angular velocity of the gear 853. The shaft 847 is driven at the same angular velocity as the shaft 487 so that the speed multiplication ratio between the shaft 487 and the gear 861 is three to one. Axial movement of the sleeve 858 is prevented by a spacing washer 862 and a nut 863 threaded onto the left end of the sleeve, the washer 862 and a nut 863 engaging the inner races of the bearings 859 and 860 respectively. A closure plate 864 surrounds the end of a sleeve 858 and is attached to the housing 841 as by screws 857 to prevent the entrance of foreign matter into the housing. The shaft 839 has a sliding fit within the central bore of the sleeve 858, so that the shaft may move axially with respect thereto. The shaft 839 is prevented from rotating with respect to the sleeve 858 by means of a key 865 which is seated partly within the sleeve and partly within the shaft. The plate 851 which closes the recess 850 in the housing 841 has an aperture in alignment with the shaft 839. A hollow boss 866 having internal threads is mounted within the said aperture and fixed to the plate 851 in any suitable manner. A rotatable spindle 867 is threadedly mounted within the threaded bore of the hollow boss 866. At its outer end, the spindle 867 has affixed thereto for rotation therewith, a cup-shaped knob 870 which has a wall portion surrounding the boss 866. As the knob 870 is rotated, it moves to the right or left due to the threaded engagement of the spindle 867 with the boss 866. At its right end, the spindle 867 is provided with a cavity which receives a flange 872 on the left or inner end of the shaft 839. A split ring 873 on the end of the spindle 867, and secured thereto to any suitable manner, engages the other side of the flange 872, so that as the spindle 867 is moved to the right or to the left, it will simultaneously shift the shaft 839 which carries the rotating blade 838. The fit between the shoulder on the inner end of the shaft 839 and the mating parts on the spindle 867 is such that there is a minimum of friction between the rotating shaft 839 and the stationary block 867, and the threads on spindle 867 and boss 866 have a relatively tight fit, but not so tight as to prevent adjustment by the knob 870. Thus the rotating blade 838 may be moved towards or away from the center line of the transport in accordance with the length of the carton being handled thereby. The right edge of the knob 870 may be read against a scale on the hollow boss 866 to indicate the exact position of the blade 838 so that it may be pre-set to the correct position to handle any particular length of carton within the range of the machine.

As mentioned before, as the carton moves from left to right in Figures 81 and 83, the trailing side flap 832 is closed by the rotating blade 838 after which the leading side flap 831 is folded back to overlie the end of the carton by the stationary plow 840. The only thing remaining is to crease the tuck flap on the end of the top flap 828, insert the tuck flap into the carton, and push the top flap to its vertical position whereupon the carton is closed.

The plow 840 is integral with and is in fact an extension of an elongated back-up bar 875 which is attached to and carried by the slide 813 which is transversely adjustable within the overarm 811. Back-up bar 875 engages the end of the carton and holds it against transverse movement while the remaining tuck flap is being creased. A compound 876 is mounted upon the side of the cartoning machine base and carries a tuck flap creasing assembly indicated by the reference number 877. This assembly is the same as that indicated at 816 on the opposite side of the machine, and similar to the one shown in detail in Figures 30–34. The back-up bar 875 extends to the right in Figure 81 and terminates in a slotted blade 878 opposite to a plow 879 which is carried by a compound 880. The function of the slotted blade 878 is the same as that of the blade 412 shown in Figures 38–40 and also in Figure 35. That is, the slot therein, corresponding to the slot 414 of Figures 35 and 40, guides the tuck flap into the end of the carton. A curved guide plate 882 and a spacer bar 881 are carried by the slotted blade 878 to lead the tuck flap into the slot provided in the slotted blade 878 in the same manner that the corresponding elements 416 and 417 (Figure 40) function. Since the back-up bar 875 and the integral slotted blade 878 are carried by the slide 813 attached to the over-arm, the slotted blade 878 is vertically adjustable to properly locate the slot to guide it into the carton, and is transversely adjustable in accordance with the length of the carton being handled.

A compound 883 carries a pair of rollers 884 and 885 which act against the top flap of the carton to close it entirely and push the tuck flap all of the way in. These rollers complete the closing of the loaded end of the carton but since the other end of the carton has not been completely closed by the rollers 823 and 824, a back-up plate or bar 886 is mounted upon a compound 887 to hold the carton against transverse movement while the rollers 823 and 824 on the other side of the machine are performing the final operation on that end.

It is therefore apparent that the only change required to adapt the machine to handle an airplane or straight-tuck carton is a rearrangement of the elements which operate upon the flaps of the cartons. The other changes required are the substitution of a different type of parting blade in the parting blade assembly 827 and the substitution of a different type of rotating blade for closing the trailing side flap 832 of the carton on its loaded end after the merchandise has been inserted. For handling either type of carton, the machine is substantially the same in either instance since the arranging of the machine to handle either one or the other type of carton merely involves the rearranging of the elements as described, and all of the inherent advantages of the method of erection of the carton, the closing of the flaps thereon, and the loading of the merchandise therein are retained.

I have shown and described how the flaps on one end of the carton may be closed whether the top flap of the carton is attached to the bottom wall while passing through the machine, or whether it is attached to the top wall while through the machine. It is thus apparent that the machine may be arranged to handle a reverse tuck carton and yet have the advantages of a carton wherein the top flap is attached to the bottom wall of the carton on its loading side. When handling a reverse tuck carton and inserting the merchandise in the end with the top flap attached to the bottom of the carton, the other side of the carton will have the top flap attached to the upper wall of the carton. In this case, the flap which is attached to the top wall will be handled by the same arrangement of elements as are shown on the upper half of the cartoning machine base in Figure 3. Thus the machine, when suitably arranged, can have the top flap attached to either the top wall of the carton or the bottom wall of the carton as it passes through the cartoning machine, either on the loading end of the carton or on the other side thereof. No matter which type of carton is used and irrespective of whether the top flap is attached to the bottom wall or the top wall of the carton on its loading end, all of the inherent advantages of the machine such as its high speed operation and its absence of reciprocating mechanisms will remain. It is fully adjustable to handle any size carton within its designed range, no matter which type of carton is being used. In some installations, due to the floor plan layout, it is desirable to place the carton loading unit 106 on the other side of the transport. This is readily accomplished merely by reversing the respective locations of the cartoning machine base and the loading unit 106, and no redesign of the machine is necessary.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a cartoning machine, a horizontal base; a series of pairs of spaced elements projecting vertically from said base; means for moving said elements continuously along said base, each pair of elements being adapted to engage the sides of a carton to move it along said base with the end flaps extending transversely thereof; an over-arm parallel to and overlying said base for engaging the top sides of the carton during their movement; a feeder operable to feed single flattened cartons to successive pairs of said elements; an assembly for holding the cartons flattened until they are engaged by said elements; a stationary parting blade operable to separate the top flap from the side flaps on one end of the carton; a stationary plow operable to raise the side flaps to a near vertical position; means operable to compress the carton between elements of said pairs of elements after said side flaps are raised and while still engaging said stationary plow, whereby the carton is erected and the trailing side flap thereof is closed while the leading side flap is opened; stationary means for closing the leading side flap and subsequently the top flap of the carton.

2. In a cartoning machine wherein flattened cartons are erected and their ends closed, a base; a carton transport for moving cartons along said base; a parting blade spaced slightly above said base; means for guiding a carton top flap between said base and blade; a pair of longitudinally spaced plows affixed to the top of said blade; and means for erecting the cartons during their movement from one said plow to the next, one of said plows being operable during the carton erection to close one of said side flaps on one end of the carton and the other of said plows being operable to close the other of said side flaps after the carton erection.

3. In a cartoning machine, a transport operable to receive a flattened carton and erect and move the same after erection; a parting blade on one side of said transport operable to separate the side flaps from the top flap on one end of a moving flattened carton; and means on said parting blade operable to close both side flaps on the same end of the carton during such erection and movement.

4. In a cartoning machine, a transport operable to move and erect a carton; a first parting blade on one side of said transport operable to separate the side flaps from the top flap on one end of a moving carton prior to erection of the carton; means on said first parting blade operable to close both side flaps on the same end of the carton during the erection and subsequent movement of the carton; a second parting blade on the other side of said transport operable to separate the leading side flap of the carton on the other side thereof from the top and trailing side flap; and means adjacent said second parting blade operable during the erection and subsequent movement of the carton to open both side flaps on that end of the carton.

5. In a cartoning machine, a first conveyor; a second conveyor, means for driving said conveyors; said conveyors being relatively disposed to convey cartons and merchandise respectively in such relative alignment that the merchandise may be shifted transversely for insertion into the cartons; a series of buckets on said second conveyor for holding the merchandise; means for shifting said buckets towards said first conveyor to a point adjacent said first conveyor and in alignment with the cartons carried thereby; and means operable to push the merchandise from the buckets into the aligned cartons.

6. In a cartoning machine, a first conveyor; a second conveyor; means for driving said conveyors; said conveyors being relatively disposed to convey cartons and merchandise respectively in such relative alignment that the merchandise may be shifted transversely for insertion into the cartons; a series of buckets on said second conveyor for holding the merchandise; means for shifting said buckets towards said first conveyor to a point adjacent said first conveyor and the cartons carried thereby; a plunger carried by each bucket and adapted to engage the merchandise therein, said plungers being movable with respect to the bucket towards and away from said first conveyor; and means for moving said plungers to transfer merchandise from said buckets to the cartons.

7. In the cartoning machine described in claim 6, said buckets being mounted for sliding movement transverse to the direction of movement of said second conveyor; and stationary means engageable by said buckets during the movement of said second conveyor to shift them transversely towards and away from said first conveyor.

8. In the cartoning machine described in claim 7, said plungers being slidably mounted with respect to said buckets, and said plunger moving means comprising stationary means engageable with said plungers during the movement of said second conveyor.

9. In the cartoning machine described in claim 8, said stationary bucket and plunger engaging means being adjustable transversely of said secondary conveyor to change the stroke of said buckets and plungers in their movements toward and away from said first conveyor.

10. In a cartoning machine, a first conveyor; a second conveyor; means for driving said conveyors; said conveyors being relatively disposed to convey cartons and merchandise respectfully in such relative alignment that the merchandise may be shifted transversely for insertion into the cartons; said second conveyor having means thereon and movable therewith defining a pamphlet receiving slot interposed between the adjacent ends of the cartons and the articles and independently operative to hold advertising pamphlets or the like in alignment with and between the merchandise on said second conveyor and the cartons on said first conveyor; means for automatically placing pamphlets on said pamphlet holding means; and means operable to shift the merchandise transversely from said second conveyor into the cartons on said first conveyor, whereby the merchandise in its movement inserts the advertising pamphlets into the cartons.

11. In a cartoning machine, a first conveyor adapted to carry cartons; a second conveyor adjacent said first conveyor and having a series of buckets thereon, said buckets being so disposed as to hold merchandise articles in alignment with the cartons on said first conveyor for insertion therein during the movement of said conveyors; means for driving said conveyors; means on said buckets and movable therewith defining a pamphlet receiving slot interposed between the adjacent ends of the cartons and articles and independently operative to hold advertising pamphlets or the like in the path of movement of the merchandise articles while being inserted into the cartons; means for attaching pamphlets to said pamphlet holding means and means operable to shift the merchandise articles transversely from said buckets into the cartons on said first conveyor, whereby the merchandise in its movement inserts the pamphlets or the like into the cartons.

12. In a cartoning machine, a first conveyor adapted to carry cartons; a second conveyor adjacent said first conveyor and having a series of buckets thereon, said buckets being so disposed as to hold merchandise articles in alignment with the cartons on said first conveyor for insertion therein during the movement of said conveyors; means for driving said conveyors; means on said bucket adapted to hold advertising pamphlets or the like in the path of movement of the merchandise articles while being inserted into the carton, said pamphlet holding means on said bucket being constructed and arranged to hold the pamphlet substantially in a vertical plane paralleling the direction of movement of the conveyors, whereby the length of the pamphlet may be greater than the distance between adjacent buckets so that adjacent pamphlets may overlap at their ends; a first means for shifting said buckets transversely of said second conveyor and then back again; and means for attaching the pamphlets to the buckets while they are so shifted, whereby the pamphlets will not engage the pamphlets of adjacent buckets while being attached; and means operable to shift the merchandise articles transversely from said bucket into the cartons on said first conveyor, whereby the merchandise in its movement inserts the pamphlet or the like into the cartons.

13. In the machine described in claim 12, means operable to shift the buckets transversely towards said first conveyor in sequence before the merchandise is transferred to the cartons, whereby the pamphlet on the shifted bucket is moved from the plane of the pamphlets of the succeeding buckets so that its trailing portion does not overlap them.

14. The machine described in claim 13, wherein said pamphlet holding means on the buckets comprise vertical slots open at the top, substantially parallel to the direction of movement of said second conveyor, and adjacent the discharge end of the buckets.

15. The machine described in claim 14 wherein said means for attaching the pamphlets to the buckets comprises a magazine disposed over the buckets on said second conveyor and adapted to hold a supply of pamphlets and position them for insertion, one by one, into said vertical slots in sequence, said magazine being so constructed and arranged as to hold a pamphlet about to be discharged in a vertical plane and in alignment with a slot on a bucket while said bucket is shifted towards said first conveyor; and means for moving the pamphlet downward in a vertical plane and inserting it in said slot.

16. For use in a cartoning machine, a bucket comprising a bottom wall; parallel side walls, said side walls having means providing guide ways for a plunger; a plunger mounted within said bucket on said guideways for movement longitudinally of said bucket; stops limiting the movement of said plunger, one of said stops permitting said plunger to protrude from said bucket at one end; and means for mounting said bucket upon a conveyor for sliding movement in the same direction as said plunger.

17. The bucket described in claim 16 wherein said bucket is provided with means providing a transverse groove for holding a pamphlet adjacent said one stop.

18. In the bucket described in claim 16, an intermediate wall between said side walls, said intermediate wall being adjustably mounted in parallel spaced relation to one side wall, and so constructed and arranged as to permit free movement of said plunger.

19. The bucket described in claim 16 wherein said plunger is a light-weight plastic having a low coefficient of friction with said guide ways.

20. A cartoning machine comprising a continuously moving transport; a feeding mechanism for delivering flattened cartons to said transport in timed relation with its movement, said flattened cartons having their end flaps disposed on opposite sides of said transport; means for separating the side flaps from the intermediate flaps on one end of the cartons; a stationary plow operable to deflect the side flaps to a position substantially perpendicular to the intermediate flaps; means operable, after the side flaps have been deflected but while still engaging the stationary plow, for compressing the cartons in the direction of transport travel to erect them; means for holding the cartons against the transport while being compressed; whereby the cartons are erected and the trailing side flaps thereof are closed while the leading side flaps remain open; stationary means operable subsequently for successively closing the leading side flaps and the top flaps of the cartons.

21. In a cartoning machine, means defining a loading station; a first conveyor for successively conveying erected, open ended cartons along a fixed path through said loading station in spaced relationship, to each other; a second conveyor movable along a second path for successively conveying articles of merchandise to said loading station; said second conveyor including a series of article retaining elements on said second conveyor for supporting the articles in spaced relation on said second conveyor throughout their movement therewith, said elements being mounted for transverse reciprocation thereon and spaced therealong in alignment with the spaced erected cartons on said first conveyor at said station; means at said loading station for shifting said article retaining elements transversely of said second conveyor toward said first conveyor for alignment with the open end of the cartons carried thereby; an article pusher element mounted for movement toward and away from said first conveyor at the loading station to push said article of merchandise into said carton, means for actuating said article pusher element, and means for returning said article retaining elements to their unshifted position on said second conveyor.

22. In a cartoning machine, means defining a loading station, a first conveyor operable to convey a succession of cartons along a fixed path; a second conveyor operable to convey a succession of articles of merchandise along a second path, said paths of travel being rectilinear and parallel in said loading station; a series of article positioning means disposed on said second conveyor for holding the articles of merchandise in alignment with the cartons on said first conveyor at said loading station; said article positioning means being mounted for transverse reciprocation on said second conveyor; means at said loading station for shifting said article positioning means from their normal position on said second conveyor towards said first conveyor to a point adjacent said first conveyor and in alignment with the cartons carried thereby; a pusher mounted on each of said positioning means and operable at said loading station to eject the articles of merchandise from the article positioning means when in the shifted position into the aligned carton; means at said loading station for successively so operating said pushers and means for returning the article positioning means to their normal position on said second conveyor.

23. In a cartoning machine, means defining a loading station, a first conveyor operable to convey a succession of cartons along a fixed path; a second conveyor operable to convey a succession of articles of merchandise along a second path, said paths of travel being parallel in said loading station; a series of article positioning means disposed on said second conveyor for holding the articles of merchandise for alignment with the cartons on said first conveyor; said article positioning means being mounted for transverse reciprocation on said second conveyor; means at said loading station for shifting said article positioning means from their normal position on said second conveyor towards said first conveyor to a point adjacent said first conveyor and in alignment with the cartons carried thereby; means at said loading station operable to push the articles of merchandise from the article positioning means when in the shifted position into the aligned carton; and means for returning the article positioning means to their normal position on said second conveyor, said article positioning means being an article receptacle having parallel, vertical side walls, and an inclined bottom wall joining the side walls so that an article placed in 24. In a cartoning machine, a first conveyor adapted to carry cartons; a second conveyor adjacent said first conveyor and having a series of receptacles thereon, said receptacles being so disposed as to hold merchandise articles in alignment with the cartons on said first conveyor for insertion therein during the movement of said conveyor; means for driving said conveyors; a pamphlet holder on said receptacles and movable therewith defining a pamphlet receiving slot interposed between the adjacent ends of the cartons and articles and independently operative to hold advertising pamphlets or the like in the path of movement of the merchandise article while being inserted into the carton; and means operable to shift the merchandise transversely from said receptacles into the cartons on said first conveyors whereby the merchandise in its movement inserts the pamphlets or the like into the carton.

25. In a cartoning machine, a first conveyor adapted to carry cartons; a second conveyor adjacent said first conveyor and having a series of receptacles thereon, said receptacles being so disposed as to hold merchandise articles in alignment with the cartons on said first conveyor for insertion therein during the movement of said conveyor; means for driving said conveyors; means on said receptacles independently operative to hold advertising pamphlets or the like in the path of movement of the merchandise articles while being inserted into the cartons, a first means for shifting said receptacles transversely of said second conveyor and then back again: and means for attaching a pamphlet to the holding means of each receptacle while it is so shifted, whereby a pamphlet will not engage a pamphlet of an adjacent receptacle while being attached; and means operable to shift the merchandise articles transversely from said receptacles into the cartons on said first conveyor, whereby an article in its movement into the carton inserts an associated pamphlet or the like.

26. In a cartoning machine, means defining a loading station; a first conveyor for successively conveying erected open end cartons along a fixed path through said loading station in spaced relationship to each other; a second conveyor movable along a second path for successively conveying articles of merchandise to said loading station; said second conveyor including a series of article supporting receptacles mounted for transverse reciprocation on said second conveyor and spaced therealong in alignment with the spaced erected cartons on said first conveyor at said station; means at said loading station for shifting said article receptacles transversely of said second conveyor towards said first conveyor for alignment with the open end of the cartons carried thereby; an article pusher element mounted for movement toward and away from said first conveyor at the loading station to push the articles of merchandise into the carton, means for actuating said article pusher element, and means for returning said article receptacles to their unshifted position on said second conveyor.

27. In a cartoning machine, means defining a loading station, a first conveyor operable to convey a succession of cartons along a fixed path; a second conveyor operable to convey a succession of articles of merchandise along a second path, said paths of travel being rectilinear and parallel in said loading station; said second conveyor including a series of article supporting receptacles disposed on said second conveyor for holding the articles of merchandise in alignment with the cartons on said first conveyor at said loading station; said article receptacles being mounted for transverse reciprocation on said second conveyor; means at said loading station for shifting said receptacles from their normal position on said second conveyor towards said first conveyor to a point adjacent said first conveyor and in alignment with the cartons carried thereby; means at said loading station operable to push the articles of merchandise from the receptacles when in such shifted position into the aligned carton; and means for returning said receptacles to their normal position on said second conveyor.

28. In combination with a transport for moving erected cartons along a path through a loading station, a loading unit operable to insert merchandise articles into each carton on said transport at said loading station comprising a series of merchandise supporting buckets; means for moving said buckets parallel to, in transverse alignment with, and at the same speed as the cartons on said transport, said buckets being of such construction as to establish correct transverse alignment of the merchandise therein for insertion into the cartons irrespective of the size of the merchandise relative thereto; and means operable at said loading station to eject the merchandise from said buckets into the aligned cartons.

29. In combination, a carton erecting transport, means operable to accommodate said transport to the erection and transportation of cartons which may be of variable dimensions longitudinally of said transport, a magazine for holding flattened cartons, a feeder for feeding individual cartons from said magazine to said transport, drive means for said transport, a positive drive connection between said feeder and said transport for operating the former in timed relation with the operation of the latter, said drive connection comprising a first sprocket connected to said transport, a second sprocket connected to said feeder and a chain interconnecting said sprockets, and means for modifying the timed relation of operation of said feeder relative to said transport comprising a slack adjusting mechanism for varying the relative length of the runs of said chain between said sprockets.

30. In a machine of the class described, a magazine comprising a group of vertical guide elements for holding a stack of flattened cartons, said elements being movable in a horizontal plane to accommodate cartons of various dimensions; an elongated horizontal base; a transport comprising at least a pair of endless elements travelling in parallel endless paths each including a curved portion and a portion parallel to said base, each element having a series of perpendicular fingers extending therefrom to engage the leading and trailing portions of the cartons between the fingers of different elements and move them along said base, a mechanism operable to shift one of said endless elements with respect to the others to vary the longitudinal spacing of the fingers carried by the different elements; feeding means operable to feed flattened cartons from the bottom of the stack to the fingers on said transport during the curved portion of their travel; a drive for said transport and said feeding means; means interconnecting said transport and feeding means whereby they operate in timed relationship; means operable to shift said interconnecting means to move said feeding means independently of said transport and thereby change the timed relationship therebetween to accommodate the dimensions of the cartons being handled; a loading unit adjacent one side of said transport and operable to hold at least one of the carton flaps in open position and to insert merchandise into the carton through the same end, said loading unit including merchandise holding buckets having spaced side walls and an interconnecting bottom wall; means to move said buckets parallel to, in transverse alignment with, and at the same time speed as the fingers on said transport; said buckets being of such construction as to establish correct transverse alignment of the merchandise therein for insertion into the cartons irrespective of the size of the merchandise and the cartons; shifting means operable to shift said buckets transversely toward said transport; and plungers operable to eject the merchandise from said buckets and insert it into the carton; the bottom walls of said buckets all being inclined downwardly in one direction toward one side wall of the bucket whereby merchandise articles of different sizes will always lie against the same walls of the buckets for correct alignment with the cartons on said transport.

31. The machine of claim 30 wherein said plungers are shaped by the provision of an article engaging face so angularly disposed relative to the direction of plunger movement that said face is spaced from the carton transport at its edge adjacent the lower side of said bottom wall a distance greater than at its opposite edge so that during their movement toward said transport they urge the merchandise articles toward the lowest portion of said buckets.

ALEXANDER H. ROSS.

References Cited in the file of this patent

UNITED STATES PATENTS

| Number | Name | Date |
|---|---|---|
| 804,145 | Lissack | Nov. 7, 1905 |
| 1,289,673 | Cooper | Dec. 31, 1918 |
| 1,337,403 | Jones | Apr. 20, 1920 |
| 1,337,845 | McGeouch | Apr. 20, 1920 |
| 1,587,556 | Schilbach | June 8, 1926 |
| 1,654,566 | Wild | Jan. 3, 1928 |
| 1,935,269 | Jones | Nov. 14, 1933 |
| 1,979,207 | Milmoe | Oct. 30, 1934 |
| 1,987,803 | Ryan | Jan. 15, 1935 |
| 2,059,254 | Lasker | Nov. 3, 1936 |
| 2,133,248 | Jones | Oct. 11, 1938 |
| 2,249,201 | Ferguson | July 15, 1941 |
| 2,263,501 | Jones | Nov. 18, 1941 |
| 2,280,773 | Ferguson | Apr. 28, 1942 |
| 2,282,160 | Bischoff | May 5, 1942 |
| 2,306,133 | Marsh | Dec. 22, 1942 |
| 2,314,434 | Toelke et al. | Mar. 23, 1943 |
| 2,355,597 | Pond | Aug. 8, 1944 |
| 2,380,758 | Hohl | July 31, 1945 |
| 2,390,107 | Kucklinsky | Dec. 4, 1945 |
| 2,429,536 | Von Sydow | Oct. 21, 1947 |
| 2,441,372 | Quigley et al. | May 11, 1948 |
| 2,441,445 | Ringler et al. | May 11, 1948 |